(12) United States Patent
Suzuki et al.

(10) Patent No.: US 8,729,887 B2
(45) Date of Patent: May 20, 2014

(54) ROTATION ANGLE SENSOR

(75) Inventors: Shinya Suzuki, Obu (JP); Takehide Nakamura, Handa (JP); Tomoaki Inoue, Nagoya (JP); Ryojiro Kanemitsu, Toyota (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 479 days.

(21) Appl. No.: 12/916,954

(22) Filed: Nov. 1, 2010

(65) Prior Publication Data

US 2011/0109304 A1 May 12, 2011

(30) Foreign Application Priority Data

| Nov. 9, 2009 | (JP) | 2009-256560 |
|---|---|---|
| Dec. 25, 2009 | (JP) | 2009-295819 |
| Mar. 24, 2010 | (JP) | 2010-067730 |

(51) Int. Cl.
*G01B 7/30* (2006.01)

(52) U.S. Cl.
USPC ............. 324/207.16; 324/207.15; 324/207.25

(58) Field of Classification Search
USPC ........................ 324/207.15, 207.16, 207.25
See application file for complete search history.

(56) References Cited

U.S. PATENT DOCUMENTS

| 4,737,698 A | 4/1988 | McMullin et al. |
|---|---|---|
| 4,853,604 A | 8/1989 | McMullin et al. |
| 5,841,274 A | 11/1998 | Masreliez et al. |
| 5,903,205 A | 5/1999 | Goto et al. |
| 6,005,387 A | 12/1999 | Andermo et al. |
| 6,011,389 A | 1/2000 | Masreliez et al. |
| 6,054,851 A | 4/2000 | Masreliez et al. |
| 6,236,199 B1 | 5/2001 | Irle et al. |
| 6,304,076 B1 | 10/2001 | Madni et al. |
| 6,448,759 B2 | 9/2002 | Madni et al. |
| 7,053,602 B2 | 5/2006 | Jin et al. |
| 7,191,759 B2 | 3/2007 | Lee |
| 7,221,154 B2 | 5/2007 | Lee |
| 7,276,897 B2 | 10/2007 | Lee |
| 7,292,026 B2 | 11/2007 | Lee |
| 7,345,473 B2 | 3/2008 | Lee |
| 7,538,544 B2 | 5/2009 | Lee |

(Continued)

FOREIGN PATENT DOCUMENTS

| CN | 101162155 A | 4/2008 |
|---|---|---|
| JP | A-09-053909 | 2/1997 |

(Continued)

OTHER PUBLICATIONS

Dec. 18, 2012 Office Action issued in Japanese Application No. 2009-256560 (with translation).

(Continued)

*Primary Examiner* — Reena Aurora
(74) *Attorney, Agent, or Firm* — Oliff PLC

(57) ABSTRACT

A rotation angle sensor comprises: a resolver stator including an excitation coil for receiving an excitation signal and a detection coil (a sine wave coil and a cosine wave coil) for outputting a detection signal; and a resolver rotor rotatably placed to face the stator. The resolver stator is formed on a stator flat plate. The resolver rotor is made of a flat-shaped rotor flat plate. The stator flat plate and the rotor flat plate are placed in parallel to face each other. The rotor flat plate is formed with a cutout.

24 Claims, 44 Drawing Sheets

(56) References Cited

U.S. PATENT DOCUMENTS

| | | |
|---|---|---|
| 7,562,591 B2 | 7/2009 | Lee |
| 2007/0170803 A1* | 7/2007 | Yabe et al. .................... 310/162 |
| 2008/0087858 A1 | 4/2008 | Hatsuzawa et al. |
| 2010/0156402 A1 | 6/2010 | Straubinger et al. |

FOREIGN PATENT DOCUMENTS

| | | |
|---|---|---|
| JP | A-2000-292205 | 10/2000 |
| JP | A-2003-202240 | 7/2003 |
| JP | A-2004-226382 | 8/2004 |
| JP | A-2005-164332 | 6/2005 |
| JP | A-2007-327940 | 12/2007 |
| JP | A-2008-096231 | 4/2008 |
| JP | A-2008-99519 | 4/2008 |
| JP | A-2008-256486 | 10/2008 |
| JP | A-2008-309598 | 12/2008 |
| JP | A-2009-174925 | 8/2009 |

OTHER PUBLICATIONS

Feb. 5, 2013 Office Action issued in Japanese Application No. 2009-295819 (with translation).

Apr. 11, 2013 Office Action issued in Chinese Patent Application No. 201010540085.4 (with translation).

\* cited by examiner

ROTATION ANGLE SENSOR

CROSS-REFERENCE TO RELATED APPLICATIONS

This application is based upon and claims the benefit of priority from each of the prior Japanese Patent Applications No. 2009-256560 filed on Nov. 9, 2009, No. 2009-295819 filed on Dec. 25, 2009, and No. 2010-067730 filed on Mar. 24, 2010, the entire contents of which are incorporated herein by reference.

TECHNICAL FIELD

The present invention relates to a rotation angle sensor including a stator provided with an excitation coil which receives an excitation signal and a detection coil which outputs a detection signal and a rotor which is placed facing the stator and rotates.

BACKGROUND ART

Heretofore, a high-power compact brushless motor has been used in a robot arm and others. To control the compact brushless motor of the robot, the rotational position of an output shaft has to be detected accurately. This is because the rotation angle of a rotor has to be ascertained precisely for controlling switching of energization to each coil of a stator. In particular, some robot arms require high position accuracy. Thus, there is a demand for accurate energization switching.

For detection of the position of a motor shaft for moving the robot arm, a small-sized resolver is used. The resolver is built in the motor and directly attached to a rotor shaft of the motor.

For instance, in a resolver in Patent Literature 1, a resolver stator is placed around a metal resolver rotor. The resolver stator includes coils sequentially arranged, each coil being formed by winding a conductive wire around a tooth protruding radially inward. This type of VR resolver has to be configured to periodically change a gap between the rotor and the stator. Otherwise, outputs of the circumferentially arranged coils cancel each other and thus appropriate detection output could not be obtained. In the resolver in Patent Literature 1, the rotor is arranged so that the gap between the rotor and the stator takes the shape of a sine wave curve.

The resolver in Patent Literature 1 usually uses an excitation signal having a frequency range of 8 to 10 kHz. Accordingly, each coil has a large number of winding turns and thus has a large outer dimension. This results in an increased diameter of the resolver itself and a long length of the resolver rotor in an axial direction. When the resolver is used for the motor shaft for driving the robot arm, there is a problem with an increased size of the motor.

The technique in Patent Literature 1 performs excitation with a frequency range of 8 to 10 kHz. Thus, this resolver is liable to be influenced by disturbed electromagnetic noise from a motor (for example, noise of a frequency of 7.2 kHz for a sixth-order motor with the number of revolutions: 18000 rpm and four pairs of N-S poles). The resolver detection accuracy would deteriorate.

To solve the above problems, the present inventors proposed in Patent Literature 2 that (1) the use of an excitation signal of a high frequency of 300 to 500 kHz to reduce the number of winding turns of each coil, and (2) an excitation coil is printed on a resolver stator flat plate and a second coil is printed on a resolver rotor flat plate so that the resolver stator flat plate and the resolver rotor flat plate are placed to face each other. Thus, the diametrical dimension of the resolver and the axial length of the rotor of the resolver can be reduced. Such a resolver can contribute to reduction in the overall size of the motor when the resolver is mounted therein.

CITATION LIST

Patent Literature

Patent Literature 1: JP 2008-99519A
Patent Literature 2: JP 2008-256486A

SUMMARY OF INVENTION

Technical Problem

However, the techniques in Patent Literatures 1 and 2 have the following problems. In Patent Literature 2, the excitation coil is formed on the resolver stator flat plate and the detection coil is formed on the resolver rotor flat plat so that rotary transformer coils are formed on both flat plates. A pair of the rotary transformer coils serves to transmit a detection signal generated in the detection coil to the resolver stator. However, in the case where the rotary transformer coils are used to transmit the detection signal, a transmission efficiency of the signal lowers down to about $1/100$. This causes a problem that an S/N ratio decreases.

In Patent Literature 1, the excitation coil and the detection coil are formed on the resolver stator side and only magnetic metal teeth are formed on the resolver rotor side. Since no rotary transformer coil is used, no problem therewith occurs. However, there remains a problem that the diametrical size of the resolver increases and the axial length of the resolver also increases, as mentioned above.

Further, the outer diameter of the rotor has to be periodically changed like a sine wave curve, for example, which leads to a high manufacturing cost of the rotor. The technique in Patent Literature 1 also performs excitation with the frequency range of 8 to 10 kHz. This is apt to be influenced by disturbed electromagnetic noise from the motor, resulting in a decrease in resolver angle detection accuracy.

Herein, if Patent Literatures 1 and 2 are to be combined, the excitation coil and the detection coil are formed on the resolver stator flat plate. On the other hand, the resolver rotor flat plate made of magnetic metal is formed with protrusions and recesses to provide a periodic-shaped gap. This causes an increase in cost.

In Patent Literature 2, under condition of 1-excitation and 2-output, the sine wave coil and the cosine wave coil are formed as the detection coils. Herein, the sine wave coil is formed in a sine wave coil layer and the cosine wave coil is formed in a cosine wave coil layer.

However, since the sine wave coil layer and the cosine wave coil layer are separately laminated in respective coil layers, a gap or clearance between the sine wave coil and the excitation coil and a gap or clearance between the cosine wave coil and the excitation coil do not coincide with each other. Consequently, if the positional relationship between the resolver stator and the resolver rotor is changed, it could cause an error in a detection signal generated.

For instance, if the clearance between the resolver stator and the resolver rotor is changed by a distance of about 0.2 mm in the axial direction due to backlush of bearings, a gain between the sine wave coil and the excitation coil and a gain between the cosine wave coil and the excitation coil may largely differ, leading to an angle detection error. This is an important problem for the output shaft of the motor for driving the robot arm that is requested to have high detection accuracy.

The present invention has been made in view of the circumstances to solve the above problems and has a purpose to provide a resolver having a reduced outer diameter and a short axial length without using a rotary transformer coil.

Solution to Problem (1) To achieve the above purpose, one aspect of the invention provides a rotation angle sensor comprising: a stator including an excitation coil for receiving an excitation signal and a detection coil for outputting a detection signal; and a rotor rotatably placed to face the stator, wherein a nonmagnetic conductive part and one of a magnetic part and a cutout are alternately formed in the rotor in places facing the stator.

(2) Another aspect of the invention provides a rotation angle sensor comprising: a stator including an excitation coil for receiving an excitation signal and a detection coil for outputting a detection signal; and a rotor rotatably placed to face the stator, wherein the detection coil includes a flat coil pattern wound in a forward direction and a flat coil pattern wound in a reverse direction, the forward-direction flat coil pattern and the reverse-direction flat coil pattern are arranged sequentially in a circumference direction, and the excitation coil includes a coil pattern placed along an outer circumference of the forward-direction coil pattern and the reverse-direction coil pattern.

Furthermore, another aspect of the invention provides a rotation angle sensor comprising: a stator including an excitation coil for receiving an excitation signal and a detection coil for outputting a detection signal; and a rotor rotatably placed to face the stator, wherein the detection coil includes a flat coil pattern wound in a forward direction and a flat coil pattern wound in a reverse direction, the forward-direction flat coil pattern and the reverse-direction flat coil pattern are arranged sequentially in a circumference direction, and the excitation coil is constituted of a plurality of loop patterns consecutively wound and placed in a position that overlaps the forward-direction flat coil pattern and the reverse-direction flat coil pattern, the loop patterns being arranged entirely in an annular form so that the adjacent loop patterns in a circumference direction are arranged sequentially with displacement to partly overlap each other and the adjacent loop patterns in a radial direction are arranged in sequentially enlarged form.

Advantageous Effects of Invention

The synchronous detector angle sensor of the invention provides the following operations and effects. With the above configuration (1), in the sine wave coil and the cosine wave coil facing the magnetic part or the cutout of the resolver rotor, respective predetermined detection currents flow. In other words, when the excitation signal (the sine wave signal) is input to the excitation coil, the excitation coil generates a predetermined amount of magnetic flux in a positive direction (representing a direction of the magnetic flux generated by the excitation coil). This magnetic flux passes through the magnetic part of the resolver rotor to form a magnetic circuit. Thus, the magnetic flux is frequently generated. Detection voltage which is an induced voltage generated by the generated magnetic flux becomes large.

On the other hand, the detection current hardly flows in the parts of the sine wave coil and the cosine wave coil, the parts facing the nonmagnetic conductive part of the resolver rotor.

The reason thereof is explained. On the surface of the nonmagnetic conductive part, an eddy current is generated by the magnetic flux generated by the excitation coil. The generated eddy current produces a magnetic, flux in a negative direction (representing an opposite direction to the direction of the magnetic flux generated by the excitation signal). The magnetic flux in the positive direction and the magnetic flux in the negative direction cancel each other. Accordingly, induced voltage is hardly generated by the magnetic flux and no current flows in the detection coil.

Herein, the present inventors experimentally confirmed the following fact. If a space is provided instead of the nonmagnetic part, the magnetic flux in the negative direction resulting from the eddy current does not occur and thus a current flows in the detection coil. This results in a small difference in generated induced voltage between the space and the magnetic part and a poor S/N ratio. Thus, such a configuration could not be used as the resolver.

BRIEF DESCRIPTION OF DRAWINGS

FIGS. 26A and 2613 are views showing states of the resolver at time T2 in FIG. 24;

FIGS. 5A and 35B are plan views showing positional relationships between the sine wave coil and the nonmagnetic conductive part at and between the cosine wave coil and the nonmagnetic conductive part a rotor angle in the third embodiment;

DESCRIPTION OF EMBODIMENTS

A detailed description of a first preferred embodiment of an amplitude resolver embodying the present invention will now be given referring to the accompanying drawings.

Figure 1:
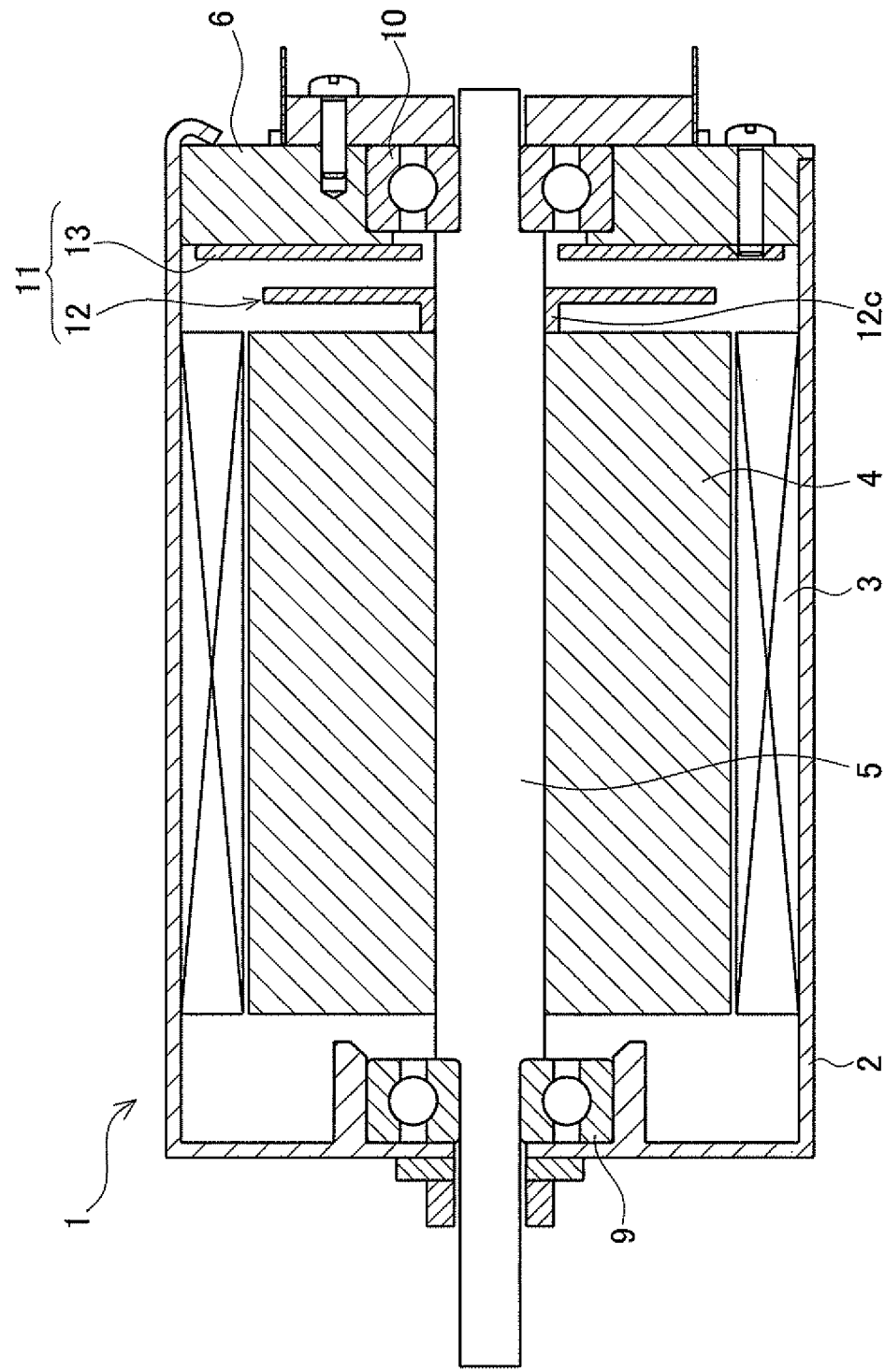
FIG. 1 is a sectional view showing one end part of a resolver-mounted motor in a first embodiment of the invention.

FIG. 1 is a sectional view showing one end part of a resolver-mounted motor 1 (hereinafter, simply referred to as a "motor"). As shown in FIG. 1, the motor 1 includes a main-body base plate 6, a hollow motor case 2, a motor stator 3 and a motor rotor 4 placed in the internal space of the case 2, and a motor shaft 5 integrally provided in the center of the rotor 4. One end of the shaft 5 protrudes out of the case 2.

The motor stator 3 is fixed to the inner surface of the motor case 2. This stator 3 includes a stator core and a coil both being not shown. The motor rotor 4 is placed inside the motor stator 3. This rotor 4 holds a permanent magnet not shown. The motor shaft 5 is supported at its both end by a bearing 10 placed in the base plate 6 and a bearing 9 placed in an end portion of the case 2 so that the shaft 5 is rotatable.

The motor 1 is configured such that the rotor 4 is caused to rotate together with the shaft 5 when the permanent magnet receives a magnetic force by excitation of an excitation coil of the stator 3.

As shown in FIG. 1, a resolver 11 is placed in the motor case 2, between the motor rotor 4 and the base plate 6. The resolver 11 includes a resolver rotor 12 and a resolver stator 23 spaced to face the rotor 12 with a predetermined clearance.

Figure 3:
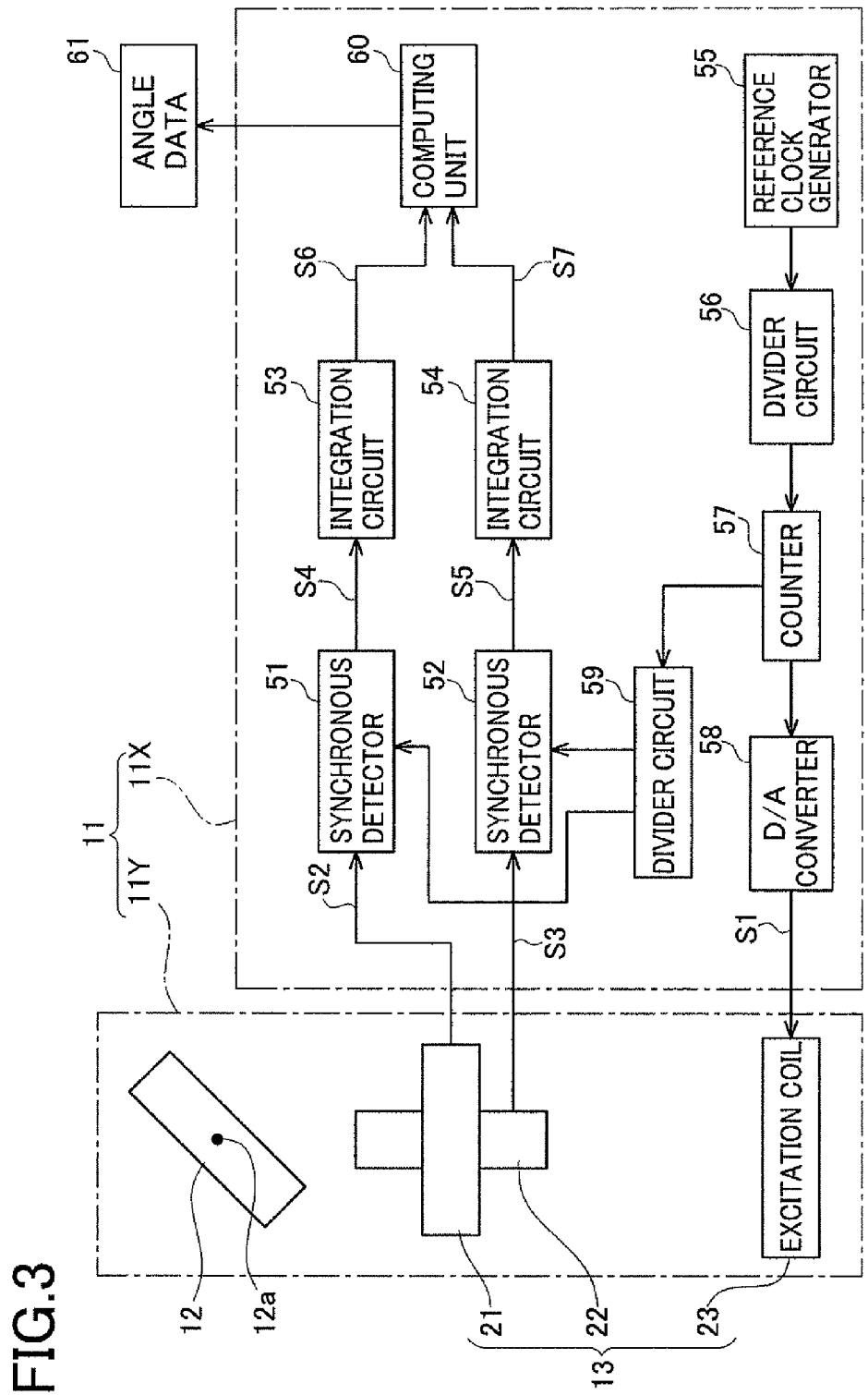
FIG. 3 is block diagram showing a control configuration of a resolver in the first embodiment.

FIG. 3 is a block diagram showing control of detecting the position of the resolver. The resolver 11 is broadly divided into a circuit section 11X and a sensor section 11Y. In the circuit section 11X, a reference clock generator 55 is connected to a divider circuit 56. This circuit 56 is connected to a counter 57. The counter 57 is connected to a D/A converter 58 and a divider circuit 59 respectively. The D/A converter 58 is also connected to the excitation coil 23. Further, the counter 57 is connected to the divider circuit 59.

The divider circuit 59 is also connected to a synchronous detector 51 for sine wave and a synchronous detector 52 for cosine wave. The synchronous detector 51 is also connected to an integration circuit 53 and the synchronous detector 52 is also connected to an integration circuit 54. The integration circuit 53 and the integration circuit 54 are connected to a computing unit 60.

In the sensor section 11Y, the sine wave coil 21 is connected to the synchronous detector 51 and the cosine wave coil 22 is connected to the synchronous detector 52. The excitation coil 23 is connected to the D/A converter 58. The resolver rotor 12 has no electrical connection.

Figure 4:
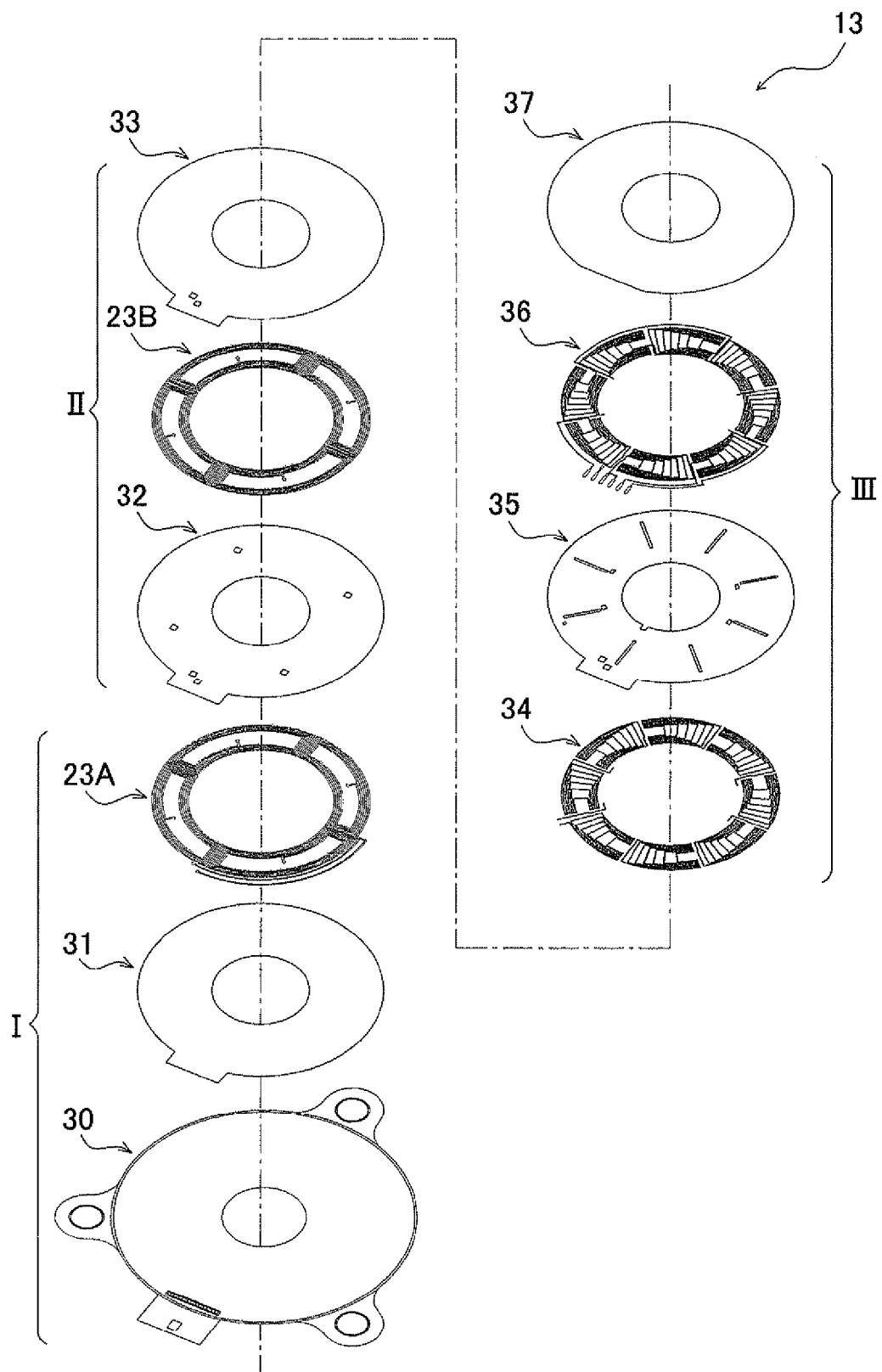
FIG. 4 is an exploded perspective view showing a structure of a resolver stator.
Figure 5:
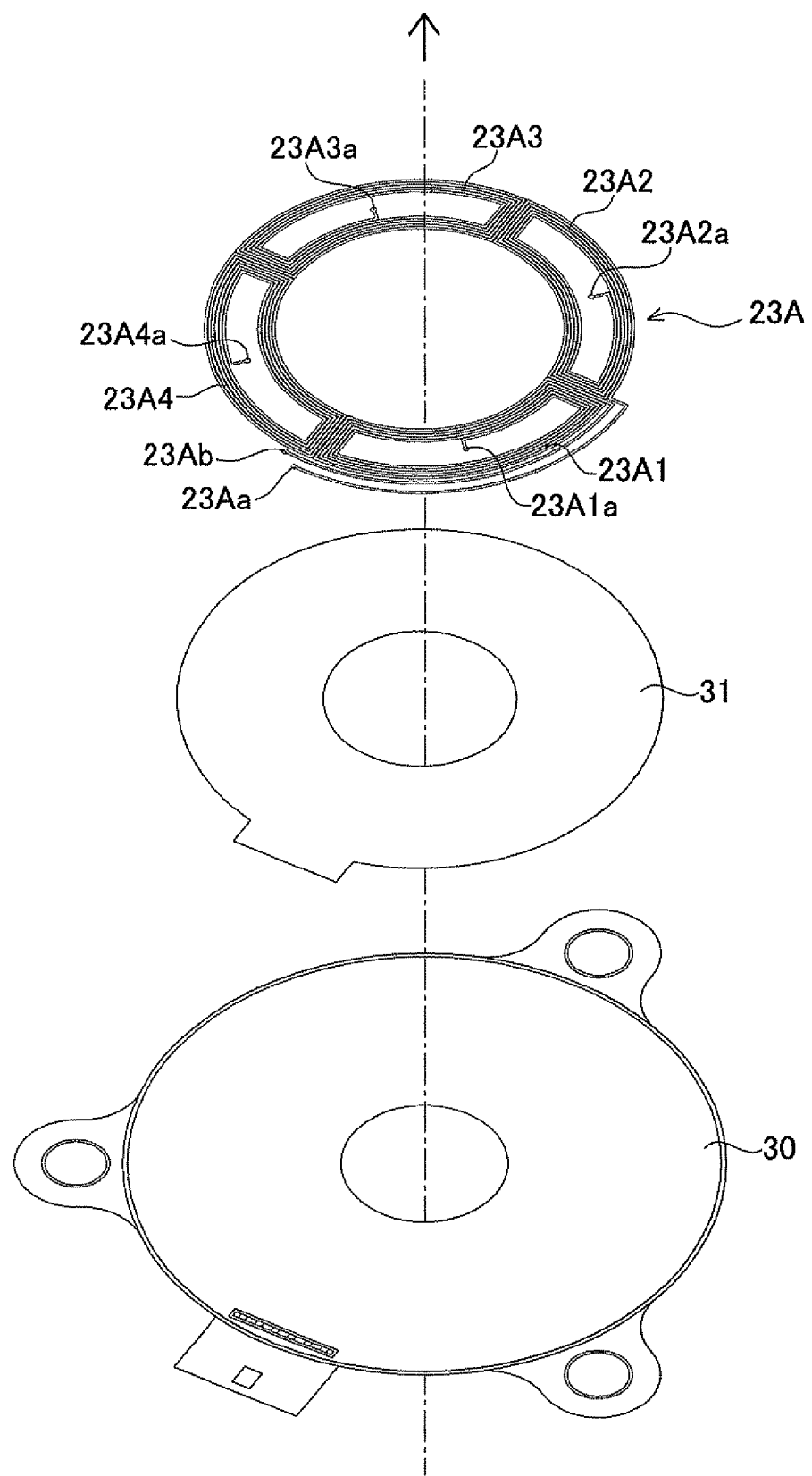
FIG. 5 is a first enlarged view of a part in FIG. 4.
Figure 6:
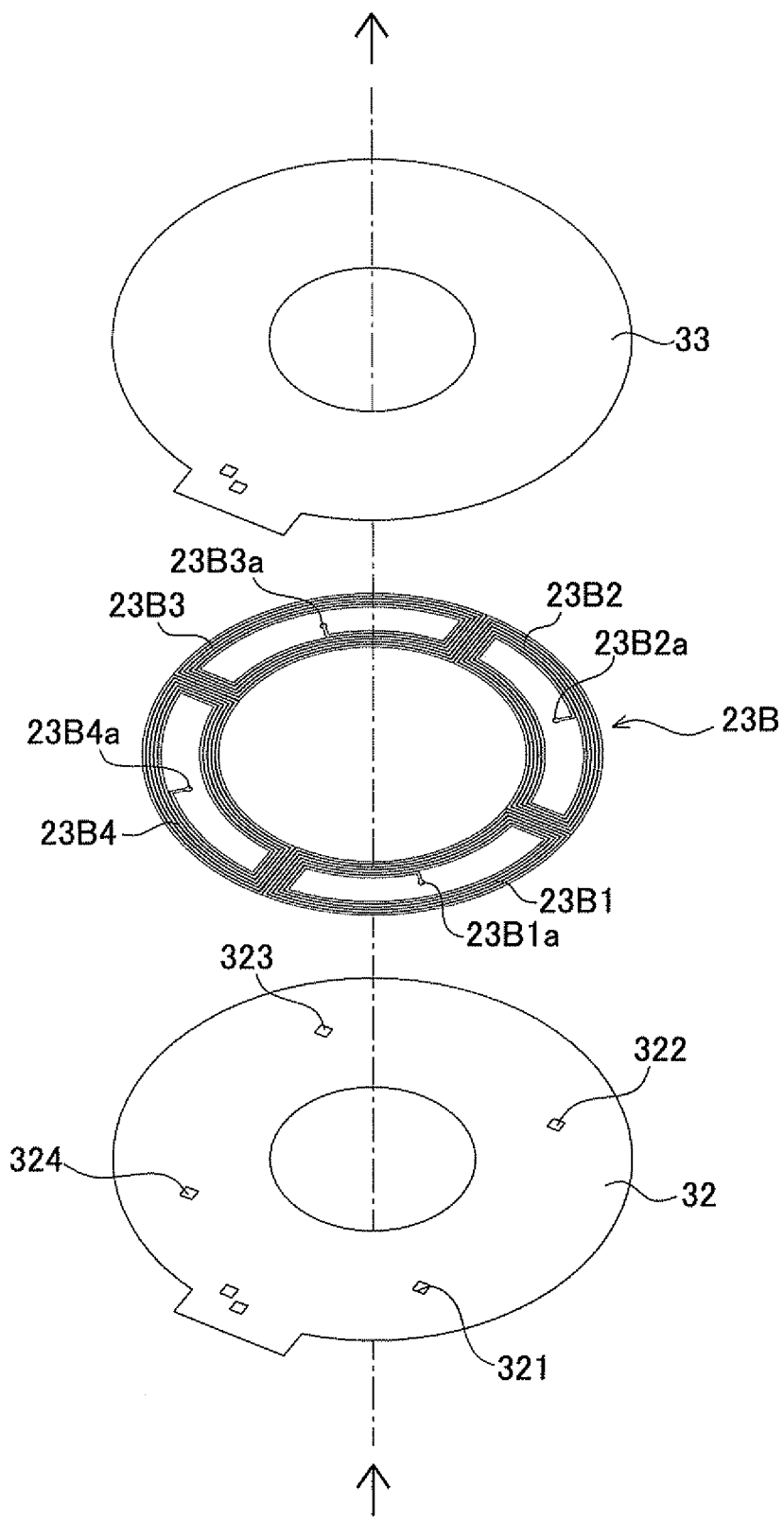
FIG. 6 is a second enlarged view of another part in FIG. 4.
Figure 7:
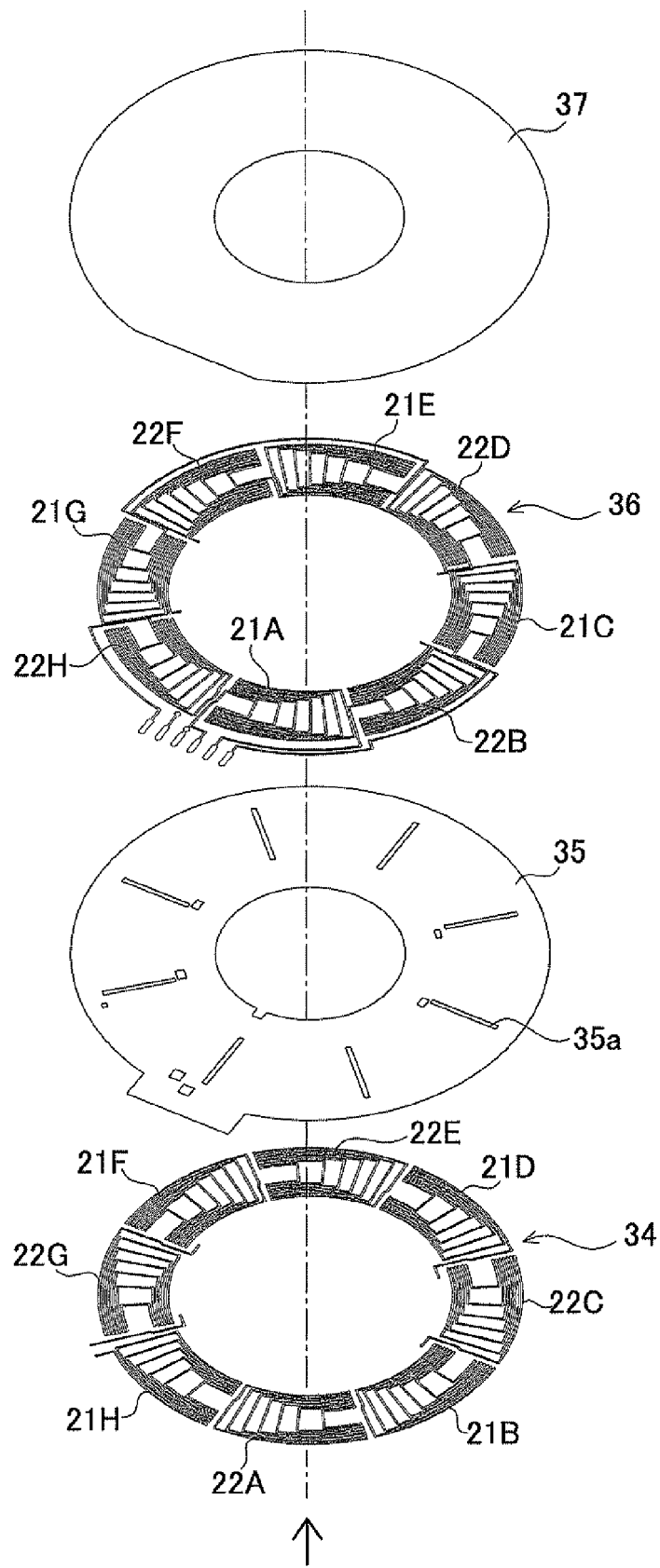
FIG. 7 is a third enlarged view of another part in FIG. 4.

The structures of the sine wave coil 21, cosine wave coil 22, and excitation coil 23 are explained below in detail. FIG. 4 is an exploded perspective view of the structure of the resolver stator 13. FIGS. 5 to 7 are enlarged views of the structure shown in FIG. 4 and divided into three groups (I, II, and III).

As shown in FIG. 5, a stator base flat plate 30 is disposed as a lowermost layer. This flat plate 30 has an annular disc shape on which three mounting portions are formed in an outer circumference. An insulating layer 31 is formed on the board 30. A first excitation coil 23A of the excitation coil 23 is formed on the insulating layer 31. This first excitation coil 23A is divided by each 90 degrees into four split-coil segments 23A1, 23A2, 23A3, and 23A4. The first excitation coil 23A has a pair of terminals 23Aa and 23Ab.

An insulating layer 32 is formed on the first excitation coil 23A. A second excitation coil 23B of the excitation coil 23 is formed on the insulating layer 32. The second excitation coil 23B has four split-coil segments 23B1, 23B2, 23B3, and 23B4 in the positions corresponding to the four split-coil segments 23A1-23A4 of the first excitation coil 23A.

The excitation coils 23A and 23B are configured to have the same direction and the same number of winding turns, so that they can generate almost uniform magnetic fluxes in the same direction, thereby enabling uniform excitation in the same direction.

As shown in FIG. 5, a terminal 23A1a formed in the inner circumference of the split-coil segment 23A1 of the first excitation coil 23A passes through a through hole 321 of the insulating layer 32 and is connected to a terminal 23B1a formed in the inner circumference of the split-coil segment 23B1 of the second excitation coil 23B. An outermost circumference wire of the split-coil segment 23B1 is connected to an outermost circumference of the split-coil segment 23B4. A terminal 23B4a formed in the inner circumference of the split-coil segment 23B4 passes through a through hole 324 of the insulating layer 32 and is connected to a terminal 23A4a formed in the inner circumference of the split-coil segment 23A4.

In the above way, the split-coil segments of the first excitation coil 23A and the second excitation coil 23I3 are connected in sequence. An insulating layer 33 is formed on the second excitation coil 23B. The reason why the excitation coil 23 is configured in two layers, the first excitation coil 23A and the second excitation coil 23I3, is to increase an amount of magnetic flux to be generated without increasing the area.

As shown in FIG. 7, a first detection coil layer 34 is formed on the insulating layer 33. The first detection coil layer 34 is divided by each 45 degrees into eight split-coil segments. That is, there are sequentially formed a cosine wave split-coil segment 22A, a sine wave split-coil segment 21B, a cosine wave split-coil segment 22C, a sine wave split-coil segment 21D, a cosine wave split-coil segment 22E, a sine wave split-coil segment 21F, a cosine wave split-coil segment 22G, and a sine wave split-coil segment 21H. An insulating layer 35 is formed on the first detection coil layer 34.

A second detection coil layer 36 is formed on the insulating layer 35. This coil layer 36 is divided by each 45 degrees into eight split-coil segments. That is, a sine wave split-coil segment 21A is formed in a position corresponding to the cosine wave split-coil segment 22a and a cosine wave split-coil segment 22B is formed in a position corresponding to the sine wave split-coil segment 21B. Similarly, there are also sequentially formed a sine wave split-coil segment 21C, a cosine wave split-coil segment 22D, a sine wave split-coil segment 21E, a cosine wave split-coil segment 22F, a sine wave split-coil segment 21G, and a cosine wave split-coil segment 22H. An insulating layer 37 is formed on the second detection coil layer 36.

Eight sine wave split-coil segments 21A, 21B, 21C, 21D, 21E, 21F, 21G, and 21H are connected to each other by passing through the through holes 35a of the insulating layer 35 in turn to be alternately provided in the first detection coil layer 34 and the second detection coil layer 36, thus forming one sine wave coil 21.

The sine wave split-coil segments 21B and 21C constitute a first sine wave coil 21BC, the sine wave split-coil segments 21D and 21E constitute a detection sine wave coil 21DE, the sine wave split-coil segments 21F and 21G constitute a third sine wave coil 21FG, and the sine wave split-coil segments 21H and 21A constitute a fourth sine wave coil 21HA. The first sine wave coil 21BC and the third sine wave coil 21FG are opposite in winding direction to the second sine wave coil 21DE and the fourth sine wave coil 21HA, so that an induced voltage that generates a current in an opposite direction to the magnetic flux in the positive direction occurs.

Similarly, eight cosine wave split-coil segments 22A, 22C, 22D, 22E, 22F, 22G and 22H are connected to each other by passing through the through holes 35a of the insulating layer 35 in turn to be alternately provided in the first detection coil layer 34 and the second detection coil layer 36, thus forming one cosine wave coil 22.

The cosine wave split-coil segments 22A and 22B constitute a first cosine wave coil 22AB, the cosine wave split-coil segments 22C and 22D constitute a second cosine wave coil 22CD, the cosine wave split-coil segments 22E and 22F constitute a third cosine wave coil 22EF, the cosine wave split-coil segments 22G and 22H constitute a fourth cosine wave coil 22GH. The first cosine wave coil 22AB and the third cosine wave coil 22EF are opposite in winding direction to the second cosine wave coil 22CD and the fourth cosine wave coil 22GH, so that an induced voltage occurs in an opposite direction to the magnetic flux in the positive direction. Accordingly, the sine wave coil 21 and the cosine wave coil 22 are formed with an angular displacement of 45 degrees.

Figure 2:
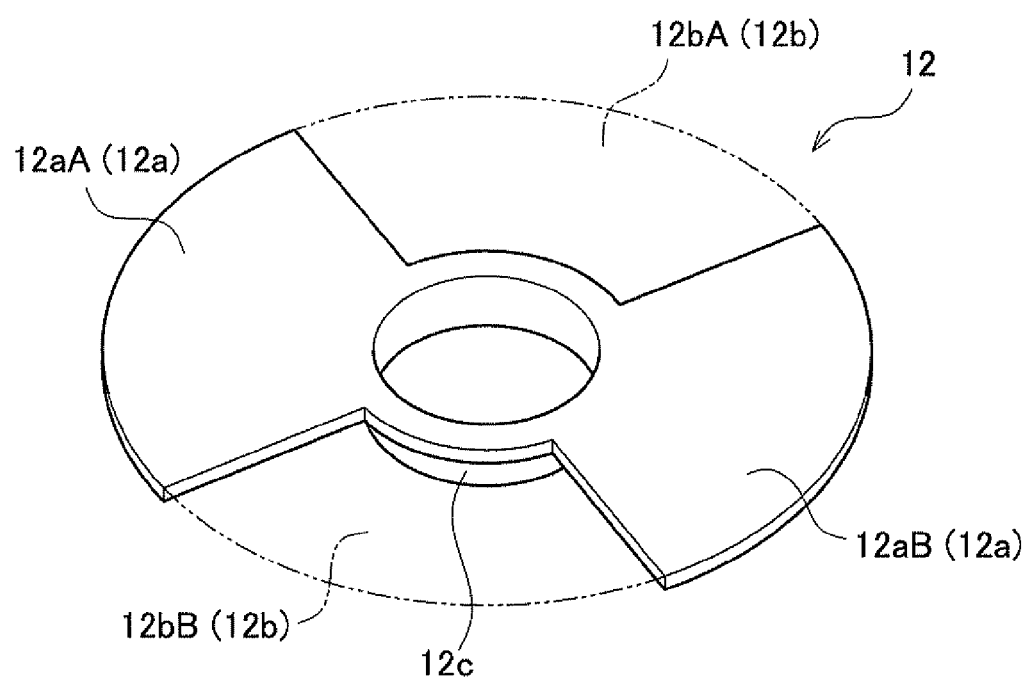
FIG. 2 is a view showing the shape of a resolver rotor.

The structure of the resolver rotor 12 will be explained below referring to FIG. 2. The resolver rotor 12 is made of SUS305 in JIS (SUS: Steel Use Stainless) which is nonmagnetic conductive metal and has a circular flat plate shape with two cutouts 12b and two nonmagnetic conductive parts 12a. The two cutouts 12b and the two nonmagnetic conductive parts 12a are alternately arranged at each 90 degrees.

The resolver rotor 12 is formed, at a center of a flat plate part, with a hollow protrusion (a boss) 12c made by press-drawing. The resolver rotor 12 is press-fit on the outer periphery of the shaft 5 inserted in the hollow part of the protrusion 12c. The protrusion 12e and the flat plate part are formed with precise perpendicularity. Accordingly, the flat plate part of the resolver rotor 12 and the flat plate of the resolver stator 13 are arranged with accurate parallelism. Thus, an interval between the rotor 12 and the stator 13 is also constant.

The resolver rotor 12 in this embodiment is made of SUS305 but may be made of any other nonmagnetic metal such as SUS304, aluminum, brass, copper, etc. In the case of using SUS305, the rotor does not change into a magnetic body even when it is made by press-molding. To be specific, of stainless steel, SUS304 and the like may transform into martensite and hence have a magnetic property when it is bent or squeezed. On the other hand, SUS305 is less likely to transform into martensite even when it is press-molded, and thus can maintain a nonmagnetic property. SUS305 is therefore an appropriate material in the embodiments of the invention. Herein, SUS304 and SUS305 are austenitic stainless steel. A typical component of SUS304 is Ni (8%-10.5%) and Cr (18%-20%). A typical component of SUS305 is Ni (10.5%-13%) and Cr (17%-19%).

The resolver rotor 12 includes the cutouts 12b in two opposite places and the nonmagnetic conductive parts 12a in two opposite places of the four 90°-divided sections. Since each of the sine wave coil 21 and the cosine wave coil 22 has eight split-coil segments arranged at each 45 degrees, a 2X detection coil is constituted.

The operations of the resolver 11 having the above configuration will be explained below. In the control circuit shown in FIG. 3, the reference clock generator 55 generates a reference clock of a high frequency of 32 MHz. The divider circuit 56 is also called a frequency dividing circuit and serves to convert a high-frequency clock generated in the reference clock generator 55 to a low-frequency clock. The divider circuit 56 converts the reference clock of 32 MHz to a 500 kHz frequency. The counter 57 counts sixty-four pulses and outputs the sixty-four pulses as one cycle to the D/A converter 58.

The D/A converter 58 amplitude-modulates the sixty-four pulses as one cycle to create a sine wave excitation signal of 7.8125 kHz=500 kHz/64, thereby exciting the excitation coil 23. When the sine wave excitation signal S1 is transmitted to the excitation coil 23, a magnetic field occurs, causing detection voltage which is an induced voltage in the sine wave coil 21 and the cosine wave coil 22 both serving as detection coils. This action will be explained in detail later.

Upon receipt of a count value of the counter 57, the divider circuit 59 transmits a detection timing signal to the synchronous detectors 51 and 52 at necessary detection timings.

The synchronous detector 51 reads detection voltage values S2 transmitted from the sine wave coil 21 at the timings of the divider circuit 59, synchronously detects the voltage values S2, and transmits synchronous detection signals S4 to the integration circuit 53. This integration circuit 53 integrates the synchronous detection signals S4 only for a predetermined period of time to partially average the detection voltage values. A partially averaged output S6 of the integration circuit 53 is transmitted to the computing unit 60.

The reason why the integration is performed for the predetermined time is as follows. In the present embodiment, a carrier wave of 500 kHz is amplitude-modulated to produce a signal wave of 7.8125 kHz and thus an induced voltage at a certain time is an induced voltage value by the carrier wave. To obtain an induced voltage value of a signal wave, not an induced voltage value of a carrier wave, the integration of the induced voltage values for the predetermined period of time is calculated. In other words, a plurality of carrier waves is integrated.

Similarly, the synchronous detector 52 reads detection voltage values S3 transmitted from the cosine wave coil 22 at the timings of the divider circuit 59, synchronously detects the voltage values S2, and transmits synchronous detection signals S5 to the integration circuit 54. The integration circuit 54 integrates the synchronous detection signals S5 for a predetermined period of time to partially average the detection voltage values. The integration circuit 54 is operated as with the integration circuit 53. A partially averaged output S7 of the integration circuit 54 is transmitted to the computing unit 60.

The computing unit 60 calculates a ratio between the integration circuit output of the sine wave coil 21 transmitted from the integration circuit 53 and the integration circuit output of the cosine wave coil 22 transmitted from the integration circuit 54 and outputs a calculated ratio as angle data 61. In the amplitude resolver, the ratio between the integration circuit output of the sine wave coil 21 and the integration circuit output of the cosine wave coil 22 at an electric angle at a certain moment uniquely corresponds to an electric angle. Accordingly, if the ratio is obtained as the angle data, a current angle of the resolver rotor 12 can be measured.

The operations of the excitation coil 23, resolver rotor 12, sine wave coil 21, and cosine wave coil 22 will be explained below.

Figure 10:
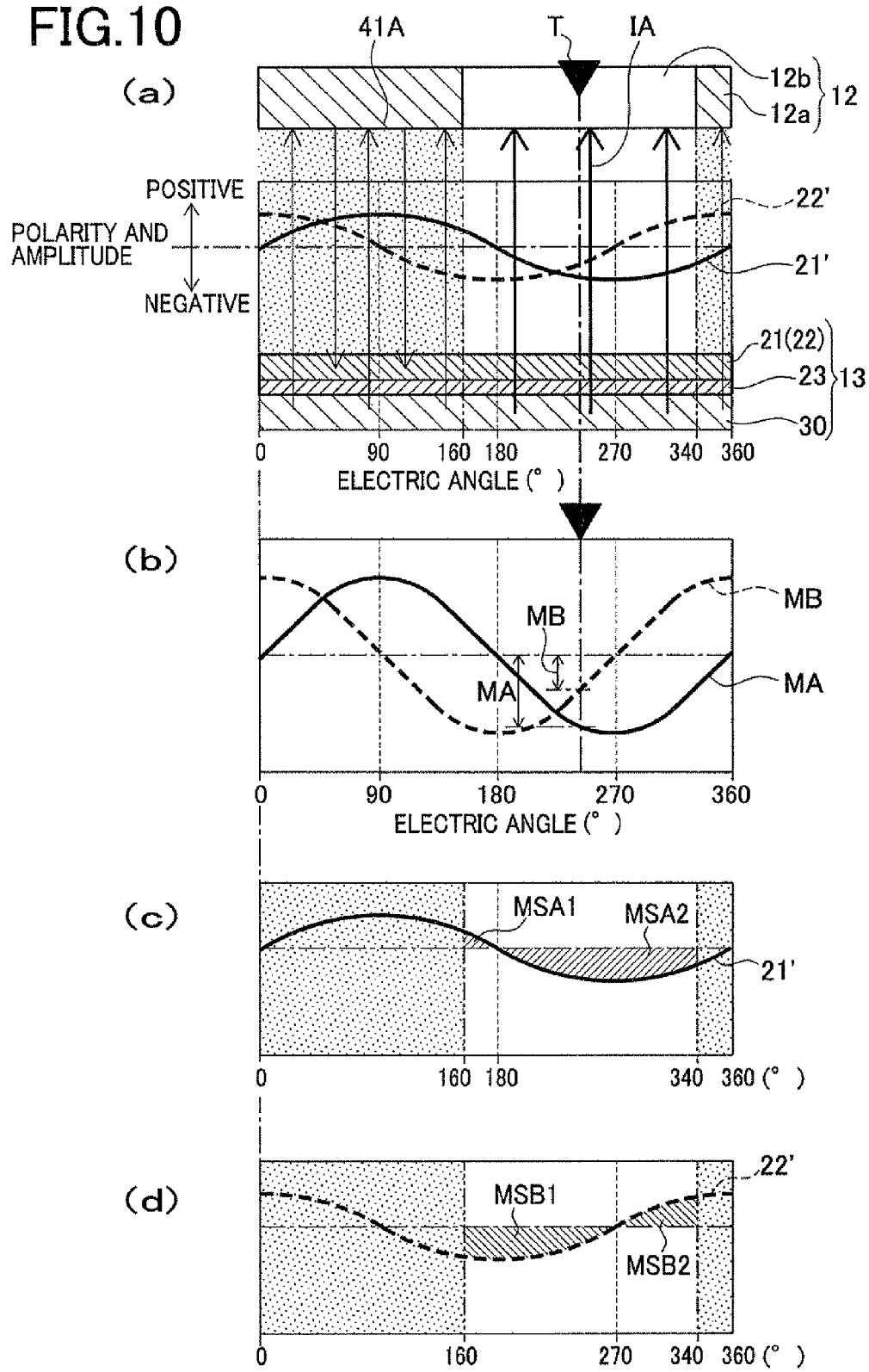
FIG. 10 is an explanatory view showing operations of the resolver.

In FIG. 10, (*a*) shows a positional relationship between the resolver stator 13 (the stator base flat plate 30, the excitation coil 23, the sine wave coil 21, and the cosine wave coil 22) and the resolver rotor 12 (the cutouts 12*b* and the nonmagnetic conductive parts 12*a*). The positional relationship actually should appear in a circular graph but is depicted in a line graph for easy viewing.

An electric angle represented by a lateral axis is 360 degrees (a mechanical angle is 180 degrees because of a 2X coil). In the resolver stator 13, the excitation coil 23 is formed on the stator base flat plate 30 and further the sine wave coil 21 and the cosine wave coil 22 are formed on the excitation coil 23. The resolver rotor 12 includes the cutouts 12*b* and the nonmagnetic conductive parts 12*a* alternately arranged in respective two places, each being in a range of an electric angle of 180° (a mechanical angle is 90° because of a 2X coil).

Figure 8:
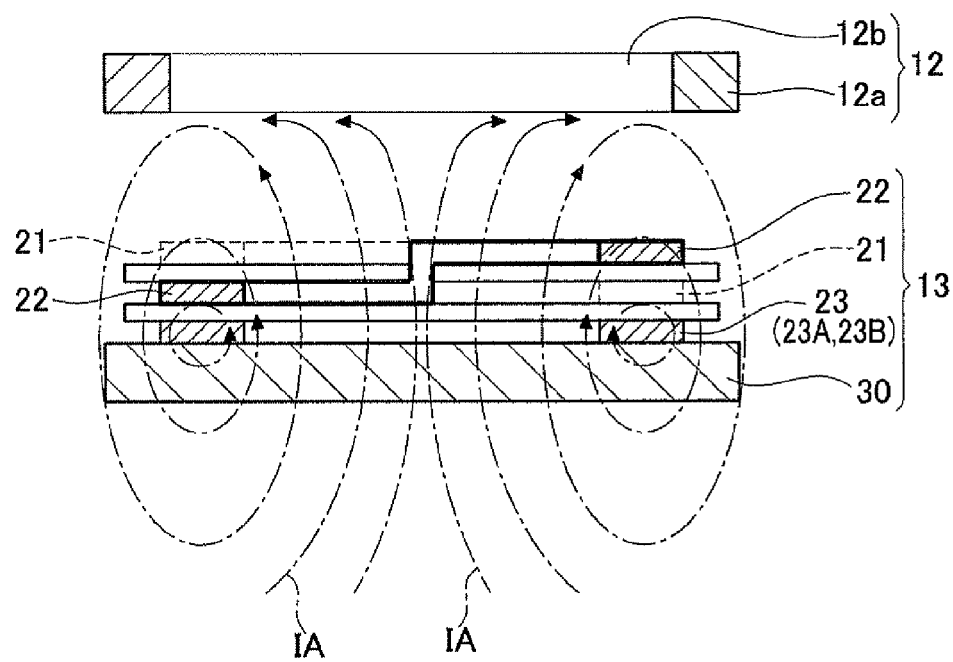
FIG. 8 is a first explanatory view of a part in FIG. 10.

FIG. 8 is a sectional view showing a portion of the resolver rotor 12 including the cutout 12*b* in FIG. 10 (*a*).

When the excitation coil 23 (23A and 23B) receives the signal wave of 7.8125 kHz amplitude-modulated by the carrier wave of 500 kHz from the D/A converter 58, a magnetic flux IA corresponding to the current value occurs in the positive direction (representing the direction of a magnetic flux generated in the magnetic coil). The generation of the magnetic flux IA generates an induced voltage in the sine wave coil 21 and the cosine wave coil 22.

Figure 9:
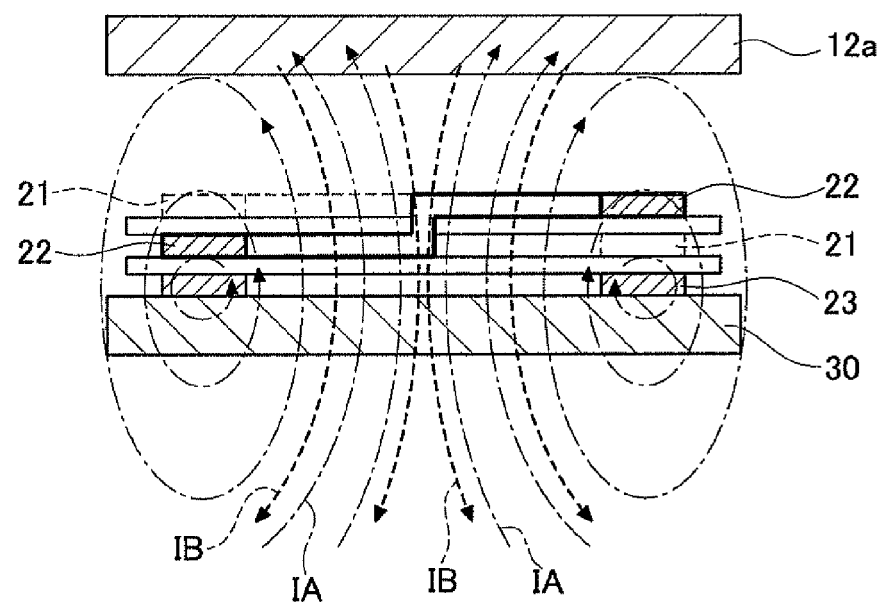
FIG. 9 is a second explanatory view of a part in FIG. 10.

On the other hand, FIG. 9 is a sectional view of the nonmagnetic conductive part 12*a* of the resolver rotor 12.

In the resolver rotor 12, the nonmagnetic conductive parts 12*a* face the sine wave coil 21 and the cosine wave coil 22. When the excitation coil 23 (23A and 23B) receives the signal wave of 7.8125 kHz amplitude-modulated by the carrier wave of 500 kHz from the D/A converter 58, a magnetic flux IA corresponding to the current value occurs in the positive direction (representing the direction of a magnetic flux generated in the magnetic coil).

However, if the magnetic flux IA enters the nonmagnetic conductive parts 12*a* made of nonmagnetic metal, an eddy current occurs on the surface of each nonmagnetic conductive part 12*a*. The generated eddy current generates a magnetic flux IB in a negative direction (representing an opposite direction to the direction in which the magnetic flux is generated by the excitation signal). This magnetic flux IB cancels the magnetic flux IA in the positive direction generated by the excitation coil 23. Thus, the magnetic fluxes totally practically disappear as a whole as compared with the case shown in FIG. 8. In the state of FIG. 10 (*a*), consequently, it can be considered that the magnetic flux IA occurs only in the region (an electric angle of 160° to 340°) overlapping with the cutouts 12*b*.

Figure 15A:
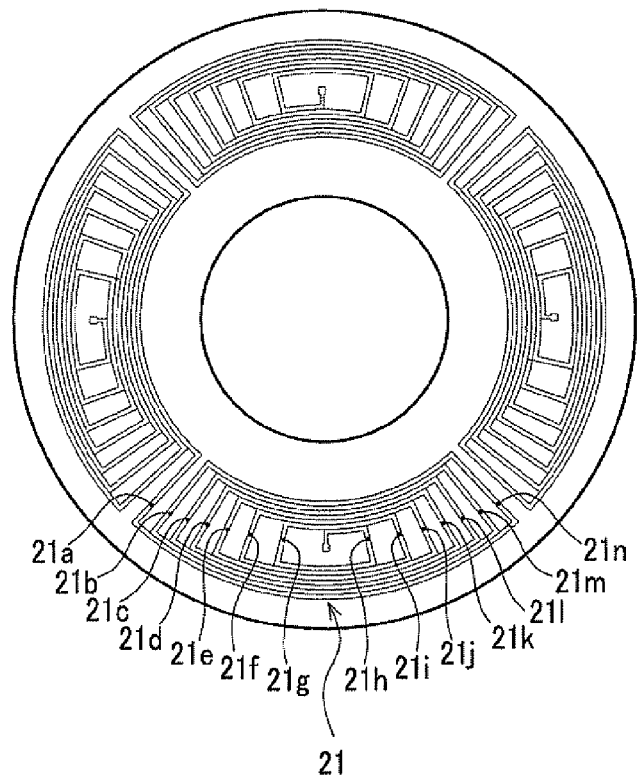
FIG. 15A is a view showing a conductive wire configuration of the sine wave coil.

Herein, the sine wave coil 21 and the cosine wave coil 22 will be explained below. FIG. 15A shows one example of the sine wave coil 21. In this figure, the coils are illustrated on the same plane for facilitating viewing. Each of four coil parts of the sine wave coil 21 is constituted of seven sets of coil wires 21*a*-21*n*, 21*b*-21*m*, 21*c*-21*l*, 21*d*-21*k*, 21*e*-21*j*, 21*f*-21*i*, and 21*g*-21*h*.

Figure 14A:
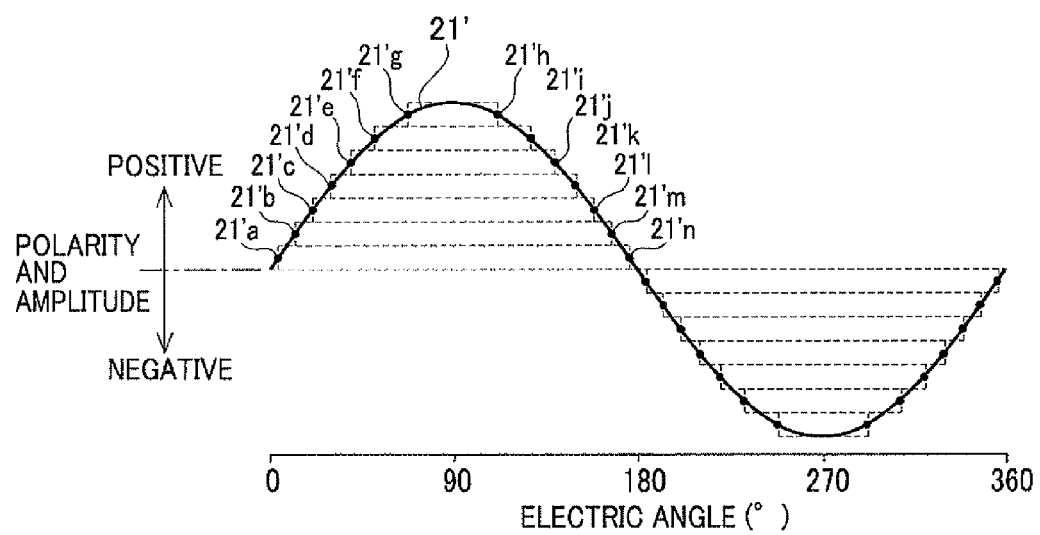
FIG. 14A is a graph showing induced voltage to be generated in a sine wave coil.

FIG. 14A is a graph showing the magnitude of induced voltage which may be generated by the coil wires in each set when uniform magnetic fluxes in the same direction pass through the sine wave coil 21, the magnitude being expressed in the form of waveforms 21'*a*-21'*n*, 21'*b*-21'*m*, 21'*c*-21'*l*, 21'*d*-21'*k*, 21'*e*-21'*j*, 21'*f*-21'*i*, and 21'*g*-21'*h*. The magnitude of induced voltage which may be generated in the entire sine wave coil 21 is represented by a waveform 21'. As above, since each sine wave coil 21 is constituted of the seven sets of coil wires 21*a*-21*n*, 21*b*-21*m*, 21*c*-21*l*, 21*d*-21*k*, 21*e*-21*j*, 21*f*-21*i*, and 21*g*-21*h*, the induced voltage generated in the sine wave coil 21 can be expressed by an integration value in a range where the magnetic flux of a sine wave curve passes.

Figure 15B:
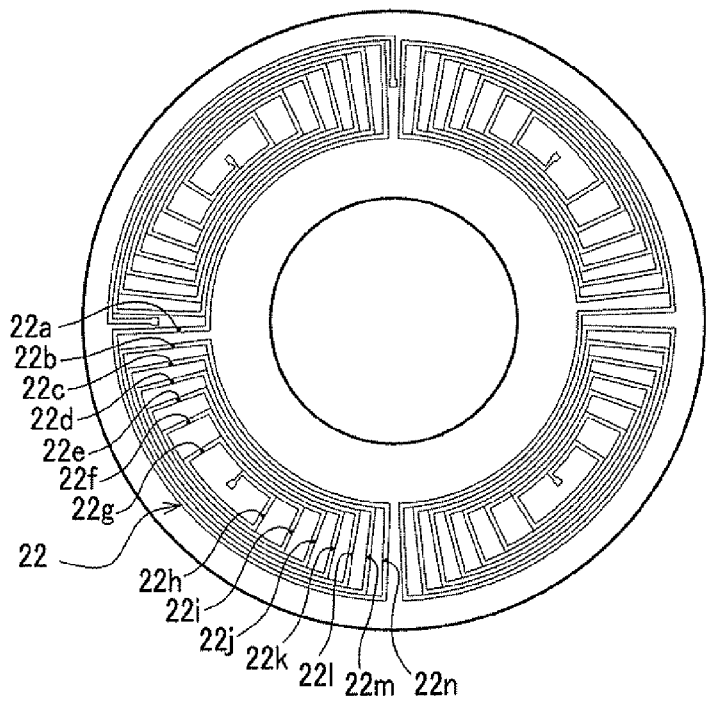
FIG. 15B is a view showing a wire conductive configuration of the cosine wave coil.

Similarly, FIG. 15B shows one example of the cosine wave coil 22. In this figure, the coils are illustrated on the same plane for facilitating viewing. Each of four coil parts of the cosine wave coil 22 is constituted of sevens sets of coil wires 22*a*-22*n*, 22*b*-22*m*, 22*c*-22*l*, 22*d*-22*k*, 22*e*-22*j*, 22*f*-22*i*, and 22*g*-22*h*.

Figure 14B:
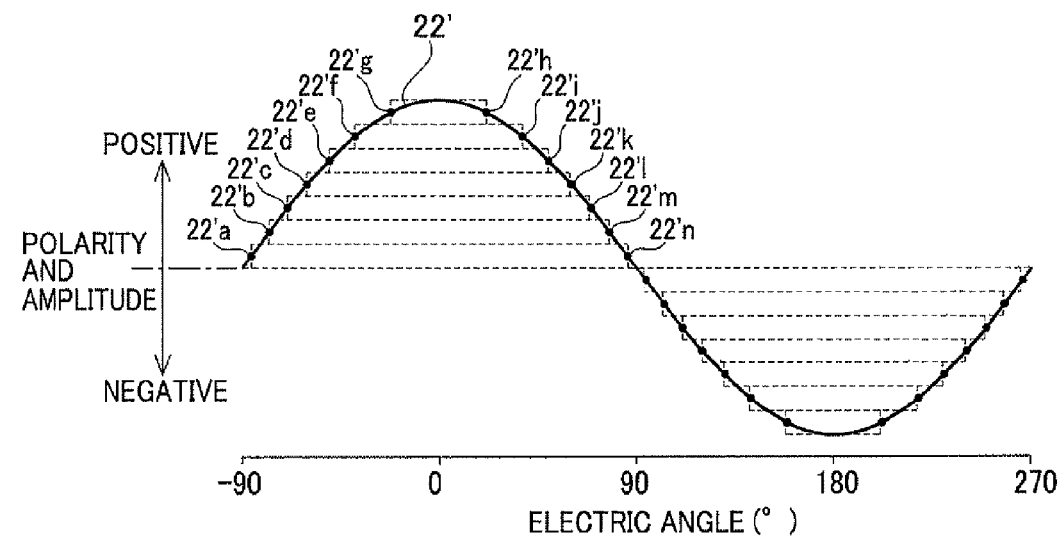
FIG. 14B is a graph showing induced voltage to be generated in a cosine wave coil.

FIG. 14B is a graph showing the magnitude of induced voltage which may be generated by the coil wires in each set when uniform magnetic fluxes pass through the cosine wave coil 22 in the same direction, the magnitude being expressed in the form of waveforms 22′a-22′n, 22′b-22′m, 22′c-22′l, 22′d-22′k, 22′e-22′j, 22′f-22′i, and 22′g-22′h. The magnitude of induced voltage which may be generated in the entire cosine wave coil 22 is represented by a waveform 22′. As above, since each cosine wave coil 22 is constituted of the seven sets of coil wires 22a-22n, 22b-22m, 22c-22l, 22d-22k, 22e-22j, 22f-22i, and 22g-22h, the induced voltage generated in the cosine wave coil 22 can be expressed by an integration value in a range where the magnetic flux of a cosine wave curve passes.

In FIG. 10, (b) shows an induced voltage MA generated in the sine wave coil 21 and an induced voltage MB generated in the cosine wave coil 22 by the magnetic flux IA. In FIG. 10, (c) shows only the waveform 21′ shown in (a). In the electric angle range from 160° to 180°, a positive induced voltage (+MSA1) having an area indicated by MSA1 occurs. In the electric angle range from 180° to 340°, a negative induced voltage (−MSA2) having an area indicated by MSA2 occurs. As a result, the total induced voltage generated in the sine wave coil 21 is expressed by MA=+MSA1−MSA2. This is shown in FIG. 10 (b).

On the other hand, in FIG. 10, (d) shows only the waveform 22′ shown in (a). In the electric angle range from 160° to 270°, a negative induced voltage (−MSB1) having an area indicated by MSB1 occurs. In the electric angle range from 270° to 340°, a positive induced voltage (+MSB2) having an area indicated by MSB2 occurs. As a result, the total induced voltage generated in the cosine wave coil 22 is expressed by MB=+MSB2−MSB1. This is shown in FIG. 10 (b). The induced voltage MA and the induced voltage MB in FIG. 10 (b) are actual measurement values measured by a voltmeter.

For the induced voltage MA generated in the sine wave coil 21, high-frequency components are smoothed by the integration circuit 53 to calculate MAA. Further, for the induced voltage MB generated in the cosine wave coil 22, high-frequency components are smoothed by the integration circuit 54 to calculate MBB.

The computing unit 60 calculates a ratio of MAA to MBB (MAA/MBB). Based on this ratio MAA/MBB, an angular displacement of the resolver rotor 12 with respect to the resolver stator 13 can be determined. The computing unit 60 outputs the MAA/MBB as the angle data 61.

Figure 11:
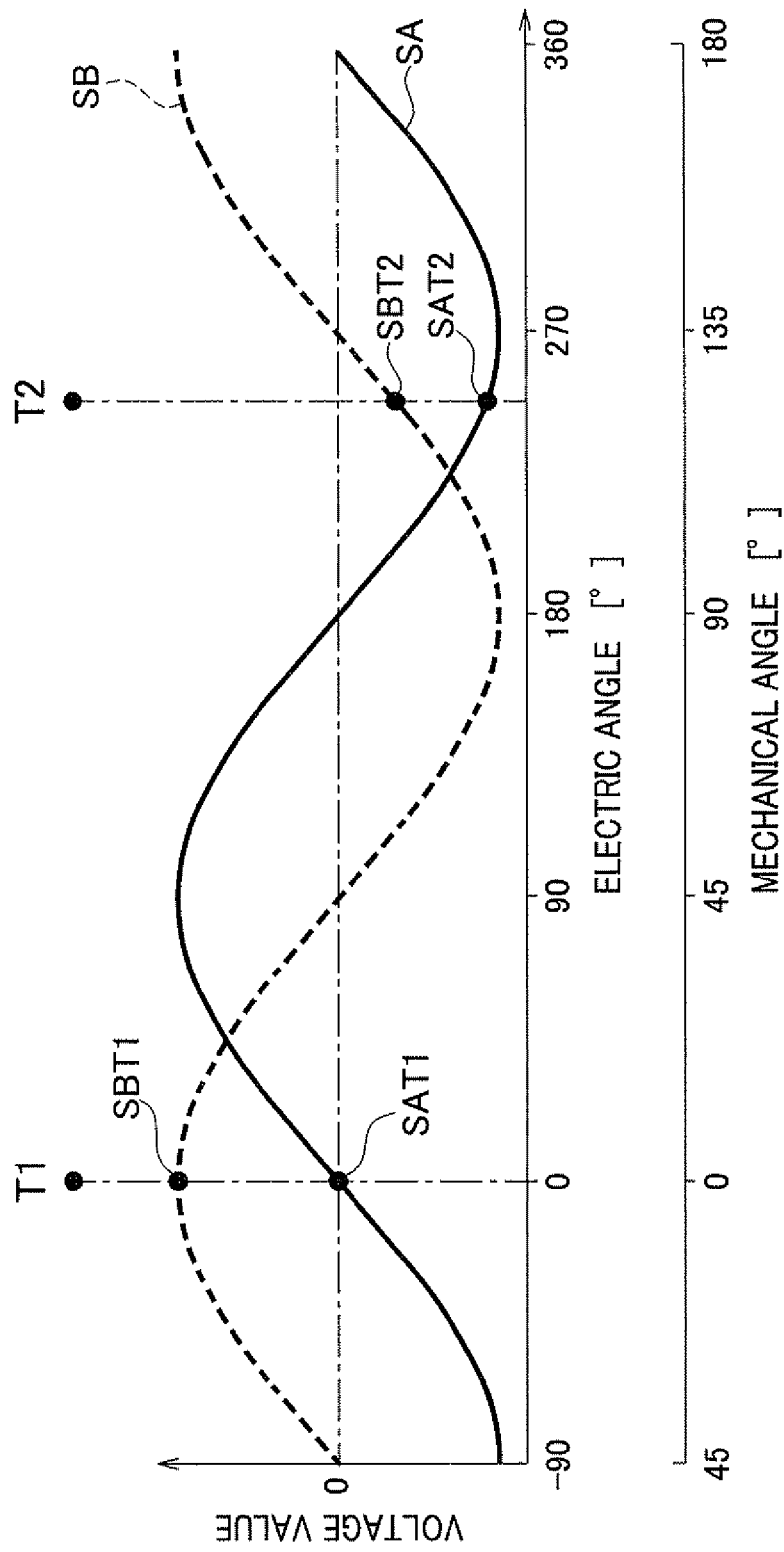
FIG. 11 is a graph showing the operations of the resolver when the resolver rotor is rotated.

The operations of the resolver 11 in which the resolver rotor 12 is rotated are shown in FIGS. 11 to 13. A graph in FIG. 11 takes an electric angle (−90° to 360°) and a mechanical angle (−45° to 180°) in a lateral axis and a voltage value in a vertical axis. The resolver 11 in the present embodiment is a 2X type so that the electric angle is double the mechanical angle. SA represents an output curve of the sine wave coil 21 and SB represents an output curve of the cosine wave coil 22.

Figure 12A:
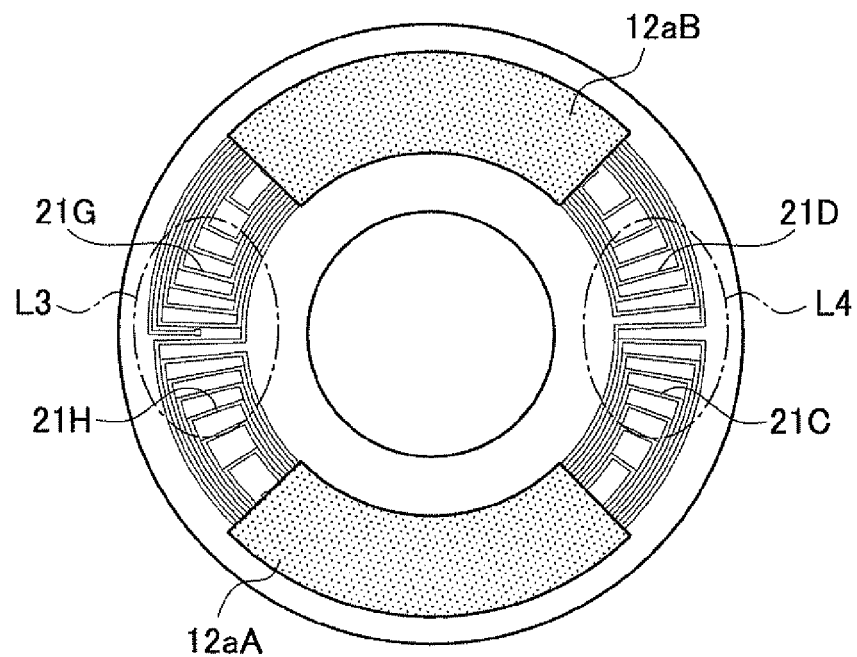
FIGS. 12A and 12B are views showing states of the resolver at time T1 in FIG. 10.
Figure 12B:
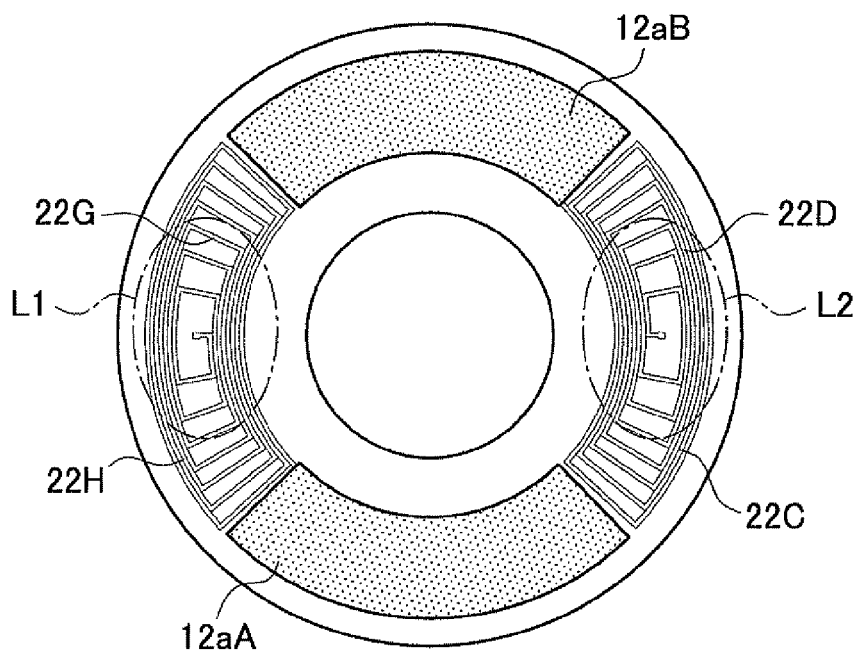

FIG. 12A shows a positional relationship between the sine wave coil 21 and the nonmagnetic conductive parts 12a (12aA and 12aB) at a rotor angle T1. FIG. 12B shows a positional relationship between the cosine wave coil 22 and the nonmagnetic conductive parts 12b (12aA and 12aB) at the rotor angle T1. For facilitating viewing, in FIGS. 12A and 12B, the sine wave coil 21 and the cosine wave coil 22 are illustrated on single planes respectively, different from FIG. 7. L1 to L4 indicate portions with strong magnetic flux IA in the positive direction.

At the rotor angle T1, the entire region of each split-coil segment 21C, 21D, 21G, and 21H of eight sine wave split-coil segments 21A to 21H of the sine wave coil 21 face the cutouts 12b of the resolver rotor 12. The entire region of each split-coil segment 21A, 21B, 21E, and 21F face the nonmagnetic conductive parts 12a (12aA and 12aB).

The magnetic fluxes IA generated by the excitation coil 23 are uniform in the same direction over the regions. Thus, the induced voltages generated in the first sine wave coil 21BC and the second sine wave coil 21DE are equal in absolute value but opposite in direction. Similarly, the induced voltages generated in the third sine wave coil 21FG and the fourth sine wave coil 21HA are equal in absolute value but opposite in direction.

On the other hand, in the regions of the nonmagnetic conductive parts 12a (12aA and 12aB), the magnetic flux IA is canceled by the magnetic flux IB generated by the eddy current. Thus, no induced voltage occurs in the sine wave coil 21. Accordingly, the voltage value generated in the sine wave coil 21 is zero (SAT1).

In the present embodiment, the integration of induced voltage values for a predetermined period of time is calculated by the integration circuit 53 shown in FIG. 3 in order to obtain the induced voltage value of the sine wave coil 21.

On the other hand, at a rotor angle T1, the entire region of each split-coil segment 22C, 22D, 22G and 22H of eight cosine wave split-coil segments 22A to 22H face the cutouts 12b (12bA and 12bB) of the resolver rotor 12. The entire region of each split-coil segments 22A, 22B, 22E, and 22F face the nonmagnetic conductive parts 12a (12aA and 12aB).

The magnetic fluxes IA generated by the excitation coil 23 are uniform in the same direction over the regions. Thus, maximum induced voltage occurs in the second cosine wave coil 22CD. Similarly, maximum induced voltage occurs in the fourth cosine wave coil 22GH. No induced voltage occurs in the first cosine wave coil 22AB and the third cosine wave coil 22EF.

On the other hand, in the regions of the nonmagnetic conductive parts 12a (12aA and 12aB), the magnetic flux IA is canceled by the magnetic flux IB generated by the eddy current. Thus, no induced voltage occurs in the cosine wave coil 22. Accordingly, the voltage value generated in the cosine wave coil 22 is zero (SBT1).

In the present embodiment, the integration of induced voltage values for a predetermined period of time is calculated by the integration circuit 54 shown in FIG. 3 in order to obtain the induced voltage value of the cosine wave coil 22.

Figure 13A:
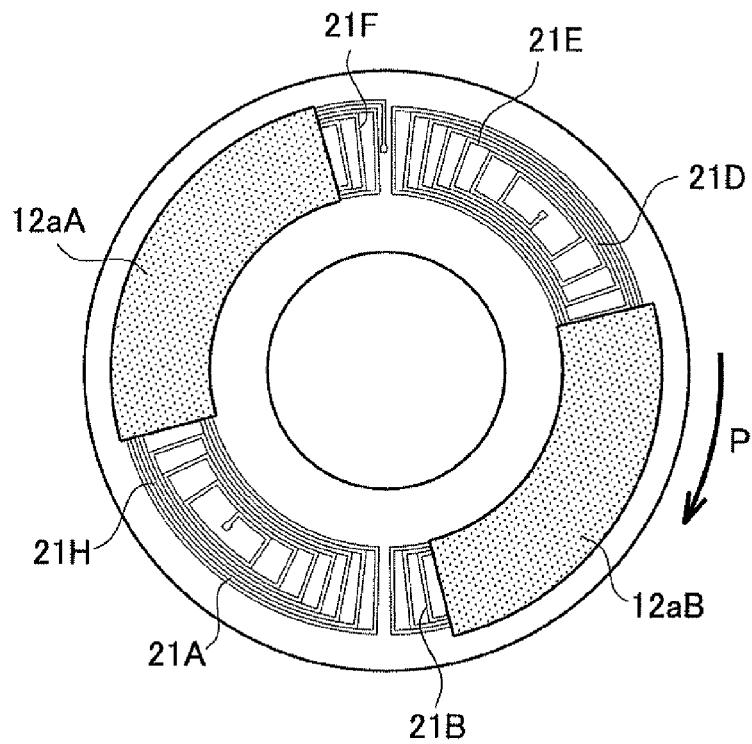
FIGS. 13A and 13B are views showing states of the resolver at time T2 in FIG. 10.
Figure 13B:
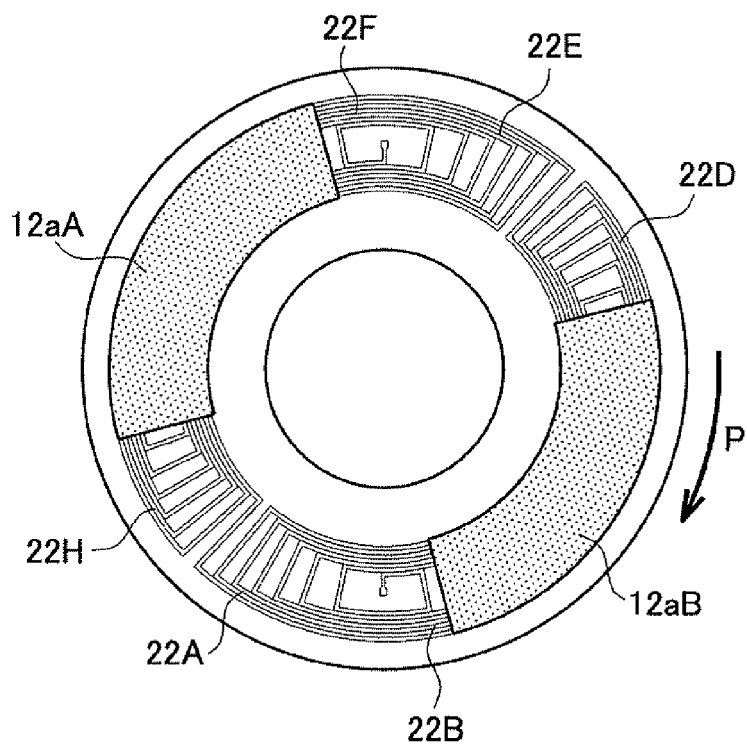

FIG. 13A shows a positional relationship between the sine wave coil 21 and the nonmagnetic conductive parts 12a (12aA and 12aB) at a rotor angle T2. FIG. 13B shows a positional relationship between the cosine wave coil 22 and the nonmagnetic conductive parts 12a (12aA and 12aB) at the rotor angle T2. In FIGS. 13A and 13B, for facilitating viewing, the sine wave coil 21 and the cosine wave coil 22 are illustrated on single planes respectively, different from FIG. 7. This state shows that the resolver rotor 12 not shown has been rotated from the rotor angle T1 by an electric angle of 240° (a mechanical angle of 120°) in a direction indicated by an arrow P in FIGS. 13A and 13B.

At the rotor angle T2, the entire region of each split-coil segment 21E and 21A and a partial region of each split-coil segment 21D, 21F, 21H, and 21B of eight sine wave split-coil segments 21A to 21H face the cutouts 12b of the resolver rotor 12. The entire region of each split-coil segment 21G and 21C and a partial region of each split-coil segment 21D, 21F, 21H, and 21B face the nonmagnetic conductive parts 12a (12aA and 12aB).

The magnetic fluxes IA generated by the excitation coil 23 are uniform in the same direction over the regions. Thus, the induced voltages in opposite directions occur in the sine wave coil 21DE and the third sine wave coil 21FG. Similarly, the induced voltages in opposite directions occur in the fourth sine wave coil 21HA and the first sine wave coil 21BC.

In the regions of the nonmagnetic conductive parts 12*a* (12*a*A and 12*a*B), on the other hand, the magnetic flux IA is canceled by the magnetic flux IB generated by the eddy current. No induced voltage occurs in the sine wave coil 21. Accordingly, the voltage value generated in the sine wave coil 21 is a calculation value (SAT2).

At the rotor angle T2, the entire region of each split-coil segment 22E and 22A and a partial region of each split-coil segment 22D, 22F, 22H, and 22B of eight cosine wave split-coil segments 22A to 22H face the cutouts 12*b* of the resolver rotor 12. The entire region of each split-coil segment 22G and 22C and the partial region of each split-coil segment 22D, 22F, 22H, and 22B face the nonmagnetic conductive parts 12*a* (12*a*A and 12*a*B).

The magnetic fluxes IA generated by the excitation coil 23 are uniform in the same direction over the regions. Thus, the induced voltages in opposite directions occur in the second cosine wave coil 22CD and the third cosine wave coil 22EF. Similarly, the induced voltages in opposite directions occur in the fourth cosine wave coil 22GH and the second cosine wave coil 22AB.

On the other hand, in the regions of the nonmagnetic conductive parts 12*a* (12*a*A and 12*a*B), the magnetic flux IA is canceled by the magnetic flux 113 generated in the eddy current. Thus, no induced voltage occurs in the cosine wave coil 22. Accordingly, the voltage value generated in the cosine wave coil 22 is a calculated value (SBT2).

At the rotor angle T1, the computing unit 60 calculates a ratio (SAT1/SBT1) between the integration value SAT1 of the induced voltage generated in the sine wave coil 21 and the integration value SBT1 of the induced voltage generated in the cosine wave coil 22. Based on this ratio: SAT1/SBT1, an angular displacement of the resolver rotor 12 with respect to the resolver stator 13 at the rotor angle T1 can be determined. The computing unit 60 outputs the ratio, SAT1/SBT1, as the angle data 61.

Similarly, at the rotor angle T2, the computing unit 60 calculates a ratio (SAT2/SBT2) between the integration value SAT2 of the induced voltage generated in the sine wave coil 21 and the integration value SBT2 of the induced voltage generated in the cosine wave coil 22. Based on this ratio: SAT2/SBT2, the angular displacement of the resolver rotor 12 with respect to the resolver stator 13 at the rotor angle T2 can be determined. The computing unit 60 outputs the ratio, SAT2/SBT2, as the angle data 61.

Figure 16:
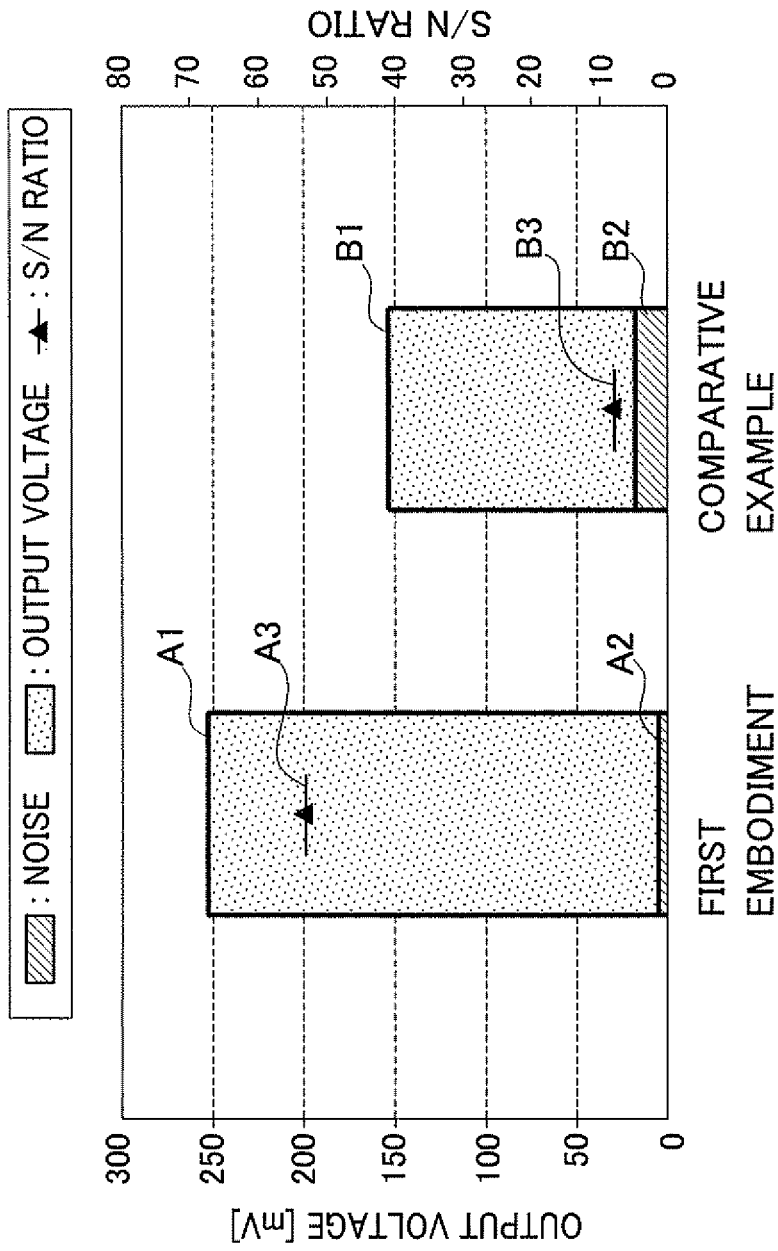
FIG. 16 is a data diagram showing effects of the first embodiment.

FIG. 16 is a graph showing experimental data on the resolver 11 in the first embodiment. In the graph, a lateral axis represents the resolver 11 of the present embodiment and a resolver of a comparative example and a vertical axis represents output voltage and S/N ratio. The resolver of the comparative example includes a resolver rotor made of a magnetic conductive material and formed with cutouts identical to those of the resolver 11.

In the resolver 11 of the present embodiment, output voltage A1 is 250 mV, noise A2 is 4.5 mV, and S/N ratio A3 is about 55. In the resolver of the comparative example, output voltage B1 is 150 mV, noise B2 is 19 mV, and S/N ratio is about 8.

From the above experiment, it was confirmed that even the resolver of the comparative example including the resolver rotor made of the magnetic conductive material could be practically used as a rotation angle sensor as well as that the resolver 11 including the resolver rotor made of the nonmagnetic conductive material achieves a very high S/N ratio and excellent characteristics.

As explained in detail above, according to the resolver 11 of the present embodiment, the rotation angle sensor includes the resolver stator 13 provided with the excitation coil 23 in which the excitation signal is to be input and the detection coils (the sine wave coil 21 and the cosine wave coil 22) which output the detection signal, and the resolver rotor 12 rotatably placed to face the stator 13. The resolver stator 13 is formed on the stator flat plate. The resolver rotor 12 is made of the rotor flat plate having a flat plate shape. The stator flat plate and the rotor flat plate are placed to face in parallel with each other. The rotor flat plate is formed with the cutouts 12*b*. Accordingly, the resolver 11 can have a reduced diameter. Since there is no need to form protrusions and recesses in the rotor flat plate, a cost reduction can also be realized.

Furthermore, the resolver rotor 12 is formed with the nonmagnetic conductive parts 12*a* (12*a*A and 12*a*B) and the cutouts 12*b* (12*b*A and 12*b*B) alternately arranged in the places facing the resolver stator 13. In the sine wave coil 21 and the cosine wave coil 22 facing the cutouts 12*b* (12*b*A and 12*b*B) of the resolver rotor 12, respective predetermined detection currents flow. To be specific, when the excitation signal (the sine wave signal) is input to the excitation coil 23, the predetermined magnetic flux IA in the positive direction occurs in the excitation coil 23. The magnetic flux IA passes through the cutouts 12*b* of the resolver rotor 12 and forms a magnetic circuit. The generated magnetic flux IA thus generates the induced voltage.

On the other hand, little detection current flows in the parts of the sine wave coil 21 and the cosine wave coil 22 facing the nonmagnetic conductive parts 12*a* (12*a*A and 12*a*B) of the resolver rotor 12. The reason thereof is as follows. On the surface of the nonmagnetic conductive parts 12*a* (12*a*A and 12*a*B), the magnetic flux IA generated by the excitation coil 23 generates an eddy current. The generated eddy current causes the magnetic flux IB to occur in the negative direction (opposite to the positive direction). The magnetic flux IA in the positive direction generated by the excitation coil 23 and the magnetic flux IB in the negative direction generated by the eddy current cancel each other, so that no current flows in the detection coils 21 and 22.

As compared with the technique of Patent Literature 2, the present embodiment needing no rotary transformer can achieve a higher S/N ratio. The technique of Patent Literature 2 provides an S/N ratio of about 4, whereas the present embodiment can achieve an S/N ratio of 50 or higher.

The detection coil 21 includes the eight sine wave split-coil segments 21A to 21H sequentially connected to each other and the detection coil 22 includes the eight cosine wave split-coil segments 22A to 22H sequentially connected to each other. The sine wave split-coil segments 21A, 21C, 21E, and 22G and the cosine wave split-coil segments 22B, 22D, 22F, and 22H are formed in the first coil layer. The sine wave split-coil segments 21B, 21D, 21F, and 21H and the cosine wave split-coil segments 22A, 22C, 22E, and 22G are formed in the second coil layer, the second coil layers being formed in overlapping relation with the first coil layer. Even when a clearance between the resolver stator 13 and the resolver rotor 12 is changed by attachment of the resolver 11, the positional relationship between the sine wave coil 21 and the resolver rotor 12 and the positional relationship between the cosine wave coil 22 and the resolver rotor 12 are always maintained constant. This can reduce an error caused by the attachment of the resolver 11.

In the present embodiment, the eight sets of conductive wires of the excitation coils 23A and 23B are equal in the number of winding turns and the winding direction, and placed in a single polarity in the circumferential direction.

Accordingly, the excitation signal can be excited under uniform conditions over the entire circumferences of the excitation coils 23A and 23B.

In the present embodiment, the carrier wave of 500 kHz is amplitude-modulated to produce the signal wave of 7.8125 kHz. The angle detection is performed by the signal wave. The induced voltage value by the carrier wave is integrated. Accordingly, the carrier wave is less likely to be influenced by motor noise (most thereof is in the vicinity of 10 kHz) and therefore a higher S/N ratio can be obtained.

Since the high frequency of 500 kHz is used, each detection coil can have the reduced number of winding turns and be made in flat plate form. As compared with the technique of Patent Literature 1, accordingly, the size of the resolver in the axial direction can be shortened.

In the present embodiment, the detection coil is configured to exhibit 2X (even polarities). In the case where the resolver is used with a gap or clearance in the axial direction, errors of output signals caused by the inclination of the axis can be equalized.

The seven sets of coil wires 21a-21n, 21b-21m, 21c-21l, 21d-21k, 21e-21j, 21f-21i, and 21g-21h constituting the sine wave coil 21 are arranged so that the induced voltage to be generated in the sine wave coil 21 corresponds to the integration value of a sine wave curve in the range through which the magnetic flux passes. The seven sets of coil wires 22a-22n, 22b-22m, 22c-22l, 22d-22k, 22e-22j, 22f-22i, and 22g-22h constituting the cosine wave coil 22 are arranged so that the induced voltage to be generated in the cosine wave coil 22 corresponds to the integration value of a cosine wave curve in the range through which the magnetic flux passes. Accordingly, the resolver rotor 12 has only to be formed with the cutouts 12b without including protrusions and recesses in the flat plate, so that the detection coil can obtain as a whole an appropriate detection signal.

In a VR resolver, specifically, a signal is obtained at the same time over the entire circumference. Thus, a gap or clearance between the resolver rotor and the resolver stator has to be changed periodically over the entire circumference. In the resolver 11 of the present embodiment, however, the position of the winding (the coil wire) itself of the detection coil (the sine wave coil 21 and the cosine wave coil 22) are arranged to output the detection signal of a sine or cosine wave form by changing the range through which the magnetic flux passes according to the angle of the resolver rotor 12 when the uniform magnetic fluxes act n the same direction. Even if the gap or clearance between the resolver rotor and the resolver stator is constant, the currents generated in the detection coils (the sine wave coil 21 and the cosine wave coil 22) do not cancel each other. Accordingly, the resolver rotor 12 does not have to be formed with protrusions and recessed in the surface.

The resolver 11 in the present embodiment uses the signal wave of 7.8125 kHz=500 kHz/64 based on the high-frequency carrier wave of 500 kHz. This can reduce the number of winding turns of the detection coil to seven turns. Since the number of turns is as small as seven, the coil wires can be formed in spiral shape on the flat plate. Accordingly, the position of each coil wire can be arranged to output the detection signal of a sine wave or cosine wave form by changing the range through which the magnetic flux passes according to the angle of the resolver rotor 12 when the uniform magnetic fluxes act in the same direction. Further, the resolver stator 13 and the resolver rotor 12 can be formed in flat plate shape respectively and arranged to face each other in parallel positions.

(A) The position of the winding (the coil wire) itself of the detection coil (the sine wave coil 21 and the cosine wave coil 22) can be arranged to output the detection signal of a sine or cosine wave form by changing the range through which the magnetic flux passes according to the angle of the resolver rotor 12 when the uniform magnetic fluxes act in the same direction. (B) The magnetic fluxes only in the same direction are generated as the excitation signal. (C) The excitation coil 23 of the resolver stator 13, the detection coil (the sine wave coil 21 and the cosine wave coil 22), and the resolver rotor 12 are placed to face each other. Thus, even if the gap or clearance between the resolver rotor and the resolver stator is constant, the currents generated in the detection coils (the sine wave coil 21 and the cosine wave coil 22) do not cancel each other. Accordingly, the resolver rotor 12 does not have to be formed with protrusions and recessed in the surface.

In the VR resolver as in Patent Literature 1, the outer periphery of the resolver rotor is formed as a sine wave curve, leading to high cost. In the present embodiment, on the other hand, the resolver rotor 12 does not have to be formed in a sine wave curve shape, so that a large cost reduction can be realized.

The present invention is not limited to the first embodiment and may be embodied as below in other specific forms without departing from the essential characteristics thereof.

For instance, in the present embodiment, the sine wave coil 21 and the cosine wave coil 22 are divided respectively into eight split-coil segments. If a 1X coil is to be made, it may be arranged that the sine wave coil 21 is constituted of the first split-coil segment 21A, the second split-coil segment 21B, the third split-coil segment 21C, and the fourth split-coil segment 21D, and the cosine wave coil 22 is constituted of the first split-coil segment 22A, the second split-coil segment 22B, the third split-coil segment 22C, and the fourth split-coil segment 22D.

The present embodiment explains the amplitude resolver. However, the present invention relates to a resolver structure and therefore can also be applied to a phase difference resolver.

Second Embodiment

A second embodiment of an amplitude resolver according to the present invention will be explained below referring to accompanying drawings. The second embodiment is identical to the first embodiment excepting only the shape of a resolver rotor 102. Identical parts are given the same reference signs as those in the first embodiment and their explanations are not repeated herein.

Figure 17:
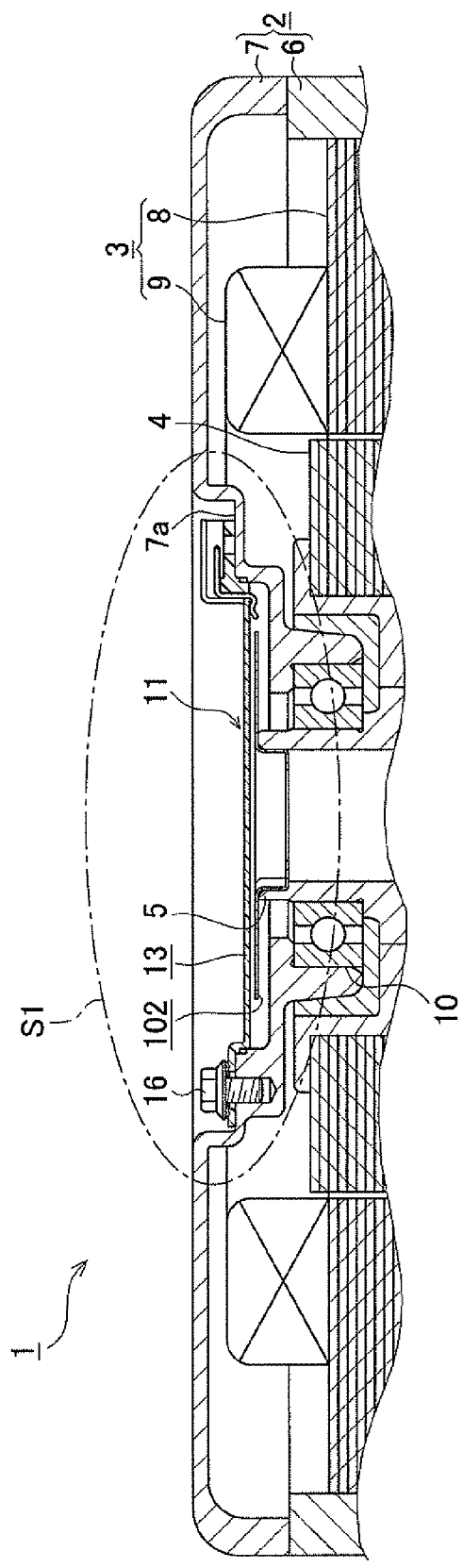
FIG. 17 is a sectional view showing one end part of a resolver-mounted motor in a second embodiment of the invention.
Figure 18:
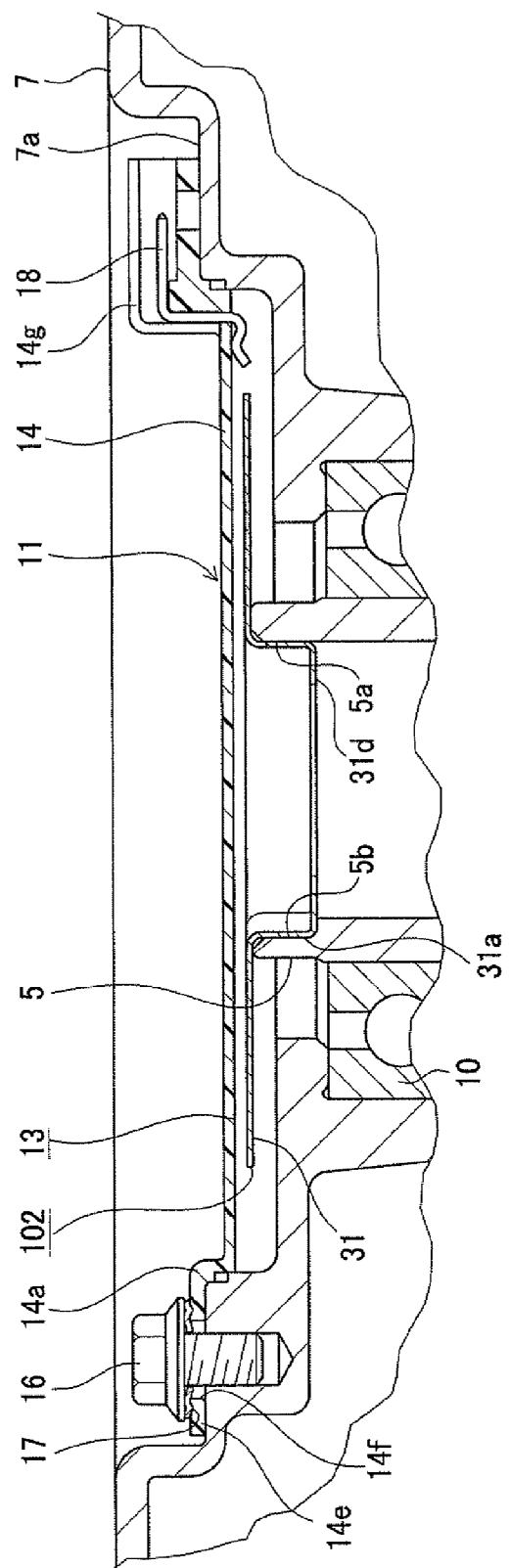
FIG. 18 is an enlarged sectional view showing a part encircled by a dashed line in FIG. 17.
Figure 19:
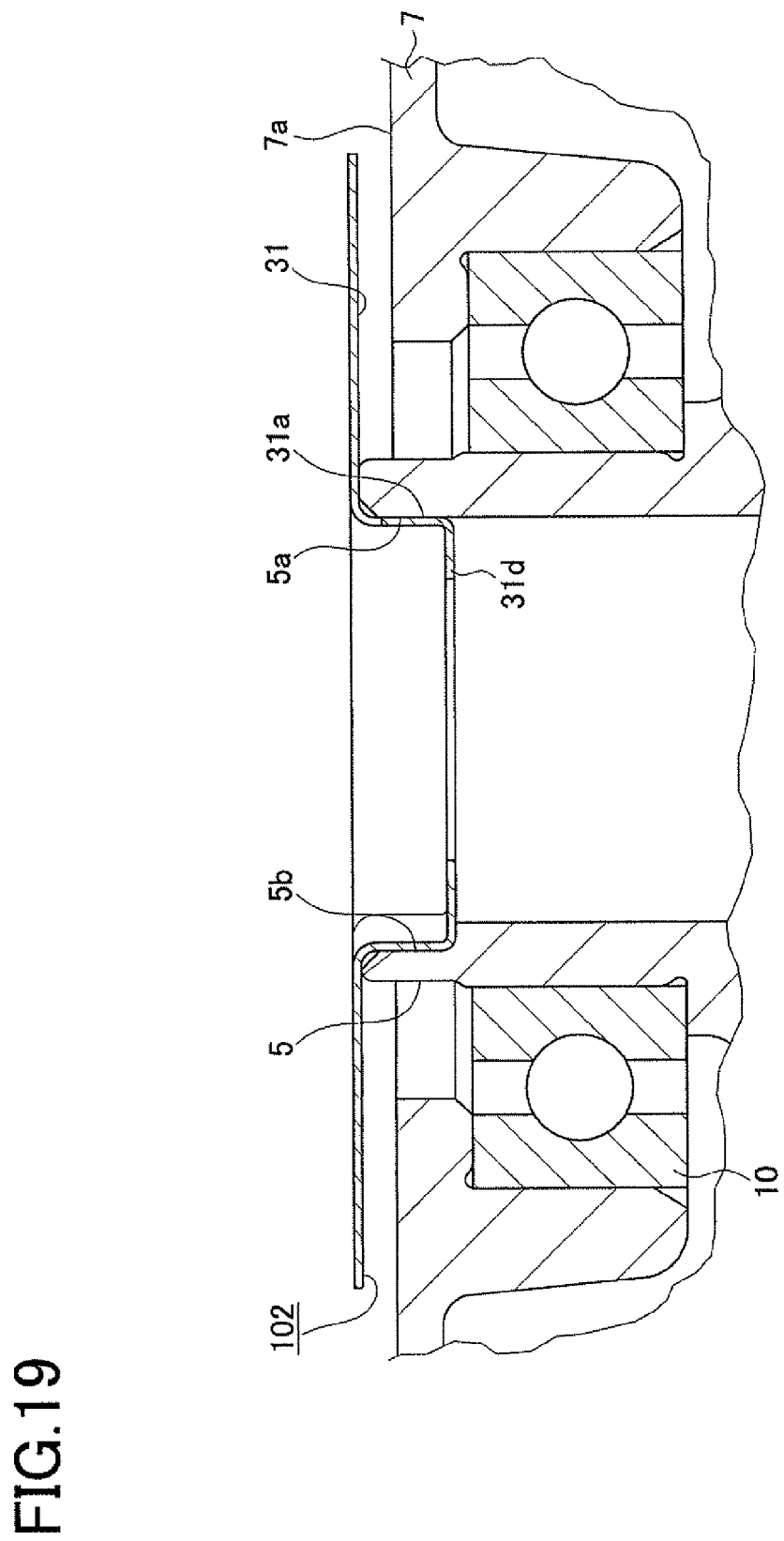
FIG. 19 is an enlarged sectional view of a part in FIG. 18.

FIG. 17 is a sectional view of one end part of a resolver-mounted motor 1 (hereinafter, simply referred to as a "motor"). FIG. 18 is an enlarged sectional view showing a part enclosed by a dashed line X1 in FIG. 17. FIG. 19 is an enlarged sectional view showing a part in FIG. 18. As shown in FIG. 17, the motor 1 includes a motor case 2, a motor stator 3 and a motor rotor 4 placed in the motor case 2, and a motor shaft 5 integrally provided in the center of the rotor 4. One end of the shaft 5 slightly protrudes out of the case 2. The case 2 includes a main case body 6A and an end plate 7 fixed to close an open end of the main case body 6A.

As shown in FIG. 17, the motor stator 3 is fixed to the main case body 6A. The stator 3 includes a stator core 8 and a coil 9. The motor rotor 4 is placed inside the stator 3. The motor shaft 5 is rotatably supported by a bearing 10 placed in the end plate 7 and another bearing (not shown) placed in an opposite end part of the motor case 2. In this embodiment, the shaft 5 is hollow, one end of which is formed with an opening 5a serving as a recess. This motor 1 is arranged so that when the coil 9 of the stator 3 is excited, the rotor 4 is rotated integral with the shaft 5.

As shown in FIGS. 17 and 18, the end plate 7 includes a recess 7a formed on the outer side thereof and around the motor shaft 5. In this embodiment, as shown in FIGS. 17 to 19, the resolver 11 is disposed in the recess 7a on the outside of the motor case 2. The resolver 11 includes a resolver rotor 102 and a resolver stator 13 spaced to face the rotor 102 with a predetermined clearance. The resolver rotor 102 is fixed at an end of the shaft 5 in the recess 7a of the end plate 7. The resolver stator 13 is similarly placed in the recess 7a and fixed to the end plate 7 so as to cover the resolver rotor 102.

A stator body 14 is fixed to the end plate 7 with a bolt 16. For this fixing, a flat spring washer 17 is mounted between the bolt 16 and a bracket 14e of the stator body 14.

A block diagram showing control of detecting the position of the resolver is the same as FIG. 3 in the first embodiment and thus the details are not repeated herein. The structures of a sine wave coil 21, a cosine wave coil 22, and an excitation coil 23 are the same as those in FIGS. 4 to 7 in the first embodiment and their details are not repeated herein.

Figure 20:
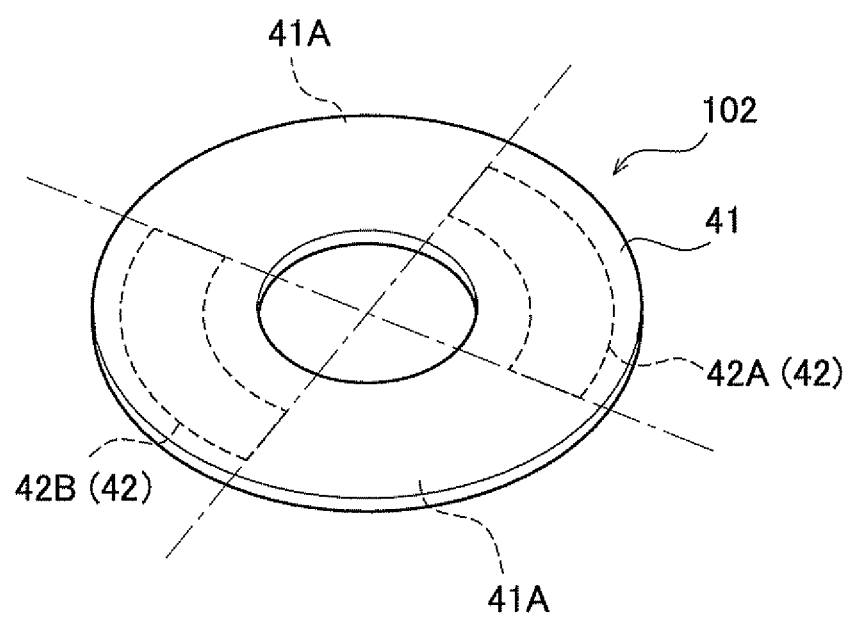
FIG. 20 is a perspective view of a resolver rotor in the second embodiment.

A structure of the resolver rotor 102 will be explained below referring to FIG. 20. A resolver base flat plate 41 having a hollow disc form is formed with magnetic parts 42 arranged in opposite two of four sections divided at each 90°. The base flat plate 41 is formed with a boss in the hollow part as shown in FIG. 17 but not illustrated in FIG. 20.

The base flat plate 41 in this embodiment is made of SUS305 (a nonmagnetic material) but may be made of any nonmagnetic material such as aluminum and brass.

The magnetic parts 42 are made as follows. Magnetic powder which is ferromagnetic material having a diameter of 1 to 30 μm and is coated with an insulating material over the outer periphery is applied in the form of paste with a thickness of 20 to 100 μm to the base flat plate 41 at the positions indicated in FIG. 20 according to a screen printing method, and dried to be fixed thereon. The magnetic powder is preferably selected from a ferromagnetic material having a high real part (10 to 100) of a magnetic permeability and a low imaginary part of the same. By high real part of the magnetic permeability, reversal of magnetization can smoothly follow the frequency even if an external magnetic field has a high frequency.

The manufacturing method and the structure of the resolver rotor 102 are not limited to the above. For example, it may be formed by adhering a sheet-like magnetic material, an electromagnetic steel plate, or an insulating material made of resin or the like and containing granular magnetic material dispersed therein to the resolver base flat plate 41.

The resolver rotor 102 is formed with the magnetic parts 42 in opposite two of four sections divided at each 90'. The sine wave coil 21 and the cosine wave coil 22 each include split-coil segments in eight sections divided at each 45°. Thus, the rotor 102 constitutes a 2X detection coil.

The operations of the resolver 11 having the above configurations are explained below. Since the operations are substantially the same as those in the first embodiment, only differences are explained in detail.

Figure 23:
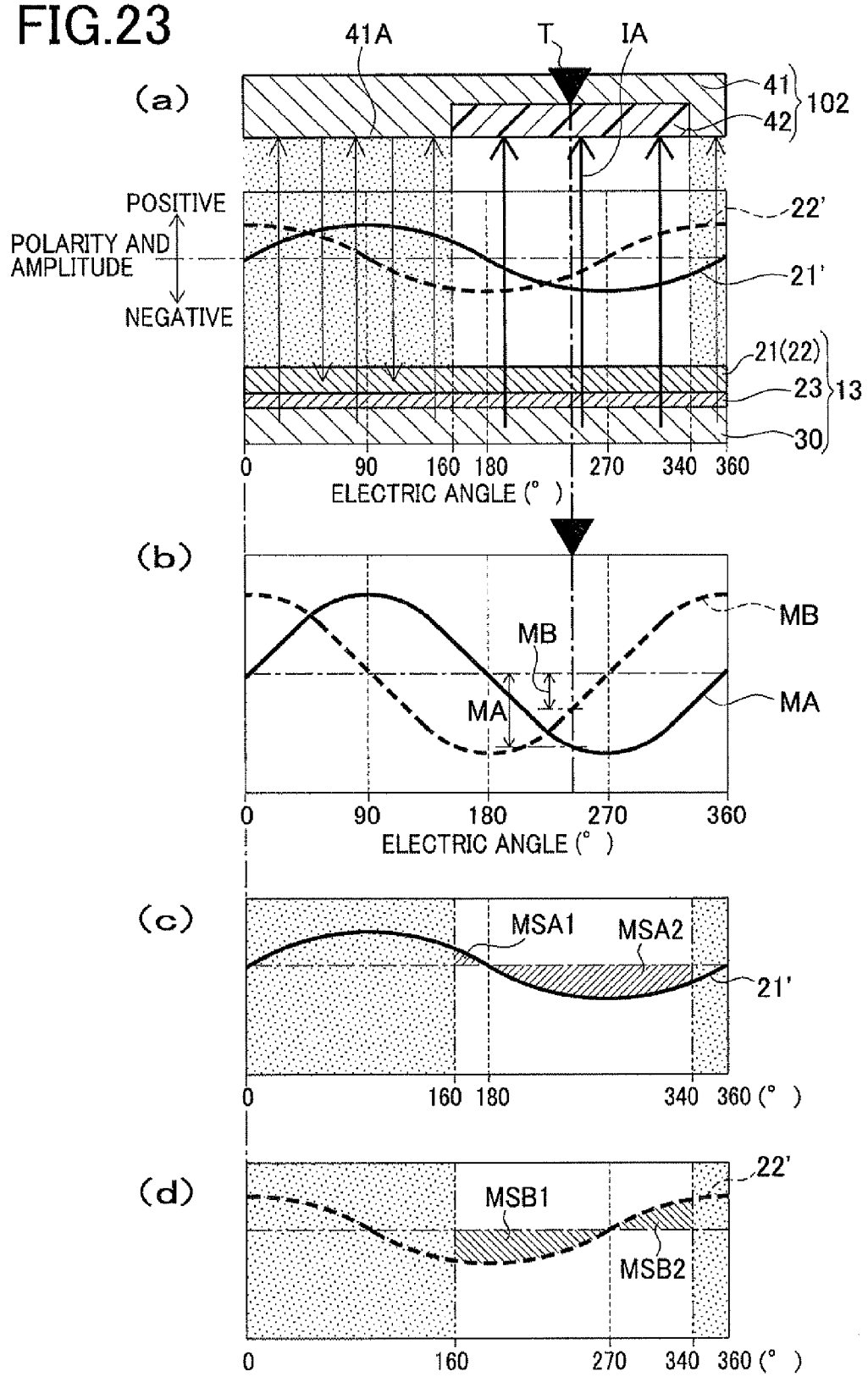
FIG. 23 is an explanatory view showing operations of the resolver in the second embodiment.
Figure 24:
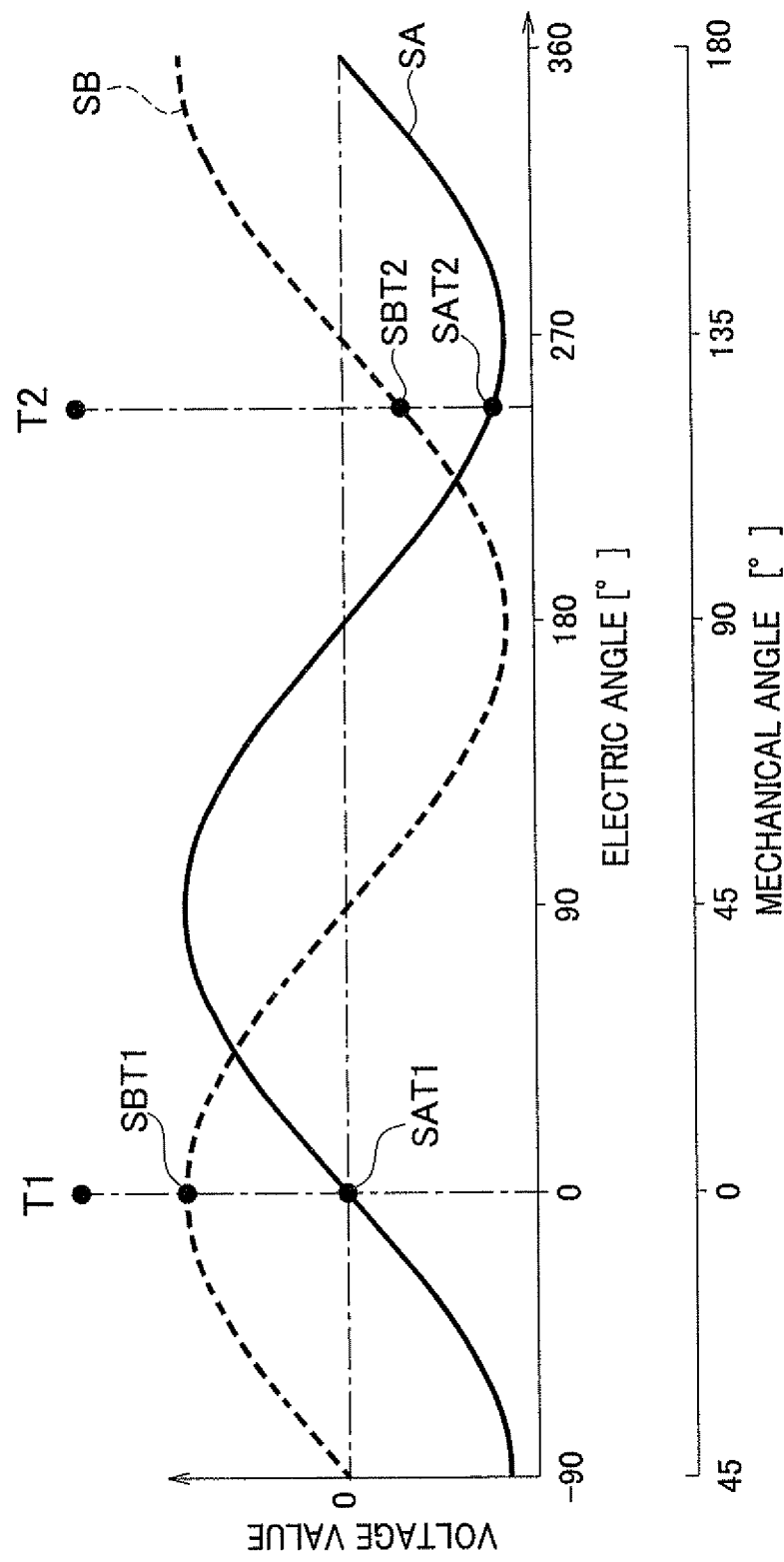
FIG. 24 is a graph showing operations of the resolver when the resolver rotor is rotated.

In FIG. 23, (a) shows a positional relationship between the resolver stator 13 (the stator base flat plate 30, the excitation coil 23, the sine wave coil 21, and the cosine wave coil 22) and the resolver rotor 102 (the rotor base flat plate 41 and the magnetic part 42) at a certain time. The positional relationship actually should appear in a circular graph but is depicted in a line graph for easy viewing.

An electric angle represented by a lateral axis is 360 degrees (a mechanical angle is 180 degrees because of a 2X coil). In the resolver stator 13, the excitation coil 23 is formed on the stator base flat plate 30 and further the sine wave coil 21 and the cosine wave coil 22 are formed on the excitation coil 23. The resolver rotor 102 is formed with the magnetic parts 42 in two places, each magnetic part being in a range of an electric angle of 180° (a mechanical angle is 90° because of a 2X coil). Between the magnetic parts 42, a nonmagnetic conductive part 41A is provided as a part of the rotor base flat plate 41.

Figure 21:
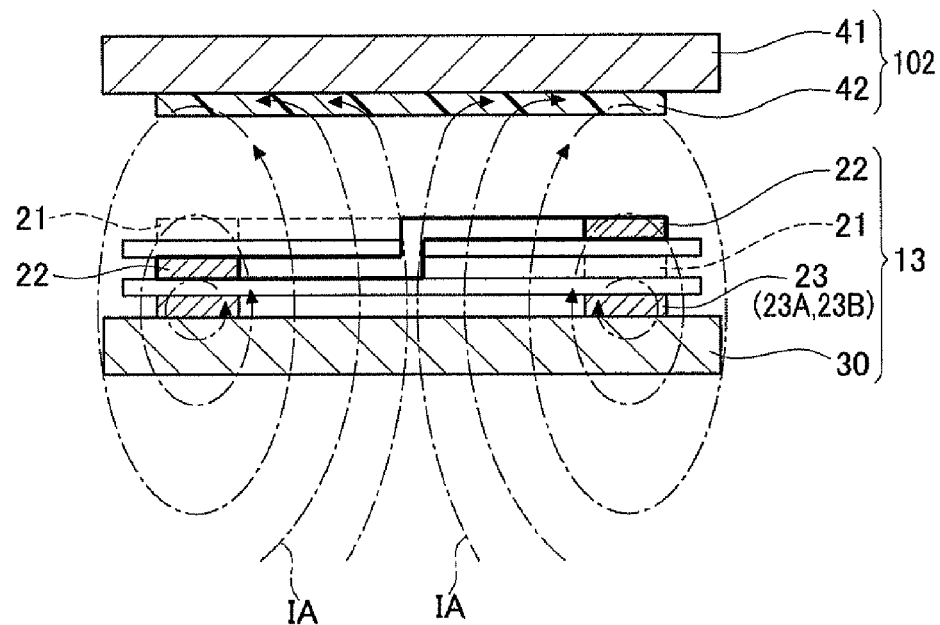
FIG. 21 is a first explanatory view of a part in FIG. 23.

FIG. 21 is a sectional view showing a portion of the resolver rotor 102 including the magnetic part 42 in FIG. 23 (a). When the excitation coil 23 (23A and 23B) receives a signal wave of 7.8125 kHz amplitude-modulated by the carrier wave of 500 kHz from the D/A converter 58, a magnetic flux IA corresponding to the current value occurs in the positive direction (representing the direction of magnetic flux generated in the magnetic coil). The magnetic flux IA is enhanced by the existence of the magnetic parts 42 made of a ferromagnetic material. The generation of the magnetic flux IA generates an induced voltage in the sine wave coil 21 and the cosine wave coil 22.

Figure 22:
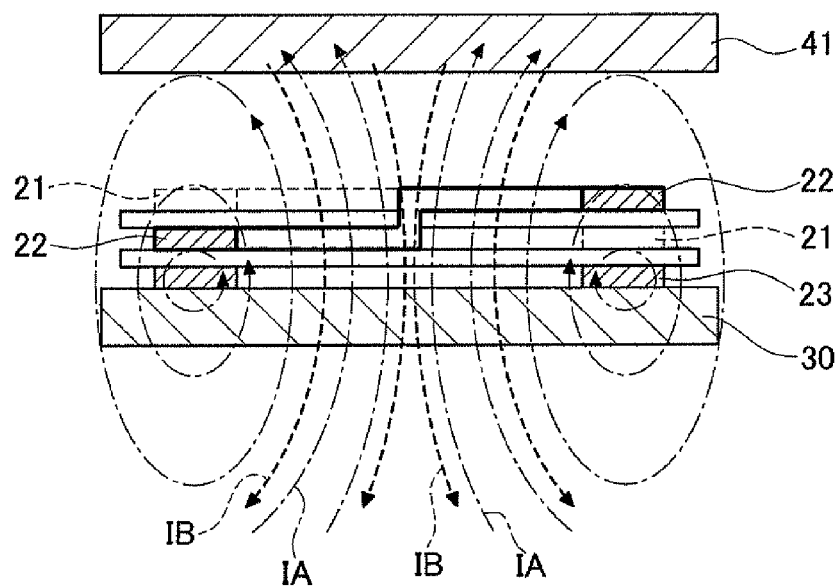
FIG. 22 is a second explanatory view of a part in FIG. 23.

On the other hand, FIG. 22 is a sectional view showing a part of the resolver rotor 102 having no magnetic part 42. In the part of the resolver rotor 102 having no magnetic part 42, the nonmagnetic conductive parts 41A of the base flat plate 41 made of nonmagnetic metal face the sine wave coil 21 and the cosine wave coil 22. When the excitation coil 23 (23A and 23B) receives a signal wave of 7.8125 kHz amplitude-modulated by the carrier wave of 500 kHz from the D/A converter 58, the magnetic flux IA corresponding to the current value occurs in the positive direction (representing the direction of magnetic flux generated in the magnetic coil).

However, if the magnetic flux IA enters the nonmagnetic conductive parts 41A made of nonmagnetic metal, an eddy current occurs on the surface of each nonmagnetic conductive part 41A. The generated eddy current generates a magnetic flux 113 in a negative direction (representing an opposite direction to the direction in which the magnetic flux is generated by the excitation signal). This magnetic flux IB cancels the magnetic flux IA in the positive direction generated by the excitation coil 23. Thus, the magnetic fluxes totally practically disappear as compared with the case shown in FIG. 21. In the state of FIG. 23 (a), consequently, it can be considered that the magnetic flux IA occurs only in the region (an electric angle of 160° to 340°) overlapping with the magnetic part 42.

In FIG. 23, (b) shows an induced voltage MA generated in the sine wave coil 21 and an induced voltage MB generated in the cosine wave coil 22 by the magnetic flux IA. In FIG. 23, (c) shows only the waveform 21' shown in (a). In the electric angle range from 160° to 180°, a positive induced voltage (+MSA1) having an area indicated by MSA1 occurs. In the electric angle range from 180° to 340°, a negative induced voltage (−MSA2) having an area indicated by MSA2 occurs. As a result, the total induced voltage generated in the sine wave coil 21 is expressed by MA=+MSA1−MSA2. This is shown in FIG. 23 (b).

On the other hand, in FIG. 23, (d) shows only the waveform 22' shown in (a). In the electric angle range from 160° to 270°, a negative induced voltage (−MSB1) having an area indicated by MSB1 occurs. In the electric angle range from 270° to 340°, a positive induced voltage (+MSB2) having an area indicated by MSB2 occurs. As a result, the total induced voltage generated in the cosine wave coil 22 is expressed by MB=+MSB2−MSB1. This is shown in FIG. 23 (b). The induced voltage MA and the induced voltage MB in FIG. 23 (b) are actual measurement values measured by a voltmeter.

For the induced voltage MA generated in the sine wave coil 21, high-frequency components are smoothed by the integration circuit 53 to calculate MAA. Further, for the induced voltage MB generated in the cosine wave coil 22, high-frequency components are smoothed by the integration circuit 54 to calculate MBB.

The computing unit 60 calculates a ratio of MAA to MBB (MAA/MBB). Based on this ratio MAA/MBB, an angular displacement of the resolver rotor 102 with respect to the resolver stator 13 can be determined. The computing unit 60 outputs the MAA/MBB as the angle data 61.

The operations of the resolver 11 in which the resolver rotor 102 is rotated are shown in FIGS. 24 to 26B. A graph in FIG. 24 takes an electric angle (−90° to 360°) and a mechanical angle (−45° to 180°) in a lateral axis and a voltage value in a vertical axis. The resolver 11 in the present embodiment is a 2X type so that the electric angle is double the mechanical angle. SA represents an output curve of the sine wave coil 21 and SB represents an output curve of the cosine wave coil 22.

Figure 25A:
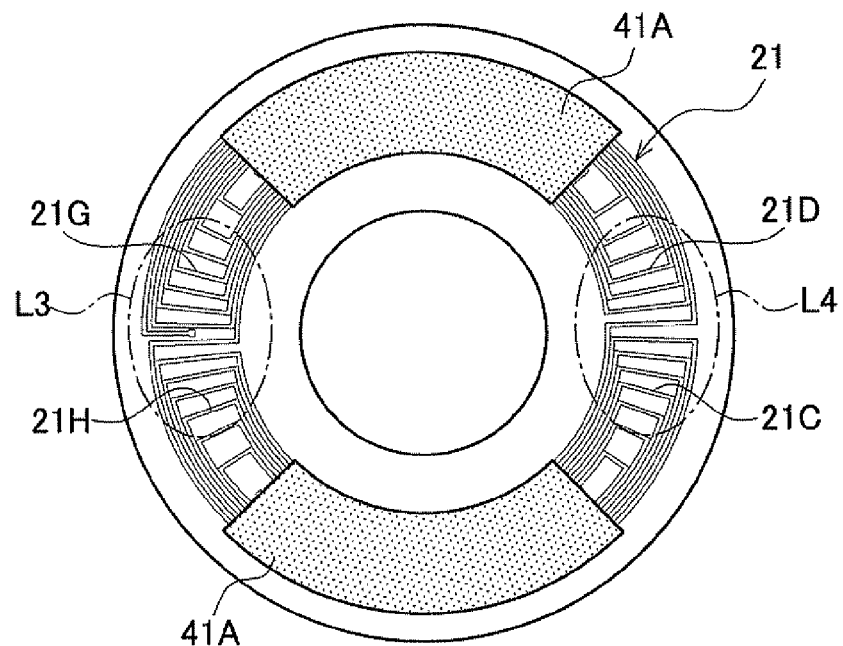
FIGS. 25A and 25B are views showing states of the resolver at time T1 in FIG. 24.
Figure 25B:
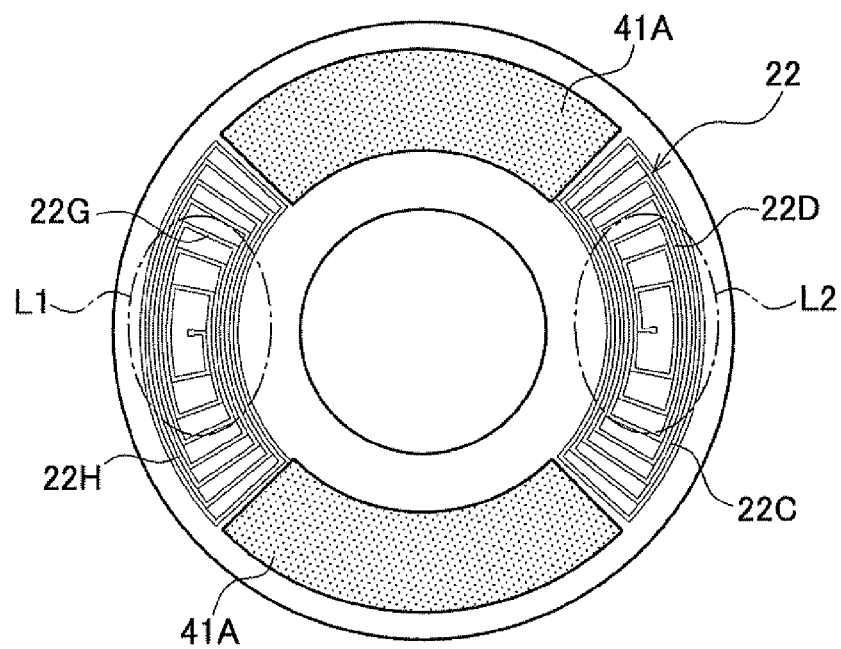

FIG. 25A shows a positional relationship between the sine wave coil 21 and the nonmagnetic conductive parts 41A at a rotor angle T1. FIG. 25B shows a positional relationship between the cosine wave coil 22 and the nonmagnetic conductive parts 41A at the rotor angle T1. For facilitating viewing, in FIGS. 25A and 25B, the sine wave coil 21 and the cosine wave coil 22 are illustrated on single planes respectively, different from FIG. 7. L1 to L4 indicate portions with strong magnetic flux IA in the positive direction.

At the rotor angle T1, the entire region of each split-coil segment 21C, 21D, 21G, and 21H of eight sine wave split-coil segments 21A to 21H of the sine wave coil 21 face the magnetic parts 42 (42A and 42B) of the resolver rotor 102. The entire region of each split-coil segment 21A, 21B, 21E, and 21F face the nonmagnetic conductive parts 41A.

The magnetic fluxes IA generated by the excitation coil 23 are uniform in the same direction over the regions. Thus, the induced voltages generated in the first sine wave coil 21BC and the second sine wave coil 21DE are equal in absolute value but opposite in direction. Similarly, the induced voltages generated in the third sine wave coil 21FG and the fourth sine wave coil 21HA are equal in absolute value but opposite in direction.

On the other hand, in the regions of the nonmagnetic conductive parts 41A, the magnetic flux IA is canceled by the magnetic flux IB generated by the eddy current and thus no induced voltage occurs in the sine wave coil 21. Accordingly, the voltage value generated in the sine wave coil 21 is zero (SAT1).

In the present embodiment, the integration of induced voltage values for a predetermined period of time is calculated by the integration circuit 53 shown in FIG. 3 in order to obtain the induced voltage value of the sine wave coil 21.

On the other hand, at a rotor angle T1, the entire region of each split-coil segment 22C, 22D, 22G and 22H of eight cosine wave split-coil segments 22A to 22H face the magnetic parts 42 (42A and 42B) of the resolver rotor 102. The entire region of each split-coil segments 22A, 22B, 22E, and 22F face the nonmagnetic conductive parts 41A.

The magnetic fluxes IA generated by the excitation coil 23 are uniform in the same direction over the regions. Thus, maximum induced voltage occurs in the second cosine wave coil 22CD. Similarly, maximum induced voltage occurs in the fourth cosine wave coil 22GH. No induced voltage occurs In the first cosine wave coil 22AB and the third cosine wave coil 22EF.

On the other hand, in the regions of the nonmagnetic conductive parts 41A, the magnetic flux IA is canceled by the magnetic flux IB generated by the eddy current. Thus, no induced voltage occurs in the cosine wave coil 22. Accordingly, the voltage value generated in the cosine wave coil 22 is zero (SBT1).

In the present embodiment, the integration of induced voltage values for a predetermined period of time is calculated by the integration circuit 54 shown in FIG. 3 in order to obtain the induced voltage value of the cosine wave coil 22.

Figure 26A:
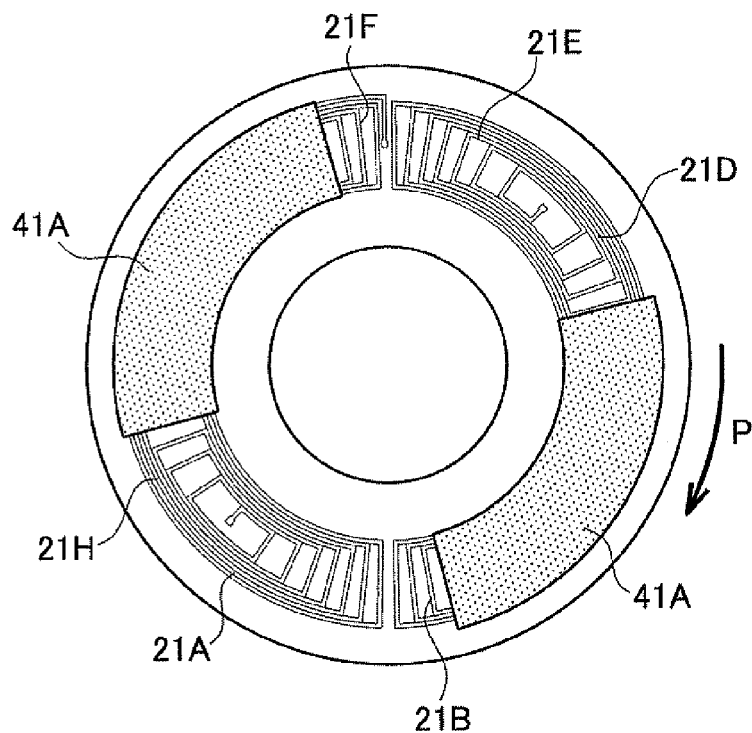
Figure 26B:
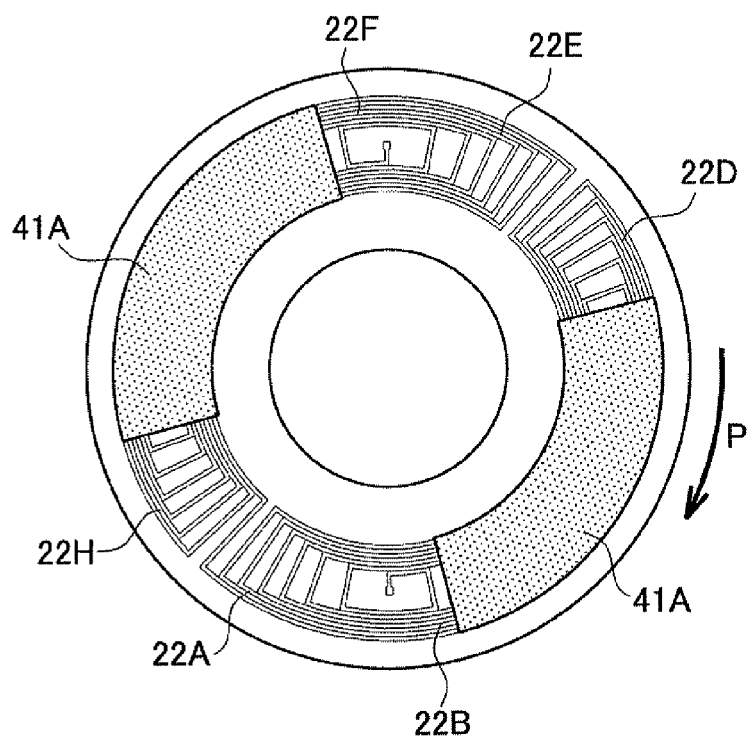
Figure 27:
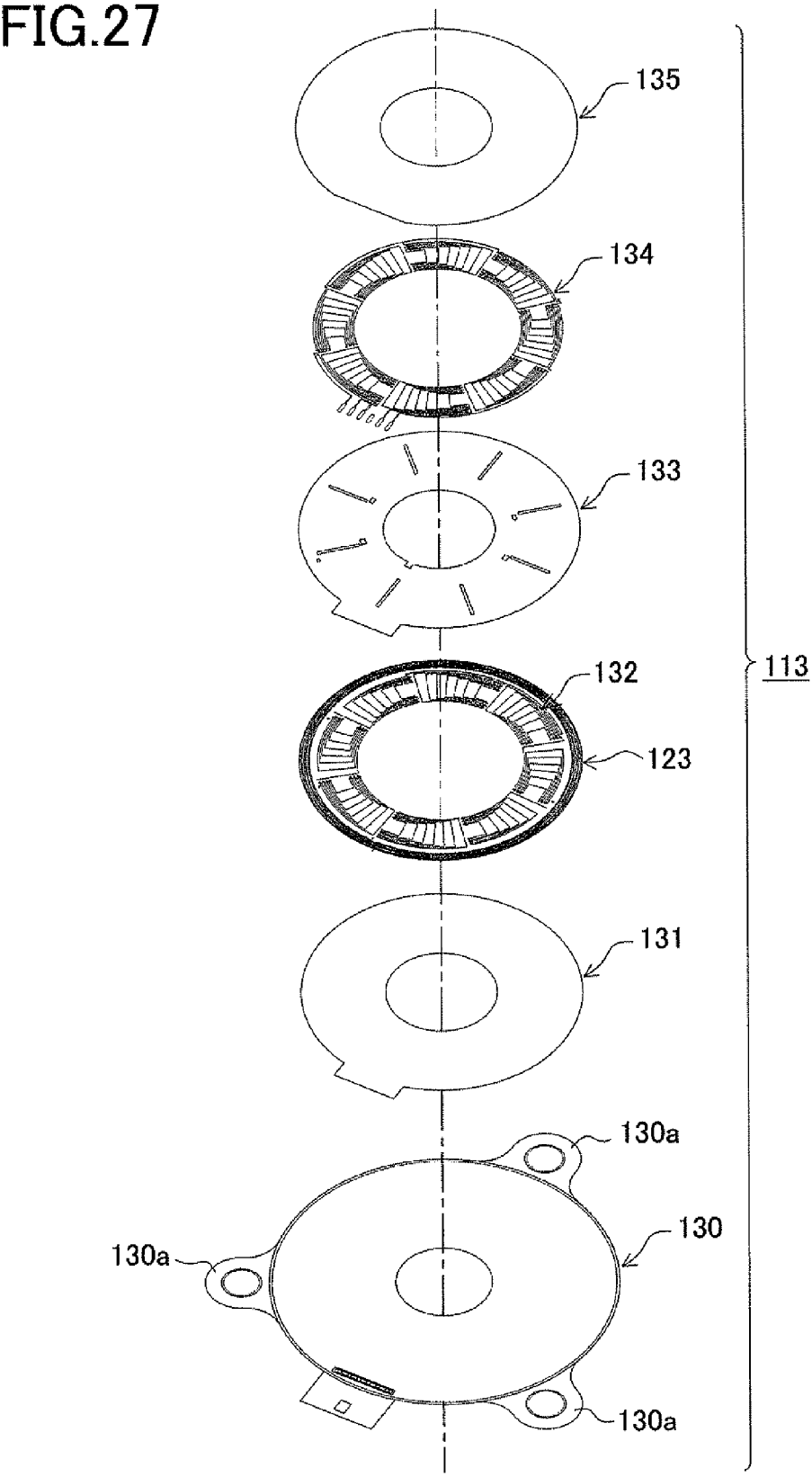
FIG. 27 is an enlarged perspective view showing a resolver stator in a third embodiment.

FIG. 26A shows a positional relationship between the sine wave coil 21 and the nonmagnetic conductive parts 41A at a rotor angle T2. FIG. 26B shows a positional relationship between the cosine wave coil 22 and the nonmagnetic conductive parts 41A at the rotor angle T2. In FIGS. 26A and 26B, for facilitating viewing, the sine wave coil 21 and the cosine wave coil 22 are illustrated on single planes respectively, different from FIG. 7. This illustrates a state where the resolver rotor 102 not shown has been rotated from the rotor angle T1 by an electric angle of 240° (a mechanical angle of 120°) in a direction indicated by an arrow P in FIGS. 26A and 26B.

At the rotor angle T2, the entire region of each split-coil segment 21E and 21A and a partial region of each split-coil segment 21D, 21F, 21H, and 21B of eight sine wave split-coil segments 21A to 21H face the magnetic parts 42 (42A and 42B) of the resolver rotor 102. The entire region of each split-coil segment 21G and 21C and a partial region of each split-coil segment 21D, 21F, 21H, and 21B face the nonmagnetic conductive parts 41A.

The magnetic fluxes IA generated by the excitation coil 23 are uniform in the same direction over the regions. Thus, the induced voltage occurs in opposite directions in the sine wave coil 21DE and the third sine wave coil 21FG. Similarly, the induced voltage occurs in opposite directions in the fourth sine wave coil 21HA and the first sine wave coil 21BC.

In the regions of the nonmagnetic conductive parts 41A, on the other hand, the magnetic flux IA is canceled by the magnetic flux IB generated by the eddy current, so that no induced voltage occurs in the sine wave coil 21. Accordingly, the voltage value generated in the sine wave coil 21 is a calculation value (SAT2).

At the rotor angle T2, the entire region of each split-coil segment 22E and 22A and a partial region of each split-coil segment 22D, 22F, 22H, and 22B of eight cosine wave split-coil segments 22A to 22H face the magnetic parts 42 of the resolver rotor 102. The entire region of each split-coil segment 22G and 22C and the partial region of each split-coil segment 22D, 22F, 22H, and 22B face the nonmagnetic conductive parts 41A.

The magnetic fluxes IA generated by the excitation coil 23 are uniform in the same direction over the regions. Thus, the induced voltages in opposite directions occur in the second cosine wave coil 22CD and the third cosine wave coil 22EF. Similarly, the induced voltages in opposite directions occur in the fourth cosine wave coil 22GH and the second cosine wave coil 22AB.

On the other hand, in the regions of the nonmagnetic conductive parts 41A, the magnetic flux IA is canceled by the magnetic flux IB generated in the eddy current, so that no induced voltage occurs in the cosine wave coil 22. Accordingly, the voltage value generated in the cosine wave coil 22 is a calculated value (SBT2).

At the rotor angle T1, the computing unit 60 calculates a ratio (SAT1/SBT1) between the integration value SAT1 of the induced voltage generated in the sine wave coil 21 and the integration value SBT1 of the induced voltage generated in the cosine wave coil 22. Based on this ratio: SAT1/SBT1, an angular displacement of the resolver rotor 102 with respect to the resolver stator 13 at the rotor angle T1 can be determined. The computing unit 60 outputs the ratio, SAT1/SBT1, as the angle data 61.

Similarly, at the rotor angle T2, the computing unit 60 calculates a ratio (SAT2/SBT2) between the integration value SAT2 of the induced voltage generated in the sine wave coil 21 and the integration value SBT2 of the induced voltage generated in the cosine wave coil 22. Based on this ratio: SAT2/SBT2, the angular displacement of the resolver rotor 102 with respect to the resolver stator 13 at the rotor angle T2 can be determined. The computing unit 60 outputs the ratio, SAT2/SBT2, as the angle data 61.

As explained in detail above, according to the resolver of the second embodiment, the resolver includes the resolver stator 13 provided with the excitation coil 23 in which the excitation signal is to be input and the detection coils 21 22 which output the detection signal, and the resolver rotor 102 rotatably placed to face the stator 13. The nonmagnetic conductive parts 41A and the magnetic parts 42 (42A and 42B) are alternately formed in the resolver rotor 102 in places facing the resolver stator 13. Accordingly, in the sine wave coil 21 and the cosine wave coil 22 facing the magnetic parts 42 of the resolver rotor 102, respective predetermined detection currents flow. Specifically, when the excitation signal (the sine wave signal) enters in the excitation coil 23, a predetermined amount of magnetic flux IA in the positive direction occurs in the excitation coil 23. The magnetic flux IA passes through the magnetic parts 42 of the resolver rotor 102 to form a magnetic circuit. Thus, the magnetic flux is frequently generated. Detection current which is an induced voltage generated by the generated magnetic flux IA becomes large.

On the other hand, the detection current hardly flows in the parts of the sine wave coil 21 and the cosine wave coil 22 facing the nonmagnetic conductive parts 41A of the resolver rotor 102. The reason thereof is explained. On the surface of the nonmagnetic conductive parts 41A, an eddy current is generated by the magnetic flux IA generated by the excitation coil 23. The generated eddy current produces a magnetic flux IB in a negative direction (representing an opposite direction to the positive direction). The magnetic flux IA in the positive direction generated by the excitation coil 23 and the magnetic flux IB in the negative direction generated by the eddy current cancel each other, so that no current flows in the parts of the detection coils 21 and 22 facing the nonmagnetic conductive parts 41A.

Herein, the present inventors experimentally confirmed the following fact. If a space is provided instead of the nonmagnetic conductive parts 41A, the magnetic flux in the negative direction resulting from the eddy current does not occur and thus a current flows in the detection coils 21 and 22. This results in a small difference in generated induced voltage between the space and the magnetic parts 42 and a poor S/N ratio. Thus, such a configuration could not be used as the resolver 11.

As compared with the technique of Patent Literature 2, the present embodiment needing no rotary transformer can achieve a higher S/N ratio. The S/N ratio in the technique of Patent Literature 2 is about 4, whereas the S/N ratio in the present embodiment is 30 or higher.

Furthermore, the rotor base flat plate 41 is made of nonmagnetic conductive metal and the magnetic parts 42 are formed by applying and drying the magnetic powder coated with the insulating material over the outer periphery. Accordingly, the resolver rotor 102 can be manufactured by simply applying the magnetic powder paste in the predetermined portions of the rotor base flat plate 41 made of the nonmagnetic metal (e.g., screen printing) and drying the paste. Thus, a higher manufacturing efficiency and a cost reduction of the resolver 11 can be achieved.

In the technique of Patent Literature 1, specifically, the resolver rotor has to be manufactured with high accuracy by machining. This results in an increase in manufacturing cost. According to the invention, on the other hand, the resolver rotor 12 can be manufactured by screen printing and hence a large cost reduction can be attained.

It is conventionally considered that a magnetic part having a thin thickness of about several tens μm is insufficient to generate a magnetic flux. However, the present inventors experimentally confirmed that a sufficient magnetic flux for the resolver is generated as long as the magnetic part of about several tens μm in thickness exists.

Further, the magnetic powder has a diameter of 1 to 30 μm and is coated with an insulating layer on the outer periphery. Accordingly, the magnetic powder particles are not electrically continuous with each other and thus no eddy current occurs.

The excitation coil 23 and the detection coils 21 and 22 are formed in layers on the stator base flat plate 30 of the resolver stator 13. The nonmagnetic conductive parts 41A and the magnetic parts 42 are formed on the rotor base flat plate 41 of the resolver rotor 102. Accordingly, the stator base flat plate 30 and the rotor base flat plate 41 are placed to face each other. Thus, the length of the resolver 11 in the axial direction of the rotation axis can be made shorter and entirely more compact than that in the conventional art.

The present invention is not limited to the first embodiment and may be embodied as below in other specific forms without departing from the essential characteristics thereof. For instance, in the second embodiment, each of the sine wave coil 21 and the cosine wave coil 22 are configured of eight split-coil segments to constitute a 2X coil. If a 1X coil is to be made, it may be arranged that the sine wave coil 21 is constituted of the first split-coil segment 21A, the second split-coil segment 21B, the third split-coil segment 21C, and the fourth split-coil segment 21D, and the cosine wave coil 22 is constituted of the first split-coil segment 22A, the second split-coil segment 22B, the third split-coil segment 22C, and the fourth split-coil segment 22D.

The second embodiment explains the amplitude resolver. However, the present invention relates to a resolver structure and therefore can also be applied to a phase difference resolver.

In the second embodiment, the method of forming the magnetic parts 42 of the resolver rotor 102 is achieved by applying and drying the magnetic powder coated with the insulating layer on the outer periphery. The magnetic parts may be formed by a method that disperses a granular magnetic material in an insulating material. According to this method, as compared with the method that coats the magnetic powder with the insulating layer, the magnetic parts can be made more simply, thus achieving cost reduction. Since the insulated magnetic powder is used, the eddy current generated in the magnetic material is small. This can diminish the magnetic field that passes through the detection coil and also increase the detection current.

Third Embodiment

A third embodiment of a resolver embodying the present invention will be explained below with reference to accompanying drawings.

In a resolver 11 in the third embodiment, a mounting structure thereof is identical to that in FIG. 1 in the first embodiment and its details are not repeated herein. Further, a structure of a resolver rotor 12 is identical to that in FIG. 2 in the first embodiment and its details are not repeated herein. A circuit section 11X is also identical to that in FIG. 3 in the first embodiment and its details are not repeated herein.

Figure 29:
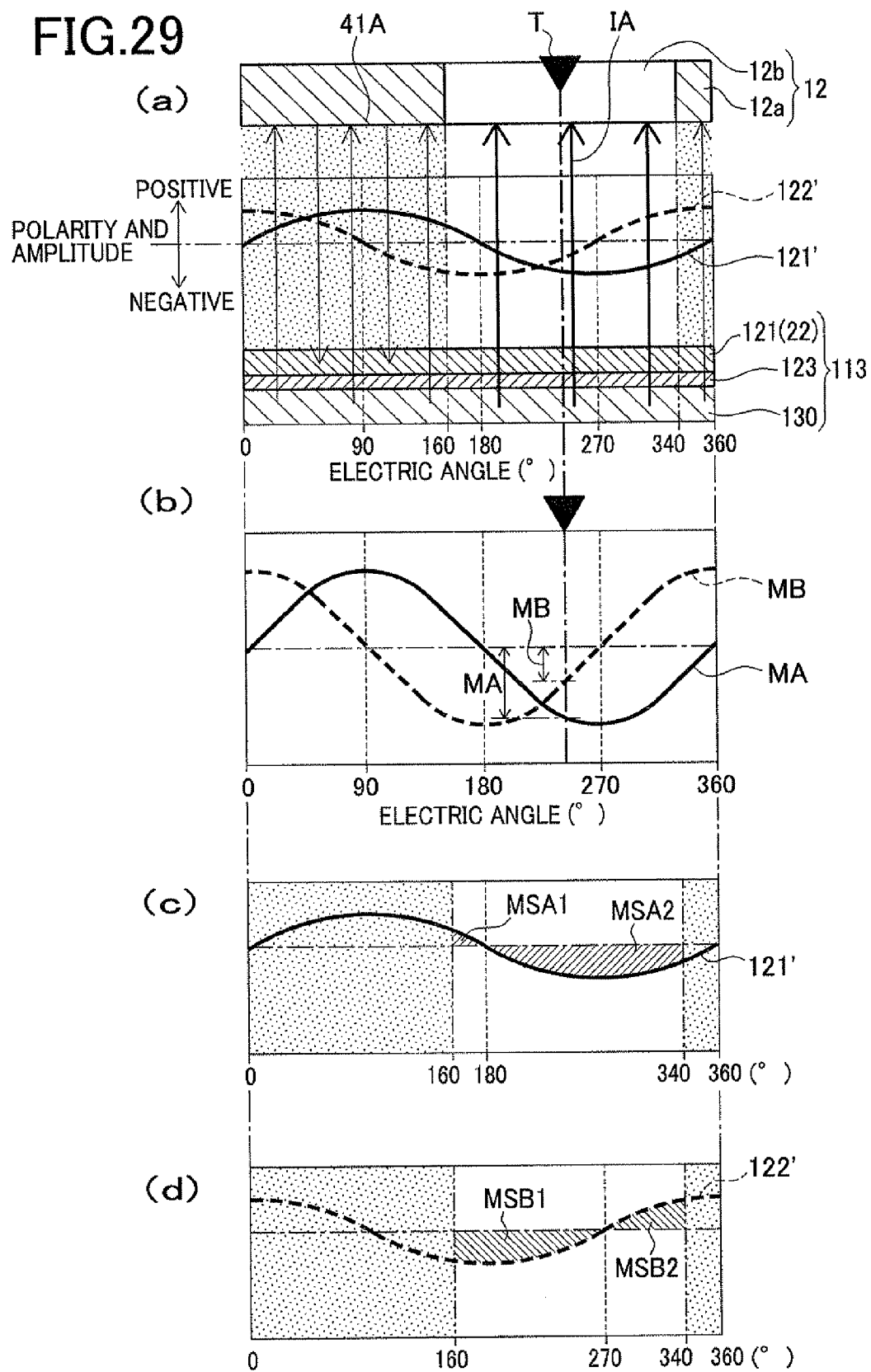
FIG. 29 is graphs (a) to (d) showing operations and characteristics of the resolver in the third embodiment.

The operations of an excitation coil 123, the resolver rotor 12, a sine wave coil 121, and a cosine wave coil 122 will be explained below. Graphs (a) to (d) in FIG. 29 show the operations and characteristics of the resolver. In FIG. 29, (a) shows a positional relationship between a resolver stator 113 (a stator base flat plate 130, the excitation coil 123, the sine wave coil 121, and the cosine wave coil 122) and the resolver rotor 12 (nonmagnetic conductive parts 12aA and 12aB and cutouts 12bA and 12bB). The positional relationship actually should appear in a circular graph but is depicted in a line graph in FIG. 29 (a) for easy viewing.

In FIG. 29 (a), an electric angle represented by a lateral axis is 360 degrees (a mechanical angle is 180 degrees because of a 2X coil). For convenience sake, the sine wave coil 121 and the cosine wave coil 122 are illustrated as one layer and the excitation coil 123 is illustrated as another layer. Specifically, in FIG. 29 (a), the resolver stator 113 is shown so that the excitation coil 123 is placed on the base flat plate 130, and the sine wave coil 121 and the cosine wave coil 122 are placed thereon. The resolver rotor 12 is alternately formed with the cutouts 12b and the nonmagnetic conductive parts 12a in respective two places, each being in a range of an electric angle of 180° (a mechanical angle is 90° because of a 2X coil).

Figure 30:
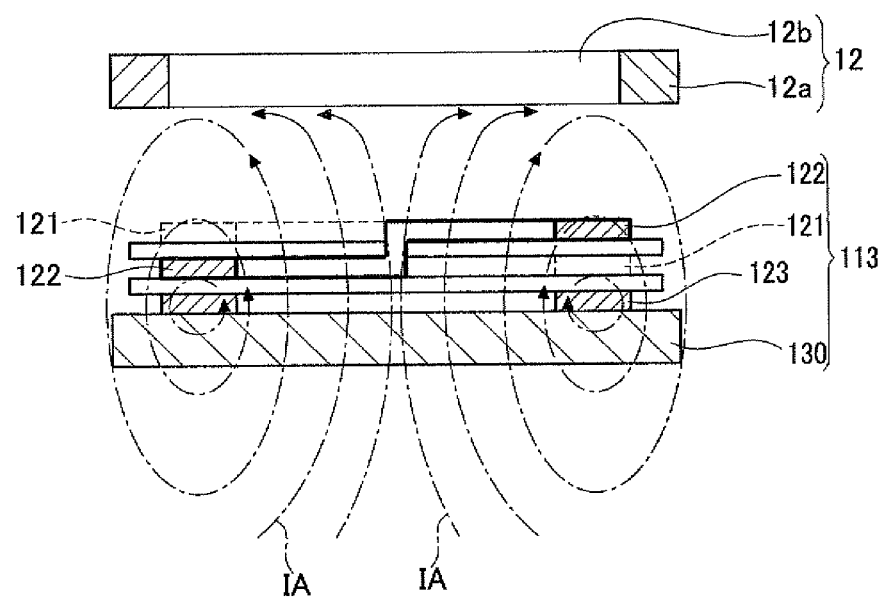
FIG. 30 is a sectional view showing operations of a portion of the resolver rotor including a cutout in FIG. 29 (a) in the third embodiment.

FIG. 30 is a sectional view showing the operation of a portion of the resolver rotor 12 including the cutout 12b in FIG. 29 (a). In FIG. 30, similarly, the excitation coil 123 is illustrated as an independent layer. In FIG. 30, when the excitation coil 123 receives a signal wave of 7.8125 kHz amplitude-modulated by a carrier wave of 500 kHz from a D/A converter 158, a magnetic flux IA corresponding to the current value occurs in the positive direction. The generation of the magnetic flux IA generates an induced voltage in the sine wave coil 121 and the cosine wave coil 122.

Figure 31:
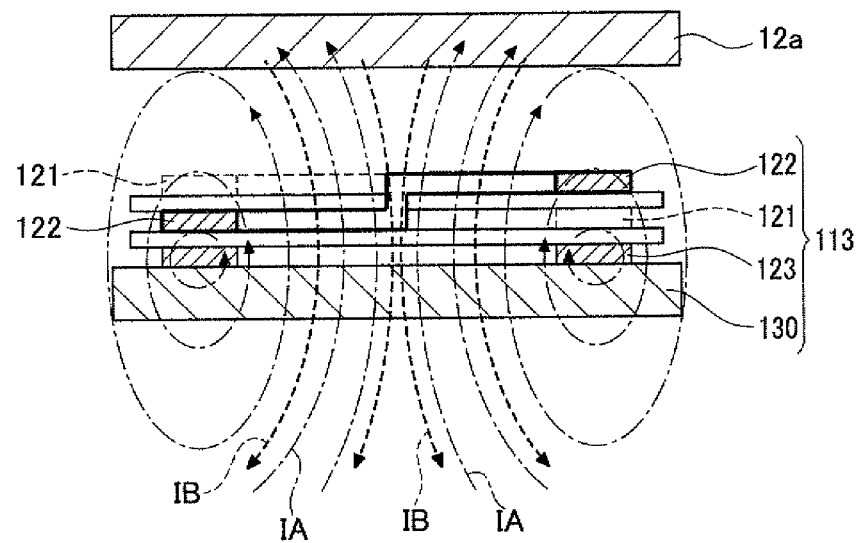
FIG. 31 is a sectional view showing operations of a portion of the resolver rotor including a nonmagnetic conductive part in FIG. 29 (a) in the third embodiment.

On the other hand, FIG. 31 is a sectional view of the operation of a portion of the resolver rotor 12 including the nonmagnetic conductive part 12a. In FIG. 31, for convenience sake, the excitation coil 123 is illustrated as an independent layer. In FIG. 31, the nonmagnetic conductive part 12a of the resolver rotor 12 faces the sine wave coil 121 and the cosine wave coil 122 of the resolver stator 113. When the excitation coil 123 receives, from the D/A converter 158, the excitation signal produced by amplitude-modulating the carrier wave of 500 kHz by the signal wave of 7.8125 kHz, the magnetic flux IA corresponding to the current value occurs in the excitation coil 123.

However, when the magnetic flux IA enters in the nonmagnetic conductive parts 12a made of a nonmagnetic conductive material, an eddy current occurs on the surface of each nonmagnetic conductive part 12a. The generated eddy current generates a magnetic flux IB in an opposite direction to the magnetic flux IA as shown in FIG. 31. This magnetic flux IB cancels the magnetic flux IA in the positive direction generated by the excitation coil 123. Thus, the magnetic fluxes totally practically disappear as compared with the case shown in FIG. 29.

In the state of FIG. 29 (a), consequently, it can be considered that the magnetic flux IA occurs only in the region (an electric angle of 160° to 340°) overlapping with the cutouts 12b.

Figure 32A:
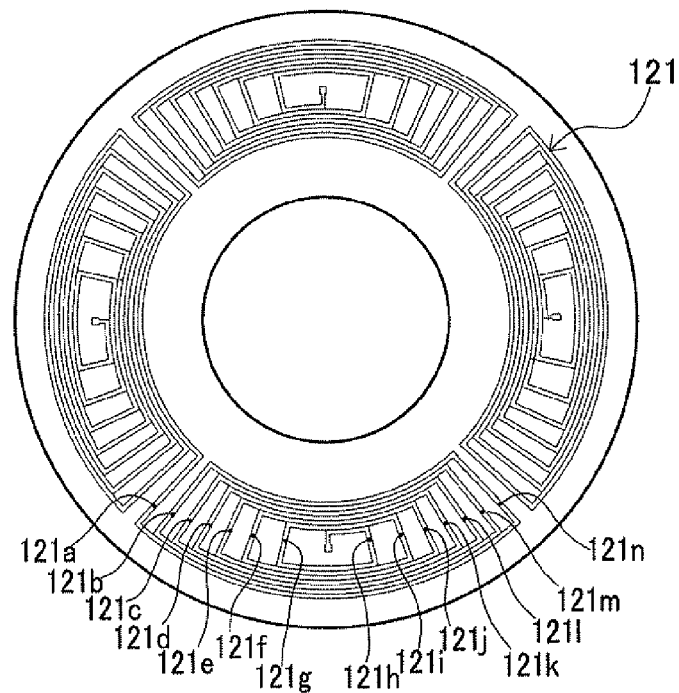
FIG. 32A is a plan view showing one example of a sine wave coil in the third embodiment.
Figure 32B:
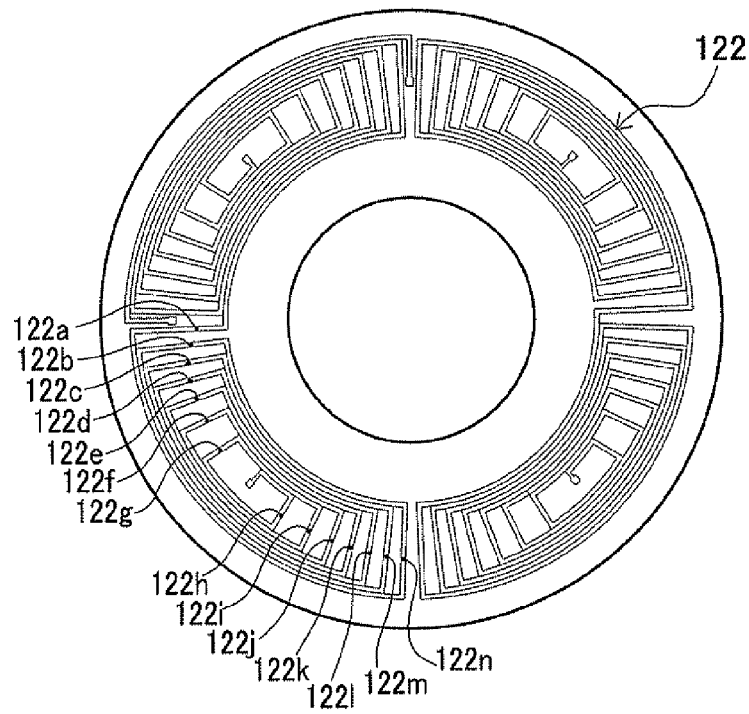
FIG. 32B is a plan view showing one example of a cosine wave coil in the third embodiment.

Herein, the sine wave coil 121 and the cosine wave coil 122 will be explained below. FIGS. 32A and 32B are plan views showing one examples of the sine wave coil 121 and the cosine wave coil 122 respectively. Specifically, FIG. 32A shows one example of the sine wave coil 121 in the plan view, in which the entire sine wave coil 121 is depicted on the same plane for facilitating viewing. Each of four coil parts of the sine wave coil 121 is constituted of seven sets of coil wires 121a-121n, 121b-121m, 121c-121l, 121d-121k, 121e-121j, 121f-121i, and 121g-121h.

Similarly, FIG. 32B shows one example of the cosine wave coil 122 in the plan view, in which the entire cosine wave coil 122 is depicted on the same plane for facilitating viewing. Each of four coil parts of the cosine wave coil 122 is constituted of seven sets of coil wires 122a-122n, 122b-122m, 122c-122l, 122d-122k, 122e-122j, 122f-122i, and 122g-122h.

Figure 33A:
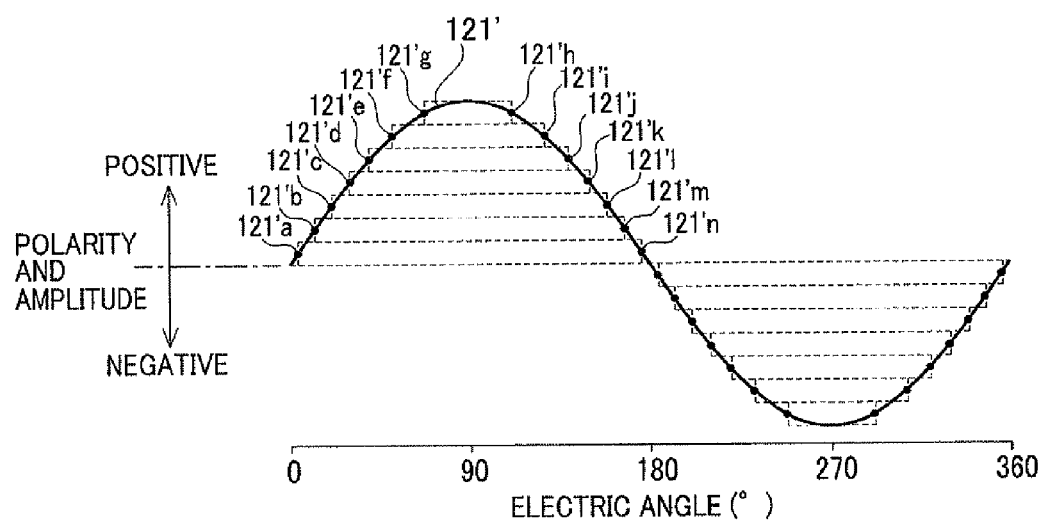
FIG. 33A is a graph showing induced voltage and others to be generated in the sine wave coil in the third embodiment.

FIG. 33A is a graph showing the magnitude of induced voltage which may be generated by each set of the coil wires 121a-121n, 121b-121m, 121c-121l, 121d-121k, 121e-121j, 121f-121i, and 121g-121h when uniform magnetic fluxes in the same direction occur in the sine wave coil 121, the magnitude being expressed in the form of waveforms 121'a-121'n, 121'b-121'm, 121'c-121'l, 121'd-121'k, 121'e-121'j, 121'f-121'i, and 121'g-121'h. In FIG. 33A, the magnitude of induced voltage which may be generated by the entire sine wave coil 121 is shown by a waveform 121'. Since the sine wave coil 121 is constituted of seven sets of the coil wires 121a-121n, 121b-121m, 121c-121l, 121d-121k, 121e-121j, 121f-121i, and 121g-121h as above, the induced voltage generated in the sine wave coil 121 can be expressed in an integration value in a range through which a magnetic flux of a sine wave curve passes.

Figure 33B:
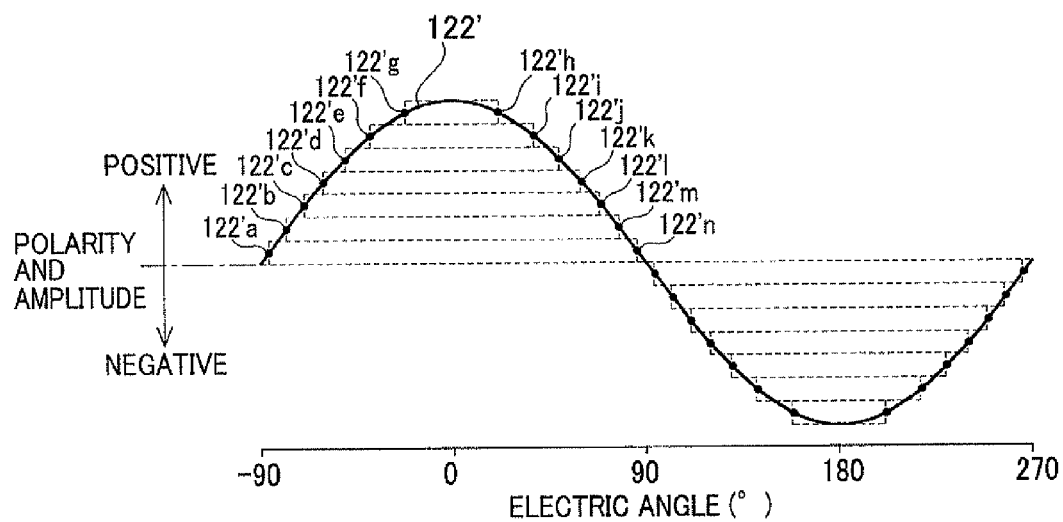
FIG. 33B is a graph showing induced voltage and others to be generated in the cosine wave coil in the third embodiment.

FIG. 33B is a graph showing the magnitude of induced voltage which may be generated by each set of the coil wires 122a-122n, 122b-122m, 122c-122l, 122d-122k, 122e-122j, 122f-122i, and 122g-122h when uniform magnetic fluxes in the same direction occur in the cosine wave coil 122, the magnitude being expressed in the form of waveforms 122'a-122'n, 122'b-122'm, 122'c-122'l, 122'd-122'k, 122'e-122'j, 122'f-122'i, and 122'g-122'h. In FIG. 33A, the magnitude of induced voltage which may be generated by the entire cosine wave coil 122 is shown by a waveform 122'.

Since the cosine wave coil 122 is constituted of seven sets of the coil wires 122a-122n, 122b-122m, 122c-122l, 122d-122k, 122e-122j, 122f-122i, and 122g-122h as above, the induced voltage generated in the cosine wave coil 122 can be expressed in an integration value in a range through which a magnetic flux of a cosine wave curve passes.

In FIG. 29, (b) shows an induced voltage MA generated in the sine wave coil 121 and an induced voltage MB generated in the cosine wave coil 122 by the magnetic flux IA. In FIG. 29, (c) shows only the waveform 121' shown in FIG. 29 (a). In the electric angle range from 160° to 180°, a positive induced voltage (+MSA1) having an area indicated by MSA1 occurs. In the electric angle range from 180° to 340°, a negative induced voltage (−MSA2) having an area indicated by MSA2 occurs. As a result, the total induced voltage generated in the sine wave coil 121 is expressed by MA=+MSA1−MSA2. This is shown in FIG. 29 (b).

On the other hand, in FIG. 29, (d) shows only the waveform 122' shown in (a). In the electric angle range from 160° to 270°, a negative induced voltage (−MSB1) having an area indicated by MSB1 occurs. In the electric angle range from 270° to 340°, a positive induced voltage (+MSB2) having an area indicated by MSB2 occurs. As a result, the total induced voltage generated in the cosine wave coil 122 is expressed by MB=+MSB2−MSB1. This is shown in FIG. 29 (b).

The above explanation describes that the generation of the magnetic flux IA generates the induced voltages MA and MB in the sine wave coil 121 and the cosine wave coil 122 respectively. The direction and the magnitude of the magnetic fluxes IA periodically vary according to the phase of the excitation signal input in the excitation coil 123. This also causes the induced voltages (the detection signals) generated in the sine wave coil 121 and the cosine wave coil 122 to periodically vary. Herein, the synchronous detectors 51 and 52 and the integration circuits 53 and 54 remove the components of the carrier waves from the above periodic components contained in the detection signals to smooth the resultant periodic components. The computing unit 60 then calculates a ratio between output of the integration circuit 53 and output of the integration circuit 54 (equal to a ratio of MA/MB of the induced voltage). Based on this calculated ratio, the angular displacement of the resolver rotor 12 with respect to the resolver stator 113 can be determined. The computing unit 60 outputs the above ratio as angle data 61.

Figure 34:
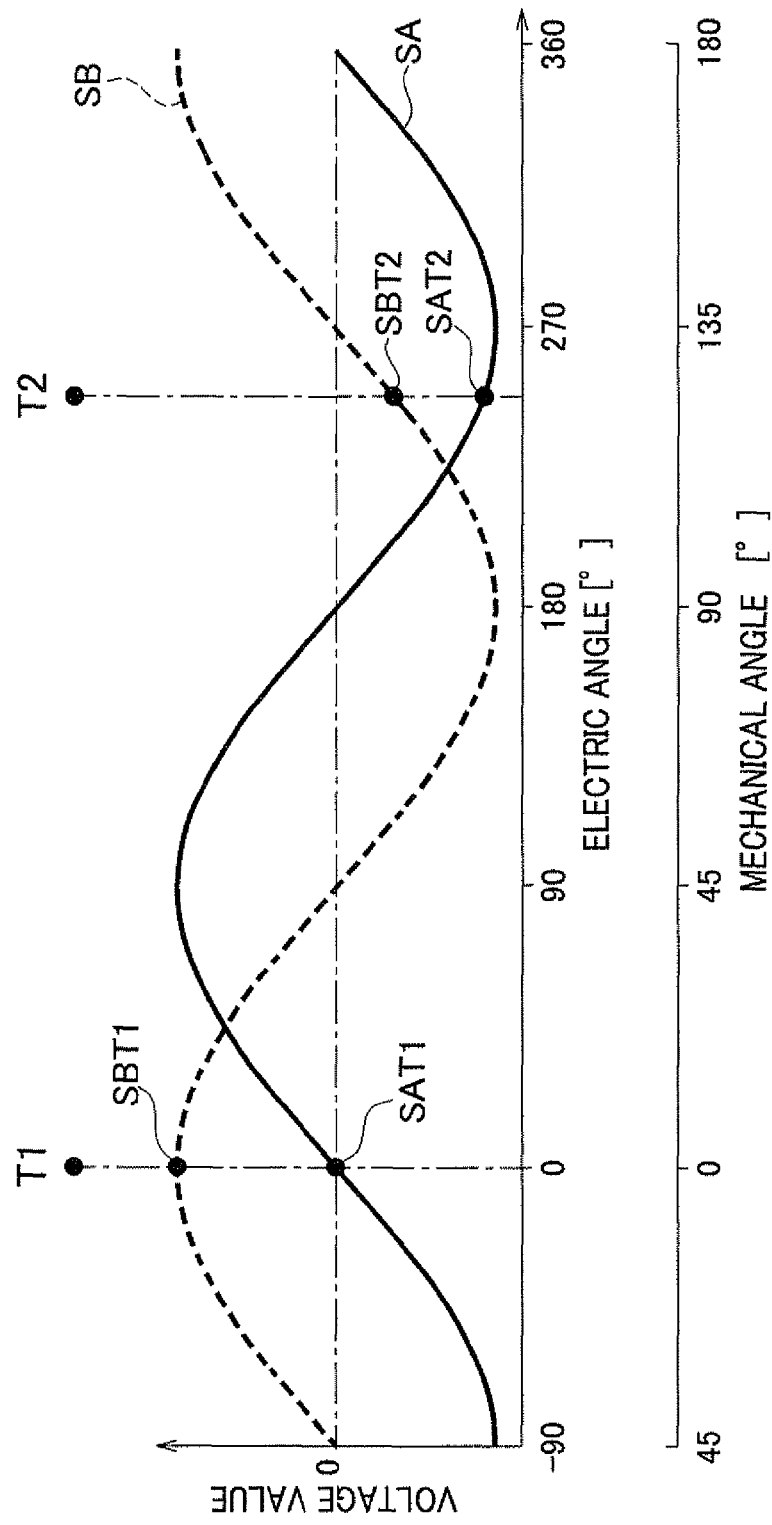
FIG. 34 is a graph showing relationships of electric angle and mechanical angle with respect to each output value in the third embodiment.

The operations of the resolver 11 in which the resolver rotor 12 is rotated will be explained referring to FIGS. 34, 35A, 35B, 36A, and 36B. FIG. 34 is a graph showing a relationship between an electric angle (−90° to 360°) and a mechanical angle (−45° to 180°) and each output value of the sine wave coil 121 and the cosine wave coil 122 when the magnetic fluxes IA in the predetermined direction occur. The resolver 11 in the third embodiment is a 2X type and thus the electric angle is double the mechanical angle. In FIG. 34, SA represents an output curve of the sine wave coil 121 and SB represents an output curve of the cosine wave coil 122.

Figure 35A:
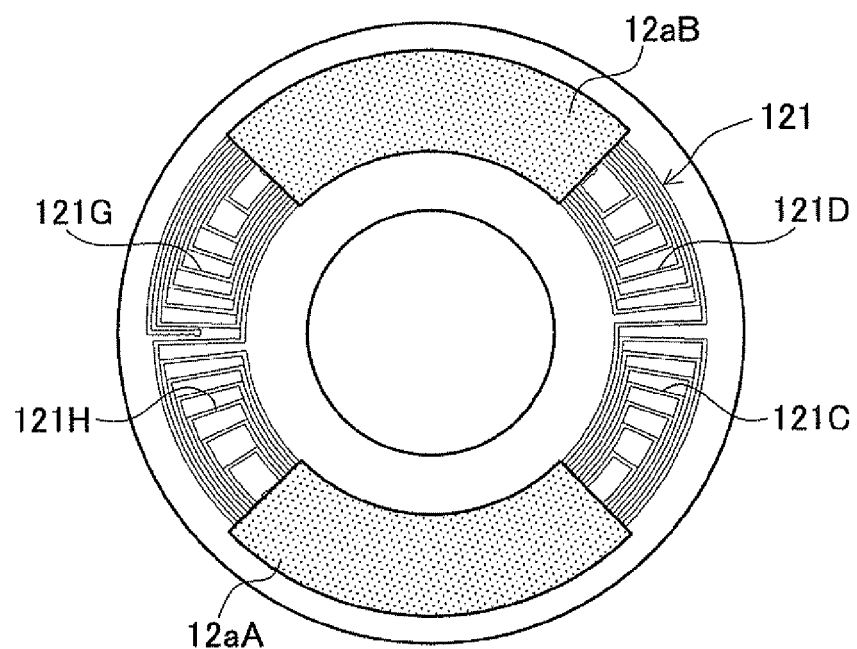
Figure 35B:
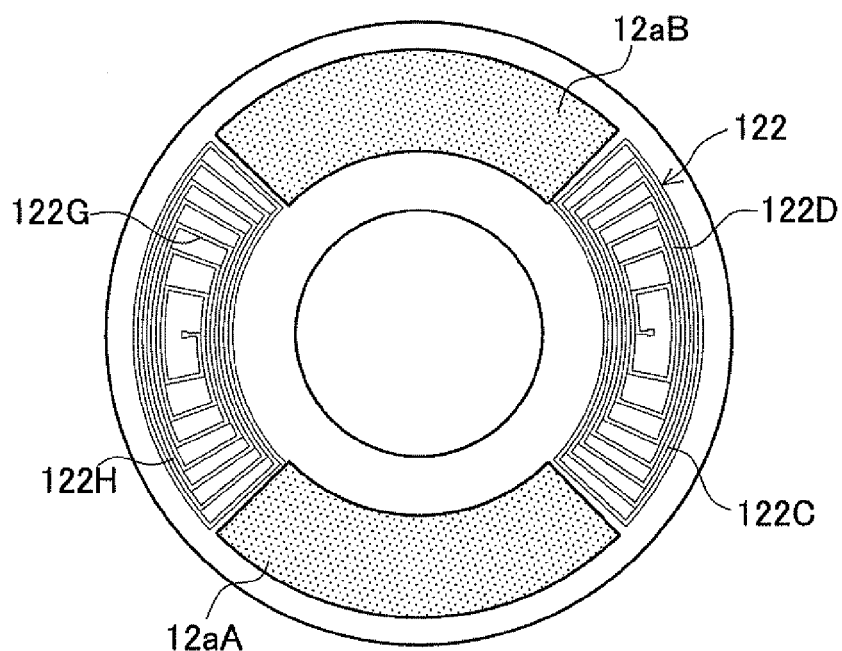

FIG. 35A is a plan view showing a positional relationship between the sine wave coil 121 and the nonmagnetic conductive part 12a (12aA and 12aB) at a rotor angle T1 in FIG. 34. FIG. 35B is a plan view showing a positional relationship between the cosine wave coil 122 and the nonmagnetic conductive part 12a (12aA and 12aB) at the rotor angle T1 in FIG. 34. In FIGS. 35A and 35B, for facilitating viewing, the sine wave coil 121 and the cosine wave coil 122 are depicted in one planes respectively, different from FIG. 28.

Figure 36A:
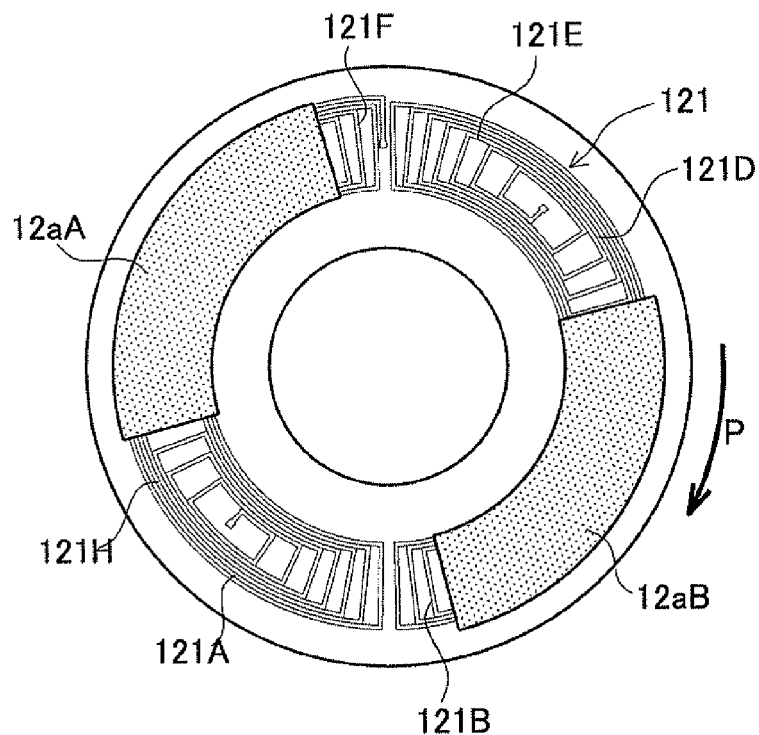
FIGS. 36A and 36B are plan views showing positional relationships between the sine wave coil and the nonmagnetic conductive part and between the cosine wave coil and the nonmagnetic conductive part at another rotor angle in the third embodiment.
Figure 36B:
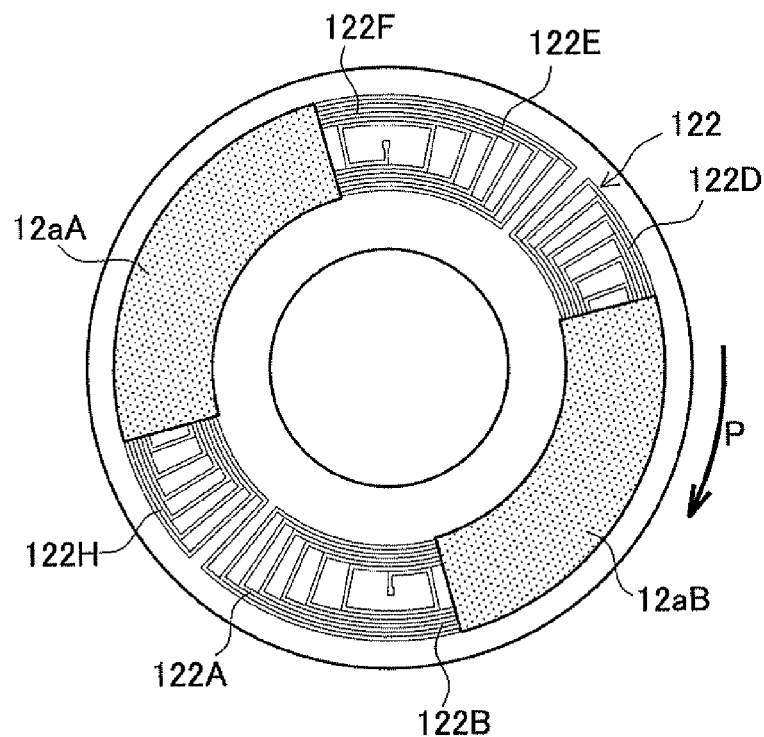

FIG. 36A is a plan view showing a positional relationship between the sine wave coil 121 and the nonmagnetic conductive part 12a (12aA and 12aB) at a rotor angle T2 in FIG. 34. FIG. 36B is a plan view showing a positional relationship between the cosine wave coil 122 and the nonmagnetic conductive part 12a (12aA and 12aB) at the rotor angle T2 in FIG. 34. In FIGS. 36A and 36B, for facilitating viewing, the sine wave coil 121 and the cosine wave coil 122 are depicted in one planes respectively, different from FIG. 28. Further, FIGS. 36A and 36B illustrate a state where the resolver rotor 12 has been rotated from the state of FIGS. 35A and 3513 by an electric angle of 240° (a mechanical angle of 120°) in a direction indicated by an arrow P.

At the rotor angle T1 in FIG. 34, as shown in FIG. 35A, the entire region of each split-coil segment 121C, 121D, 121G, and 121H of eight sine wave split-coil segments 121A to 121H of the sine wave coil 121 face the cutouts 12b of the resolver rotor 12. The entire region of each split-coil segment 121A, 121B, 121E, and 121F face the nonmagnetic conductive parts 12a (12aA and 12aB).

The magnetic fluxes IA generated by the excitation coil 123 are uniform in the same direction over the regions. Thus, the induced voltages generated in the first sine wave coil 121BC and the second sine wave coil 121DE are equal in absolute value but opposite in direction. Similarly, the induced voltages generated in the third sine wave coil 121FG and the fourth sine wave coil 121HA are equal in absolute value but opposite in direction.

On the other hand, in the regions of the nonmagnetic conductive parts 12a (12aA and 12aB), the magnetic flux IA is canceled by the magnetic flux IB generated by the eddy current, so that no induced voltage occurs in the parts of the sine wave coil 121 facing the nonmagnetic conductive parts 12a. Accordingly, the voltage value generated in the sine wave coil 121 is zero (SAT1) as shown in FIG. 33.

On the other hand, at the rotor angle T1 in FIG. 34, the entire region of each split-coil segment 122C, 122D, 122G and 122H of eight cosine wave split-coil segments 122A to 122H face the cutouts 12b (12bA and 12bB) of the resolver rotor 12 as shown in FIG. 35B. The entire region of each split-coil segments 122A, 122B, 122E, and 122F face the nonmagnetic conductive parts 12a (12aA and 12aB). The magnetic fluxes IA generated by the excitation coil 123 are uniform in the same direction over the regions. Thus, maximum induced voltage occurs in the second cosine wave coil 122CD. Similarly, maximum induced voltage occurs in the fourth cosine wave coil 122GH. No induced voltage occurs in the first cosine wave coil 122AB and the third cosine wave coil 122EF.

On the other hand, in the regions of the nonmagnetic conductive parts 12a (12aA and 12aB), the magnetic flux IA is canceled by the magnetic flux IB generated by the eddy current, so that no induced voltage occurs in the first cosine wave coil 122AB and the third cosine wave coil 122EF of the cosine wave coil 122. Accordingly, the voltage value generated in the cosine wave coil 122 is zero (SBT1) in FIG. 34.

At the rotor angle T2 in FIG. 34, as shown in FIG. 36A, the entire region of each split-coil segment 121E and 121A and a partial region of each split-coil segment 121D, 121F, 121H, and 121B of eight sine wave split-coil segments 121A to 121H face the cutouts 12b of the resolver rotor 12. The entire region of each split-coil segment 121G and 121C and a partial region of each split-coil segment 121D, 121F, 121H, and 121B face the nonmagnetic conductive parts 12a (12aA and 12aB). The magnetic fluxes IA generated by the excitation coil 123 are uniform in the same direction over the regions. Thus, the induced voltages occur in opposite directions in the sine wave coil 121DE and the third sine wave coil 121FG. Similarly, the induced voltages occur in opposite directions in the fourth sine wave coil 121 HA and the first sine wave coil 121BC.

In the regions of the nonmagnetic conductive parts 12a (12aA and 12aB), on the other hand, the magnetic flux IA is canceled by the magnetic flux IB generated by the eddy current, so that no induced voltage occurs in the sine wave coil 121. Accordingly, the voltage value generated in the sine wave coil 121 is a calculation value (SAT2) as shown in FIG. 34.

At the rotor angle T2 in FIG. 34, as shown in FIG. 36B, the entire region of each split-coil segment 122E and 122A and a partial region of each split-coil segment 122D, 122F, 122H, and 122B of eight cosine wave split-coil segments 122A to 122H of the cosine wave coil 122 face the cutouts 12b of the resolver rotor 12. The entire region of each split-coil segment 122G and 122C and the partial region of each split-coil segment 122D, 122F, 122H, and 122B face the nonmagnetic conductive parts 12a (12aA and 12aB). The magnetic fluxes IA generated by the excitation coil 123 are uniform in the same direction over the regions. Thus, the induced voltages occur in opposite directions in the second cosine wave coil 122CD and the third cosine wave coil 122EF. Similarly, the induced voltages occur in opposite directions in the fourth cosine wave coil 122GH and the second cosine wave coil 122AB.

On the other hand, in the regions of the nonmagnetic conductive parts 12a (12aA and 12aB), the magnetic flux IA is canceled by the magnetic flux IB generated in the eddy current, so that no induced voltage occurs in the parts of the cosine wave coil 122 facing the nonmagnetic conductive parts 12a. Accordingly, the output value generated in the cosine wave coil 122 is a calculated value (SBT2) as shown in FIG. 34.

At the rotor angle T1 in FIG. 34, the computing unit 60 shown in FIG. 3 calculates a ratio (SAT1/SBT1) between the output value SAT1 of the sine wave coil 121 and the output value SBT1 of the cosine wave coil 122. Based on this ratio: SAT1/SBT1, an angular displacement of the resolver rotor 12 with respect to the resolver stator 113 at the rotor angle T1 can be determined. The computing unit 60 outputs the ratio, SAT1/SBT1, as the angle data 61. Similarly, at the rotor angle T2 in FIG. 34, the computing unit 60 in FIG. 3 calculates a ratio (SAT2/SBT2) between the output value SAT2 of the sine wave coil 121 and the output value SBT2 of the cosine wave coil 122. Based on this ratio: SAT2/SBT2, the angular displacement of the resolver rotor 12 with respect to the resolver stator 113 at the rotor angle T2 can be determined. The computing unit 60 outputs the ratio, SAT2/SBT2, as the angle data 61.

Figure 37:
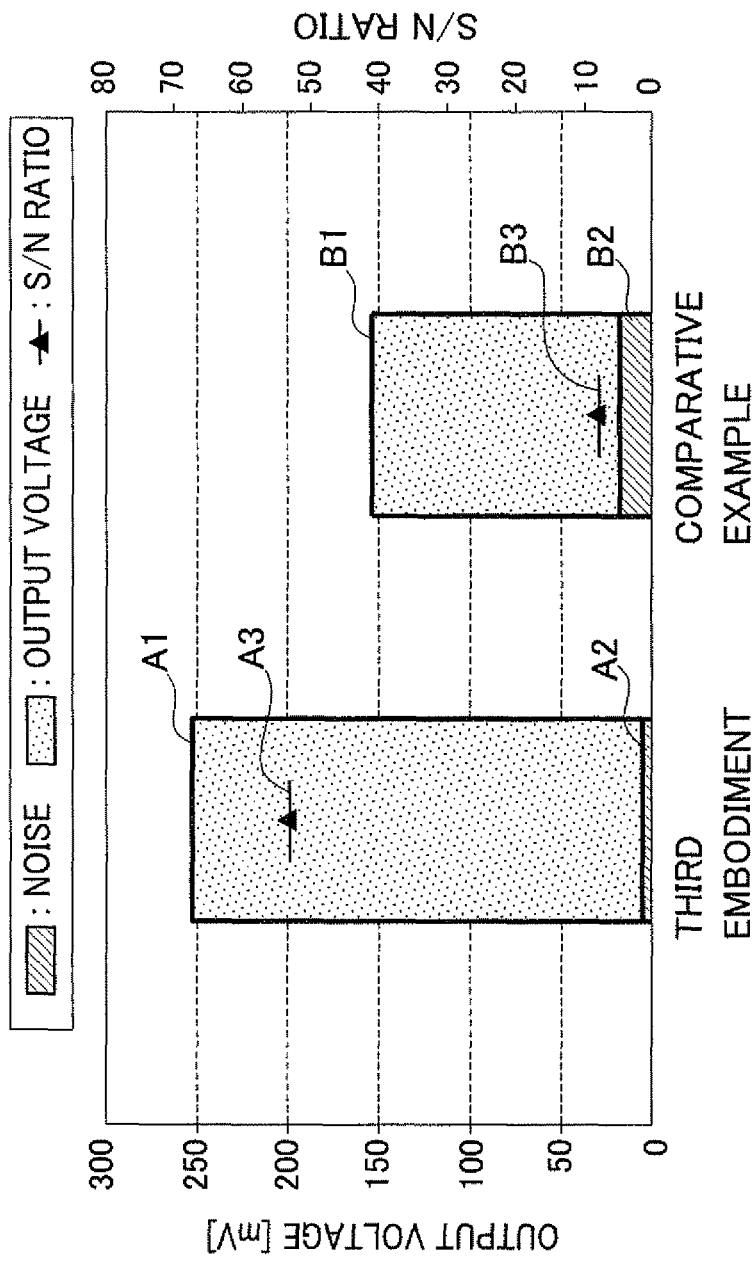
FIG. 37 is a graph showing experimental data related to output voltage of the resolver in the third embodiment.

FIG. 37 is a graph showing experimental data on the resolver 11 in the third embodiment. In the graph, a lateral axis represents the resolver 11 of the present embodiment and a resolver of a comparative example and a vertical axis represents output voltage and S/N ratio. The resolver of the comparative example includes a resolver rotor made of a magnetic conductive material and formed with cutouts identical to those of the resolver 11.

As shown in FIG. 37, in the resolver 11 of the present embodiment, output voltage A1 is 250 mV, noise A2 is 4.5 mV, and S/N ratio A3 is about 55. In the resolver of the comparative example, output voltage 131 is 150 mV, noise B2 is 19 mV, and S/N ratio is about 8.

From the above experiment, it was confirmed that even the resolver of the comparative example including the resolver rotor made of the magnetic conductive material could be practically used as a rotation angle sensor as well as that the resolver 11 including the resolver rotor made of the nonmagnetic conductive material achieves a very high S/N ratio and excellent characteristics.

As explained in detail above, the resolver 11 of the third embodiment includes the resolver stator 113 provided with the excitation coil 123 in which an excitation signal is to be input and the detection coils 132 and 134 (the sine wave coil 121 and the cosine wave coil 122) which output a detection signal, and the resolver rotor 12 rotatably placed to face the stator 113. Further, the flat-shaped resolver stator 113 and the flat-shaped resolver rotor 12 are placed in parallel to face each other. Accordingly, the resolver 11 can have a reduced size in the rotation axis direction and hence be compact.

In this embodiment, especially, the detection coils 132 and 134 and the excitation coil 123 are constituted of flat coil patterns respectively. Thus, each coil 123, 132, and 134 is not bulky. Accordingly, the resolver 11 can have a reduced size in the rotation axis direction and hence be compact.

The reason why the detection coils 132 and 134 can be made in flat coil patterns as mentioned above is that a high-frequency wave of 500 kHz is used as a carrier wave for the excitation coil 123 and this can reduce the number of winding turns of each detection coil 132 and 134. In other words, a signal wave of 7.8125 kHz is used in association with the use of the carrier wave of such a high frequency as 500 kHz. Accordingly, the number of winding turns of each detection coil 132 and 134 can be reduced to as small as 7 turns. Consequently, the coil wire of each detection coil 132 and 134 can be arranged in spiral form into flat coil pattern on the base flat plate 130. The coil wire of each detection coil 132 and 134 can be arranged so as to output a detection signal of a sine or cosine wave form by changing a range through which a magnetic flux will pass, according to the rotation angle of the resolver rotor 12, when uniform magnetic fluxes act in the same direction.

In this embodiment, the excitation coil 123 and the first detection coil 132 which is a part of one detection coil are formed in the same layer, so that the number of layers of components is smaller than the case where they are formed in separate layers. This configuration can reduce the thickness of the resolver stator 113. In this regard, the resolver 11 can have a reduced size in the rotation axis direction and hence be compact. Furthermore, a manufacturing cost of the resolver 11 can be held down by the reduction in the number of layers of components.

In the resolver 11 in this embodiment, the resolver rotor 12 made of a conductive material is formed with the pair of cutouts 12bA and 12bB circumferentially spaced at a predetermined angular interval. Accordingly, when a magnetic field (a magnetic flux IA) is generated by the excitation coil 123, the magnetic field (the magnetic flux IA) of the excitation coil 123 passes through the detection coils 132 and 134 in only the regions overlapping the cutouts 12bA and 12bB of the resolver rotor 12, thus generating an electromotive force (an induced voltage) in the detection coils 132 and 134. On the other hand, when the magnetic field (the magnetic flux IA) is generated by the excitation coil 123, the magnetic field (the magnetic flux IA) impinges on the resolver rotor 12 in the regions not overlapping the cutouts 12bA and 12bB, that is, in the regions overlapping the nonmagnetic conductive parts 12aA and 12aB, thus generating an eddy current on the surface of the resolver rotor 12. This eddy current causes a magnetic field (a magnetic flux IB) to occur in an opposite direction to the magnetic field (the magnetic flux IA) of the excitation coil 123. Thus, the magnetic fields in both directions (the magnetic fluxes IA and IB) cancel each other and therefore no induced voltage will occur in the detection coils 132 and 134. By the above successive operations, an appropriate detection signal can be produced from the entire detection coils 132 and 134. The resolver 11 can perform rotation angle detection without having protrusions and recesses in the flat-shaped resolver rotor 12. Consequently, the manufacturing cost of the resolver rotor 12 can be held down, leading to a low manufacturing cost of the resolver 11.

In the resolver 11 in this embodiment, the resolver stator 113 is provided with both the excitation coil 123 and the detection coils 132 and 134. Accordingly, there is no need to communicate the detection signal of the detection coils 132 and 134 between the resolver rotor 12 and the resolver stator 113. Thus, no rotary transformer coil is required to communicate signals, differently from the configuration that the excitation coil 123 and the detection coils 132 and 134 are separately provided in the resolver stator 113 and the rotor 12 respectively. As a result, the resolver 11 does not have to include a rotary transformer coil and thus can have a simplified configuration. In this regard, the resolver 11 can be made compact.

Since the resolver 11 in the third embodiment does not have to include a rotary transformer coil, it is possible to increase gain of the detection signal and also increase its S/N ratio as compared with the technique of Patent Literature 2. The technique of Patent Literature 2 provides an S/N ratio of about 4, whereas the third embodiment can achieve an S/N ratio of 50 or higher.

In the third embodiment, the detection coils 132 and 134 (the sine wave coil 121 and the cosine wave coil 122) include eight sine wave split-coil segments 121A to 121H that are sequentially continuously arranged and eight cosine wave split-coil segments 122A to 122H that are sequentially continuously arranged. Further, the sine wave split-coil segments 121A, 121C, 121E, and 121G and the cosine wave split-coil segments 122B, 122D, 122F, and 122H are formed in the same layer. The sine wave split-coil segments 121B, 121D, 121F, and 121H and the cosine wave split-coil segments 122A, 122C, 122E, and 122G are formed in the same layer. Those layers are placed to overlap one on the other. Accordingly, even when a gap between the resolver stator 113 and the resolver rotor 12 slightly changes when the resolver 11 is mounted in the motor 1, the positional relationship between the sine wave coil 121 and the resolver rotor 12 and the positional relationship between the cosine wave coil 122 and the resolver rotor 12 can always remain constant. Accordingly, it is possible to reduce detection errors of rotation angle resulting from a mounting error of the resolver 11.

In the third embodiment, the flat coil patterns constituting the excitation coil 123 are placed along the outer circumference of the flat coil patterns of the forward direction and the flat coil patterns of the negative direction constituting the detection coils 132 and 134. Thus, the outer circumference sides of the detection coils 132 and 134 are applied with a uniform continuous magnetic field from the excitation coil 123. In this embodiment, particularly, the excitation coil 123 being constituted by winding a coil wire in multiple turns in an annular form can generate a uniform magnetic field over the entire circumference. Accordingly, the excitation signal can be supplied continuously uniformly to the detection coils 132 and 134 in their circumferential direction. In this regard, the resolver 11 can achieve enhanced rotation angle detection accuracy.

In the third embodiment, the resolver rotor 12 is made of a nonmagnetic conductive material as a conductive material. This can increase an eddy current to be generated on the surface of the resolver rotor 12 and thereby raise an efficiency of canceling the magnetic flux generated in the excitation coil 123. Accordingly, the S/N ratio becomes larger (noise becomes smaller), so that the resolver 11 can achieve improved rotation angle detection accuracy.

In the resolver 11 in this embodiment, the excitation signal produced by amplitude-modulating the carrier wave of 500 kHz with the signal wave of 7.8125 kHz for the excitation coil 123 is used to perform the angle detection. Accordingly, the carrier wave is less likely to be influenced by motor noise (most part thereof is close to 10 kHz). In this regard, the S/N ratio of the detection signal in the detection coils 132 and 134 can be enhanced.

In this embodiment, in the detection coils 132 and 134, seven sets of the coil wires forming the sine wave coil 121: 121a-121n, 121b-121m, 121c-121l, 121d-121k, 121e-121j, 121f-121i, and 121g-121h, are arranged so that the induced voltage generated in the sine wave coil 121 corresponds to an integration value of a sine wave curve in the range through which the magnetic flux passes. Furthermore, seven sets of the coil wires forming the cosine wave coil 122: 122a-122n, 122b-122m, 122c-122l, 122d-122k, 122e-122j, 122f-122i, and 122g-122h, are arranged so that the induced voltage generated in the cosine wave coil 122 corresponds to an integration value of a cosine wave curve in the range through which the magnetic flux passes. Consequently, with the flat-shaped resolver rotor 12 simply formed with the cutouts 12b without including protrusions and recesses on the surface, an appropriate signal can be obtained from the entire detection coils 132 and 134.

In the conventional VR resolver, specifically, there is a need to periodically change the gap or clearance between the resolver rotor and the resolver stator over the entire circumference in order to obtain detection signals simultaneously over the entire circumference. However, in the resolver 11 in this embodiment, the position of the coil wire of the detection coils 132 and 134 (the sine wave coil 121 and the cosine wave coil 122) can be arranged to output a detection signal of a sine or cosine wave form when the uniform magnetic fluxes act in the same direction by changing the magnetic-field passing range according to the rotation angle of the resolver rotor 12. Even when the gap or clearance between the resolver rotor 12 and the resolver stator 113 is constant, the induced voltages generated in the detection coils 132 and 134 do not cancel each other. Thus, there is no need to form protrusions and recesses in the surface of the resolver rotor 12.

The conventional VR resolver has a problem that it is more expensive to shape the outer circumference of the resolver rotor in a sine wave curve. In the third embodiment, on the other hand, there is no need to form a sine wave curve in the resolver rotor 12 and hence a large cost reduction can be achieved.

Fourth Embodiment

A fourth embodiment of a rotation angle sensor according to the present invention will be explained in detail below referring to accompanying drawings. The following explanation is made so that identical components to those in the third embodiment are given the same reference signs and with a focus on differences from the third embodiment.

Figure 38:
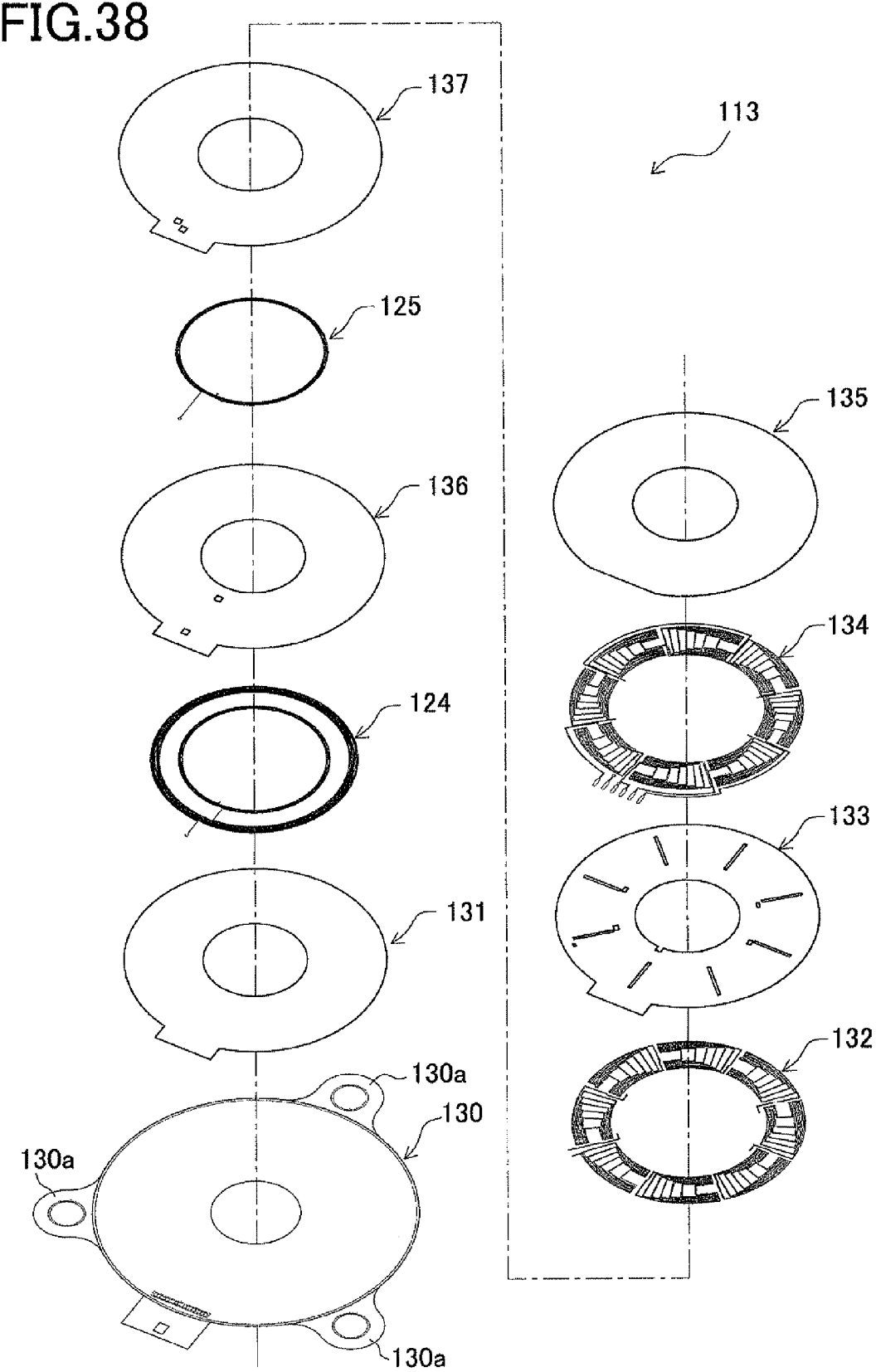
FIG. 38 is an exploded perspective view showing a resolver stator in a fourth embodiment.
Figure 39:
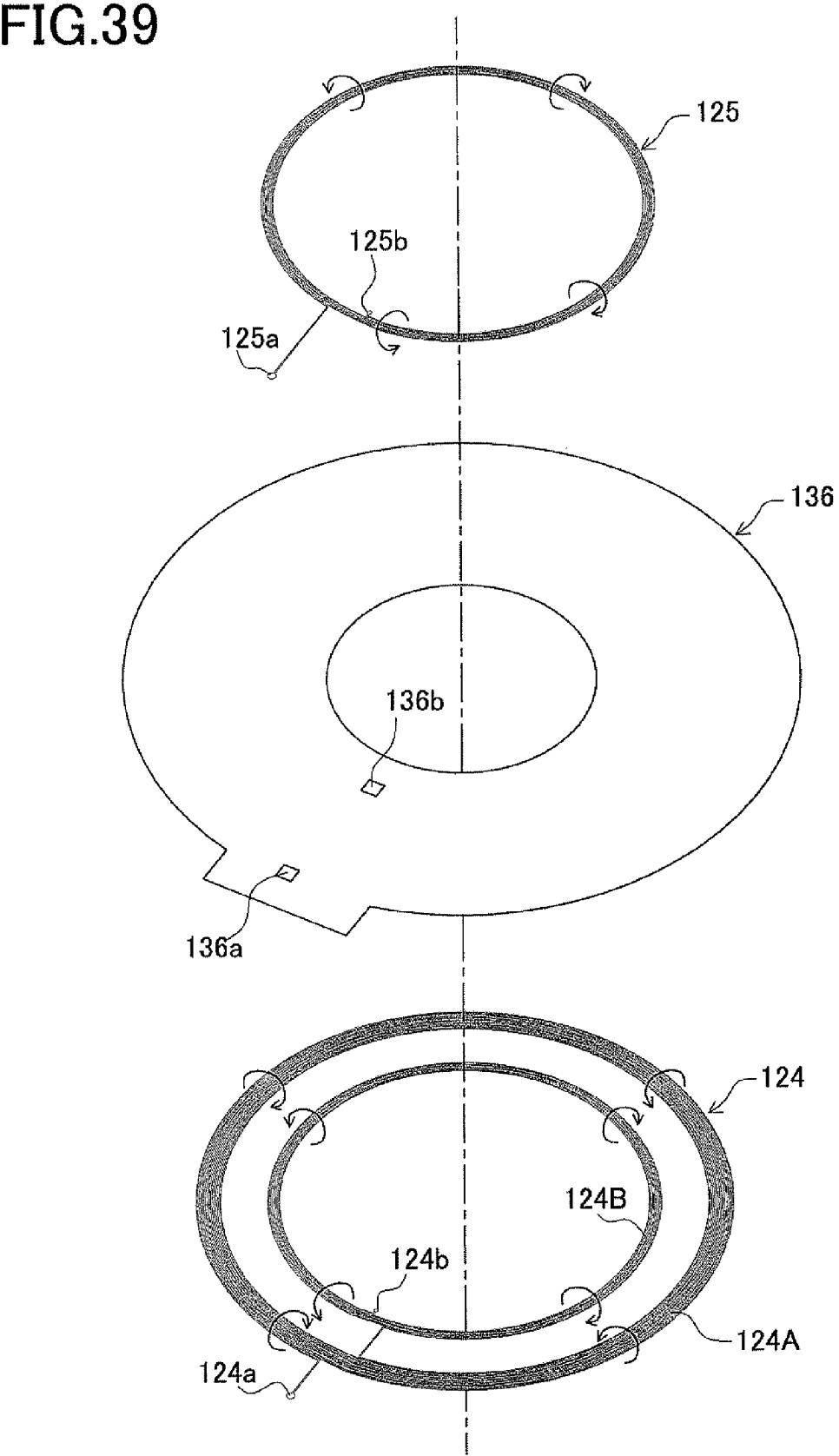
FIG. 39 is an exploded, enlarged, perspective view showing a part of constituent components in FIG. 38 in the fourth embodiment.
Figure 40:
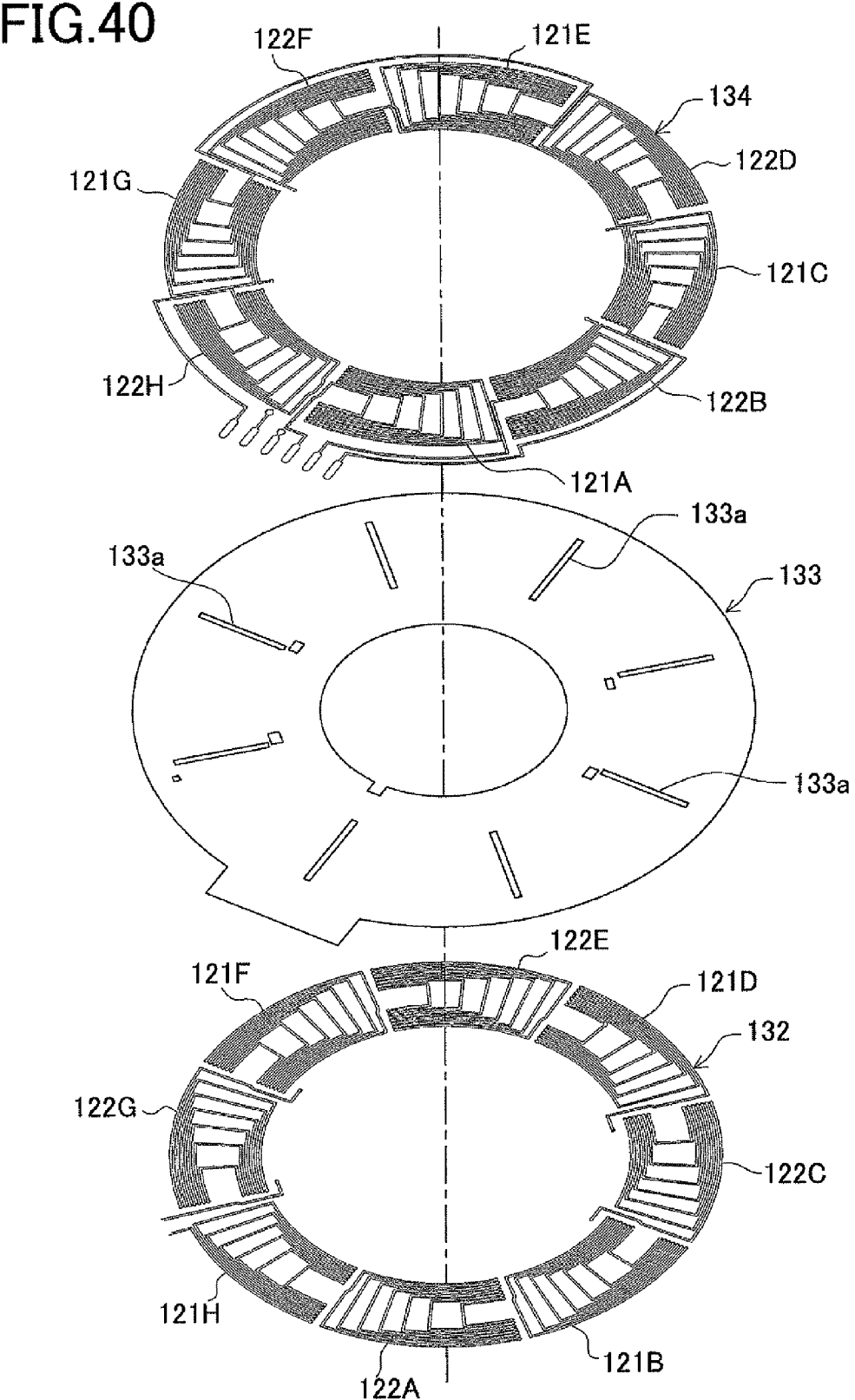
FIG. 40 is an exploded, enlarged, perspective view showing a part of constituent components in FIG. 38 in the fourth embodiment.

The fourth embodiment differs from the third embodiment in the structure of the resolver stator 113 and in particular in the structures of the excitation coils 124 and 125 and the detection coils 132 and 134. FIG. 38 is an exploded perspective view of the resolver stator 113. FIG. 39 is an exploded, enlarged perspective view of part of the components shown in FIG. 38. FIG. 40 is a perspective view of an exploded, enlarged perspective view of part of the components in FIG. 38.

As shown in FIG. 38, the resolver stator 113 includes a base flat plate 130, an insulating layer 131, a first excitation coil 124, an insulating layer 136, a second excitation coil 125, an insulating layer 137, a first detection coil 132, an insulating layer 133, a second detection coil 134, an insulating layer 135, which are placed in layers. Each structure of the base flat plate 130 located in the lowermost layer and the insulating layer 131 placed on the plate 130 and each structure of the first detection coil 132, the insulating layer 133, the second detection coil 134, and the insulating layer 135 are identical to those in the third embodiment.

In the fourth embodiment, as shown in FIGS. 38 and 39, the first excitation coil 124 is formed on the insulating layer 131. The first excitation coil 124 includes two coils 124A and 124B concentrically arranged in large and small annular forms. The insulating layer 136 is formed on the first excitation coil 124. This insulating layer 136 is formed with two through holes 136a and 136b. On this insulating layer 136, the second excitation coil 125 is formed. This second excitation coil 125 has an annular form and is placed in a position conforming with the small annular magnetic 124B of the first excitation coil 124. The above first and second excitation coils 124 and 125 have a positional relationship that they overlaps with the first and second detection coils 132 and 134 formed in the layers above the coils 124 and 125.

Each of the two annular coils 124A and 124B forming the first excitation coil 124 is made by winding a coil wire in multiple turns in an annular form. These two annular coils 124A and 124B are wound in opposite directions to each other so that the number of turns of the large annular coil 124A is larger than that of the small annular coil 124B. The two annular coils 124A and 124B are constituted of a string of coil wire include one terminals 124*a* and 124*b* respectively. Since the two annular coils 124A and 124B are wound in opposite directions to each other, magnetic fields are generated in opposite directions when a current is supplied to the coils 124A and 124B. Accordingly, in the space between the two annular coils 124A and 124B, respective magnetic fields are directed in the same direction (downward) as indicated by arrows in FIG. 39 and strengthen each other.

The second excitation coil 125 is similarly configured by winding a coil wire in multiple turns in an annular form. This second excitation coil 125 and the small annular coil 124B of the first excitation coil 124 have the same winding direction and turns of coil wire. The second excitation coil 125 includes two terminals 125*a* and 125*b* at both ends. Since the second excitation coil 125 and the small annular coil 124B of the first excitation coil 124 are wound in the same winding direction, the coils 125 and 124B when supplied with a current generate magnetic fields in the same direction as indicated by the arrows in FIG. 39. Consequently, the respective magnetic fields in the second excitation coil 125 and the annular coil 124B are directed in the same direction and hence strengthen each other.

In FIG. 39, the terminal 124*a* at one end of the first excitation coil 124 is connected to the terminal 125*a* at one end of the second excitation coil 125 through one through hole 136*a* of the insulating layer 136. Similarly, the terminal 124*b* at the other end of the first excitation coil 124 is connected to the terminal 125*b* at the other end of the second excitation coil 125 through the other through hole 136*b* of the insulating layer 136.

In the fourth embodiment, as shown in FIG. 39, the first and second excitation coils 124 and 125 are configured in two separate layers with the insulating layer 136 interposed therebetween. Since the excitation coils 124 and 125 are provided in two separate layers as above, the magnetic fields generated by the coils 124 and 125 can be strengthened without increasing the footprint of each excitation coil 124 and 125.

As shown in FIG. 40, the first detection coil 132 and the second detection coil 134 are placed in two layers with the insulating layer 133 interposed therebetween. Those detection coils 132 and 134 constitute one detection coil. The structures of the detection coils 132 and 134 are basically identical to those in the third embodiment.

According to the resolver 11 in the fourth embodiment explained above, the annular excitation coils 124 and 125 are placed to overlap with the annular detection coils 132 and 134. Thus, the entire circumferences of the detection coils 132 and 134 uniformly receive magnetic field from the excitation coils 124 and 125. In this embodiment, particularly, each of the excitation coils 124 and 125 is made by winding a coil wire in multiple turns in an annular form. This configuration can generate a uniform magnetic field over the entire circumference of each excitation coil 124 and 125. Accordingly, the excitation signals can be supplied to the entire circumferences of the detection coils 132 and 134 under uniform condition. In this regard, the resolver 11 can have improved detection accuracy of rotation angle.

In the fourth embodiment, in the resolver stator 113, the excitation coils 124 and 125 and the detection coils 132 and 134 are formed in layers on the same base flat plate 130. Consequently, for instance, a distance from the excitation coils 124 and 125 to the detection coils 132 and 134 in the fourth embodiment is relatively shorter than the case where the excitation coil and the detection coil are separately provided in the resolver stator and the resolver rotor respectively. This makes it possible to increase gain of the detection signals of the detection coils 132 and 134 and hence increase its S/N ratio.

In the fourth embodiment, the excitation coils 124 and 125 and the detection coils 132 and 134 are formed separately in different layers. As a result, the freedom of arranging each coil 124, 125, 132, and 134 in each layer is increased. The arrangement of the excitation coils 124 and 125 and the detection coils 132 and 134 can be optimized. In this light, the resolver 11 can have improved detection performance of rotation angle.

In the fourth embodiment, furthermore, the excitation coils 124 and 125 and the detection coils 132 and 134 are placed in such positions that they partially overlap one on another. Accordingly, the freedom of arranging each coil 124, 125, 132, and 134 in each layer can be more increased. Thus, the arrangement of the excitation coils 124 and 125 and the detection coils 132 and 134 can be further optimized. In this light, the resolver 11 can have improved detection performance of rotation angle.

Identical or similar structures in this embodiment to those in the first embodiment can provide the same operations and effects as those in the first embodiment.

Fifth Embodiment

Figure 41:
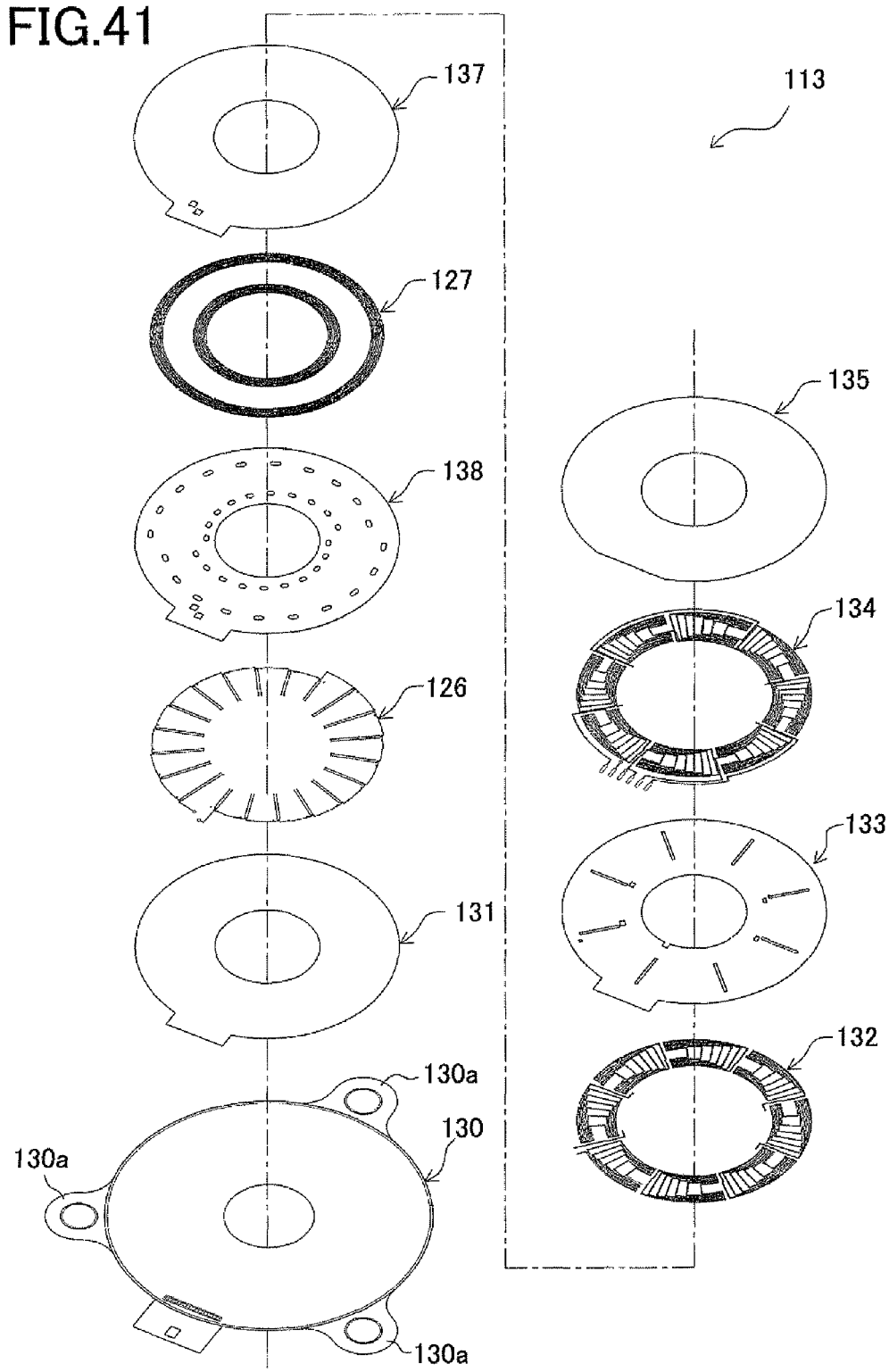
FIG. 41 is an exploded perspective view of a resolver stator in a fifth embodiment.
Figure 42:
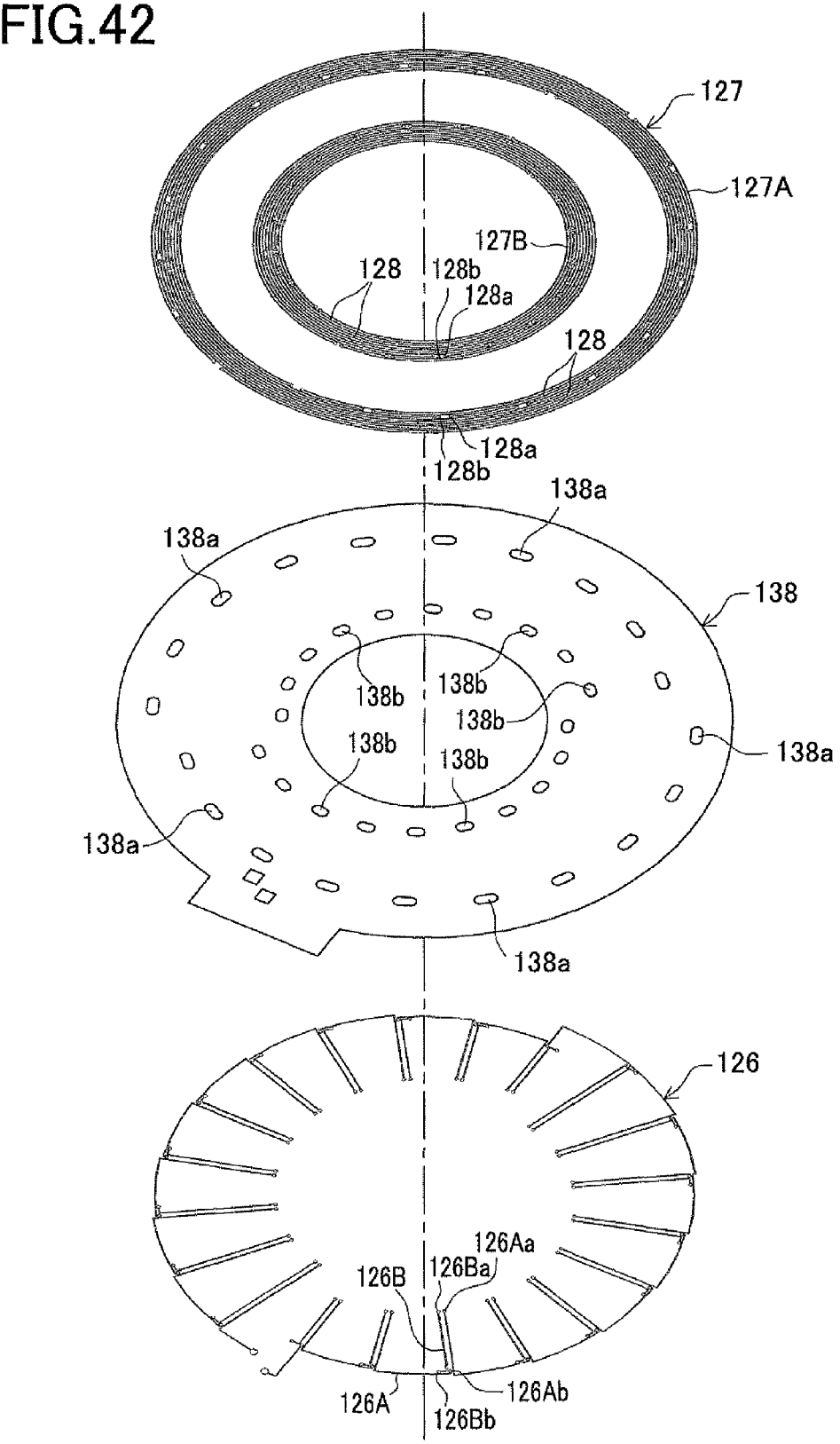
FIG. 42 is an exploded, enlarged, perspective view of a part of constituent components in FIGS. 32A and 32B in the fifth embodiment.

A fifth embodiment of a rotation angle sensor according to the present invention will be explained in detail below referring to accompanying drawings. This embodiment differs from the third embodiment in the structure of a resolver stator 113 and in particular in the structures of excitation coils 126 and 127 and detection coils 132 and 134. FIG. 41 is an exploded perspective view of the resolver stator 113. FIG. 42 is an exploded, enlarged perspective view of a part of components in FIG. 41.

As shown in FIG. 41, the resolver stator 113 includes a base flat plate 130, an insulating layer 131, a first excitation coil 126, an insulating layer 138, a second excitation coil 127, an insulating layer 137, a first detection coil 132, an insulating layer 133, a second detection coil 134, and an insulating layer 135, which are placed in layers. Each structure of the base flat plate 130 located in the lowermost layer and the insulating layer 131 placed on the plate 130 and each structure of the first detection coil 132, the insulating layer 133, the second detection coil 134, and the insulating layer 135 are identical to those in the third embodiment.

In the fifth embodiment, as shown in FIGS. 41 and 42, the first excitation coil 126 is formed on the insulating layer 131. The insulating layer 138 is formed on the first excitation coil 126. This insulating layer 138 is formed with a plurality of through holes 138*a* and 138*b*. The second excitation coil 127 is formed on the insulating layer 138. This second excitation coil 127 includes two coils 127A and 127B concentrically arranged in large and small annular forms. The second excitation coil 127 is placed in a position conforming with the first excitation coil 126. Those first second excitation coils 126 and 127 have a positional relationship that overlaps with the first and second detection coils 132 and 134 formed in the layers above the coils 124 and 125.

Figure 43:
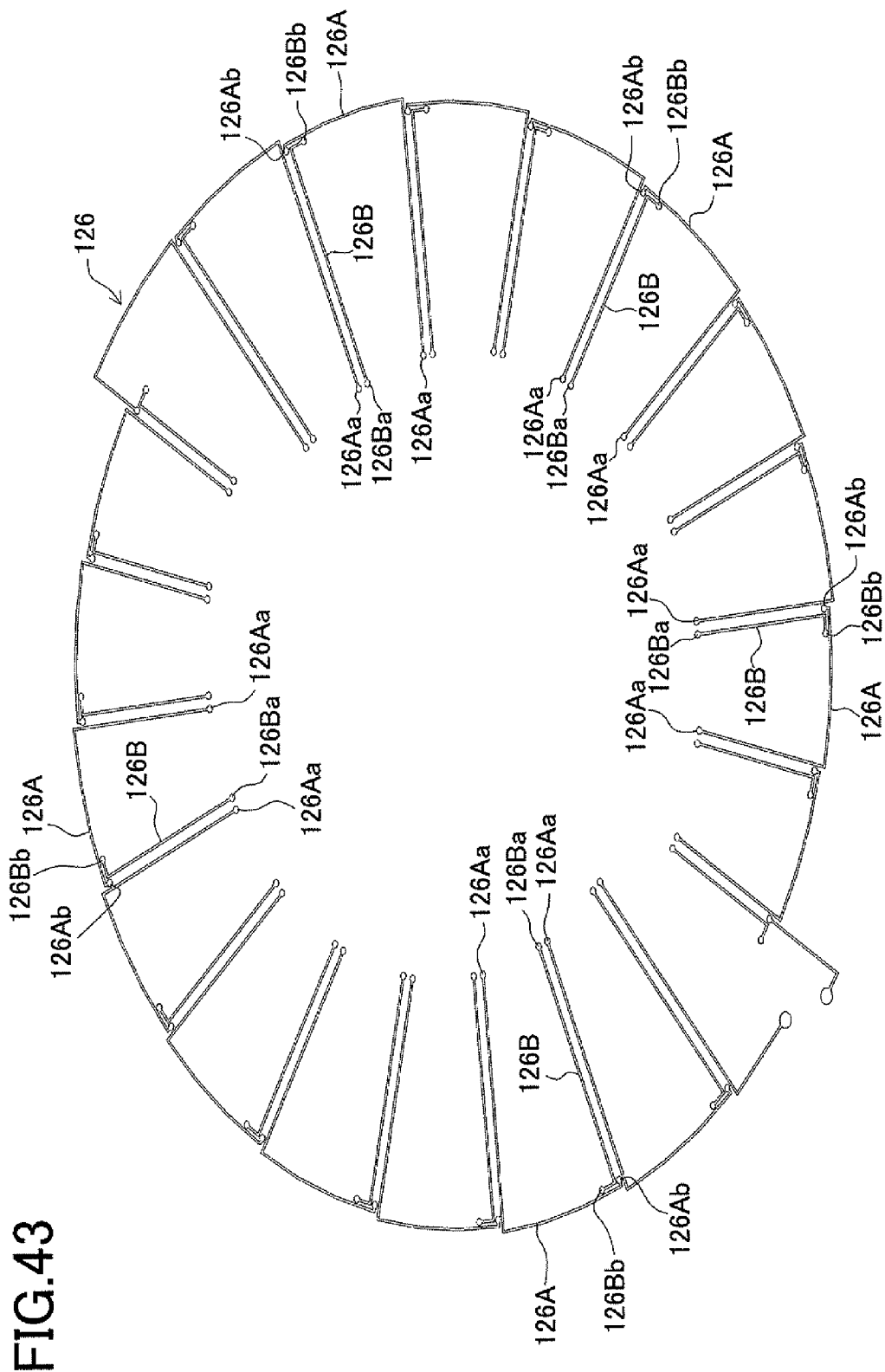
FIG. 43 is an enlarged perspective view of a first excitation coil in the fifth embodiment.

FIG. 43 is an enlarged perspective view of the first excitation coil 126. This coil 126 includes a plurality of conductive wire patterns 126A and 126B each having an almost L shape in various sizes. Those conductive wire patterns 126A and 126B are arranged radially and on the same circumference. Each conductive wire pattern 126A has terminals 126Aa and 126Ab at both ends. Each conductive wire pattern 126B has terminals 126Ba and 126Bb at both ends.

Figure 44:
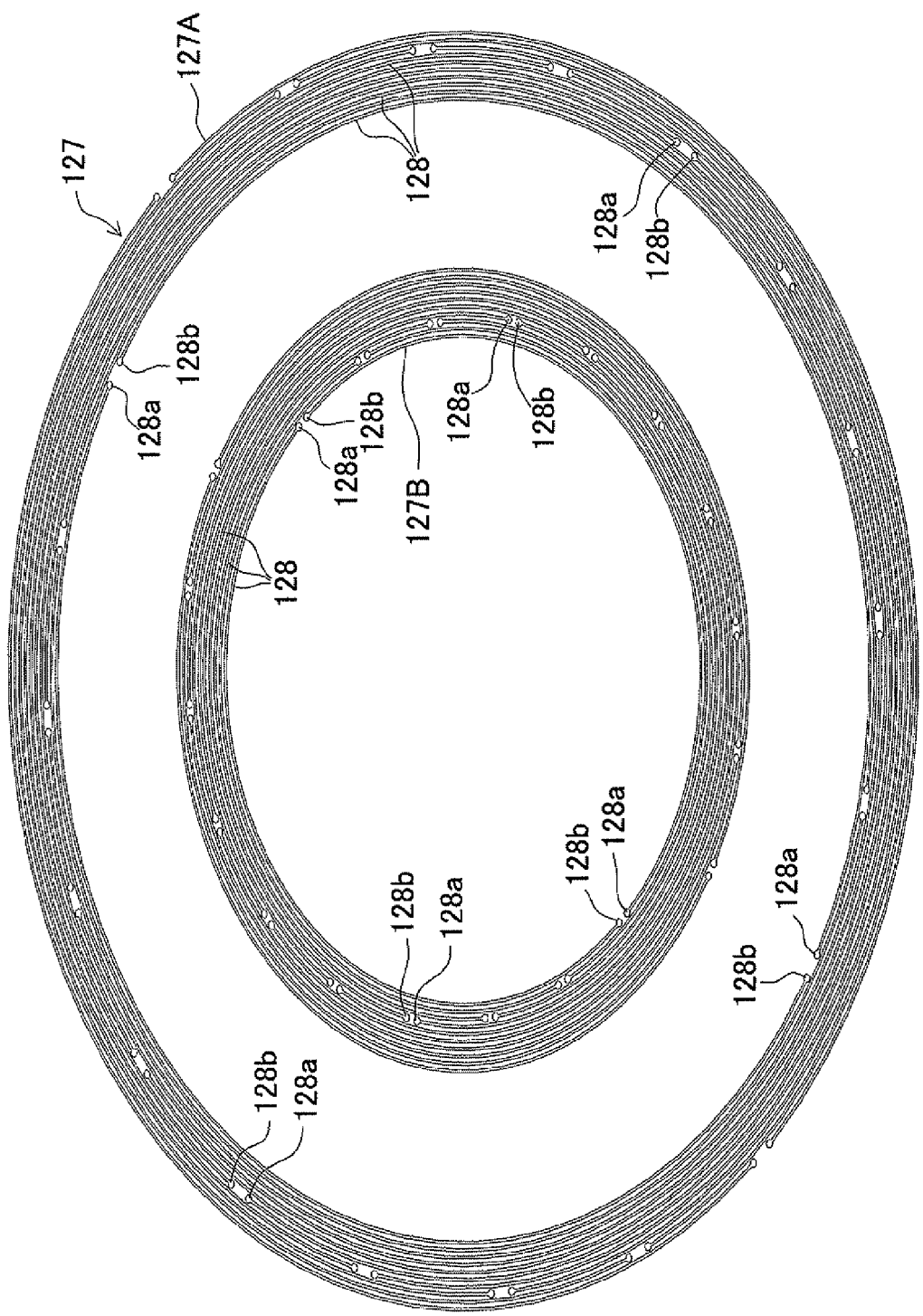
FIG. 44 is an enlarged perspective view of a second excitation coil in the fifth embodiment.

FIG. 44 is an enlarged perspective view of the second excitation coil 127. Each of the annular coils 127A and 127B constituting the second excitation coil 127 is made of a plurality of coil wires 128, each extending in a semicircular form, arranged in annular and multiple-turn pattern. The two annular coils 127A and 127B have the same number of turns as each other. Each coil wire 128 forming each annular coils 127A and 127B includes both ends formed with terminals 128$a$ and 128$b$. The terminals 128$a$ and 128$b$ of one coil wire 128 are spaced at an interval from respective adjacent terminals 128$b$ and 128$a$ of the other coil wire 128 arranged on the same circle so that they constitute each pair of terminals 128$a$ and 128$b$. Each pair of terminals 128$a$ and 128$b$ are arranged in correspondence with each terminal 126Aa, 126Ab, 126Ba, and 126Bb of each conductive wire pattern 126A and 126B of the first excitation coil 126.

Figure 45:
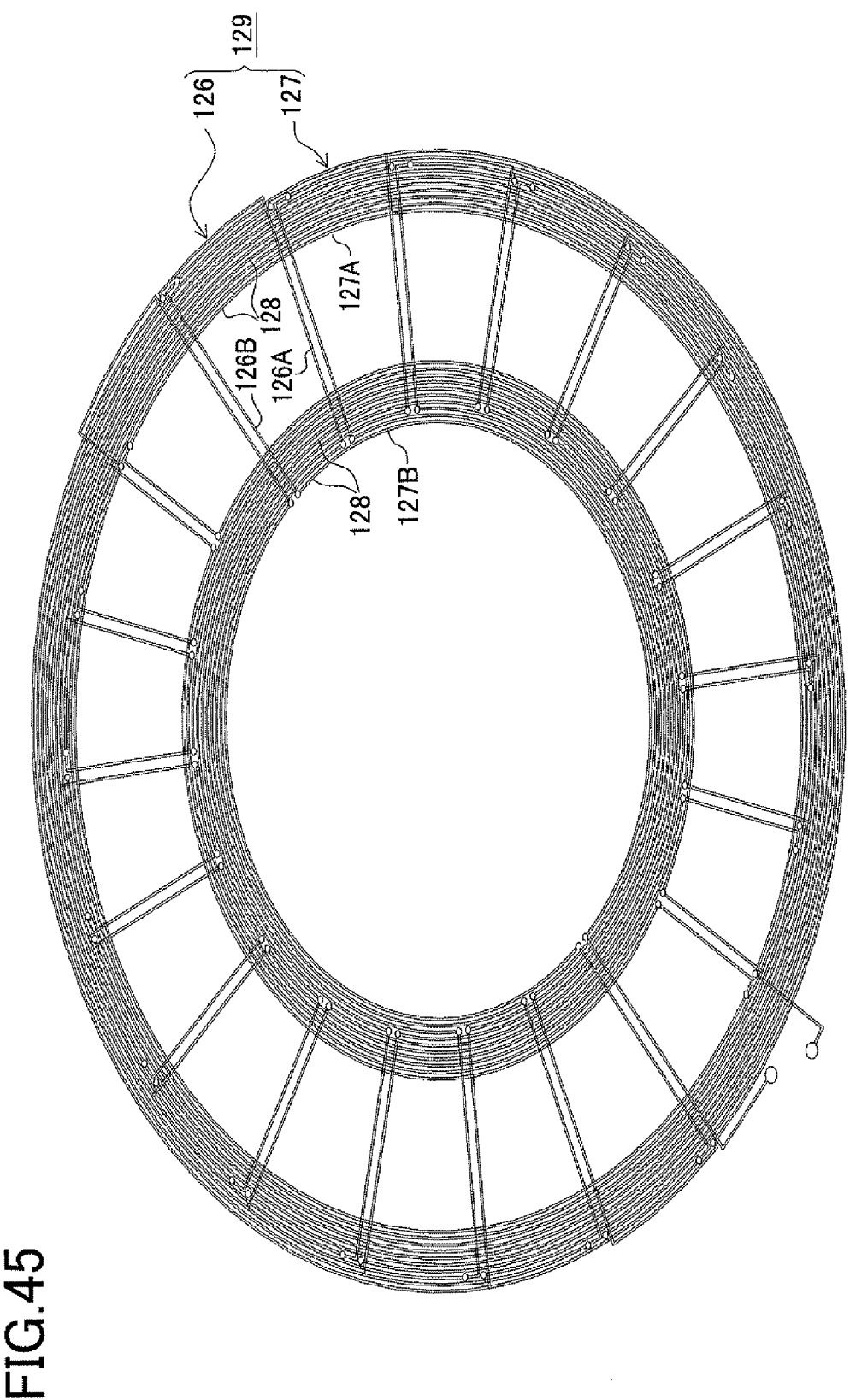
FIG. 45 is a perspective view showing a connected state of the first and second excitation coils in the fifth embodiment.
Figure 46:
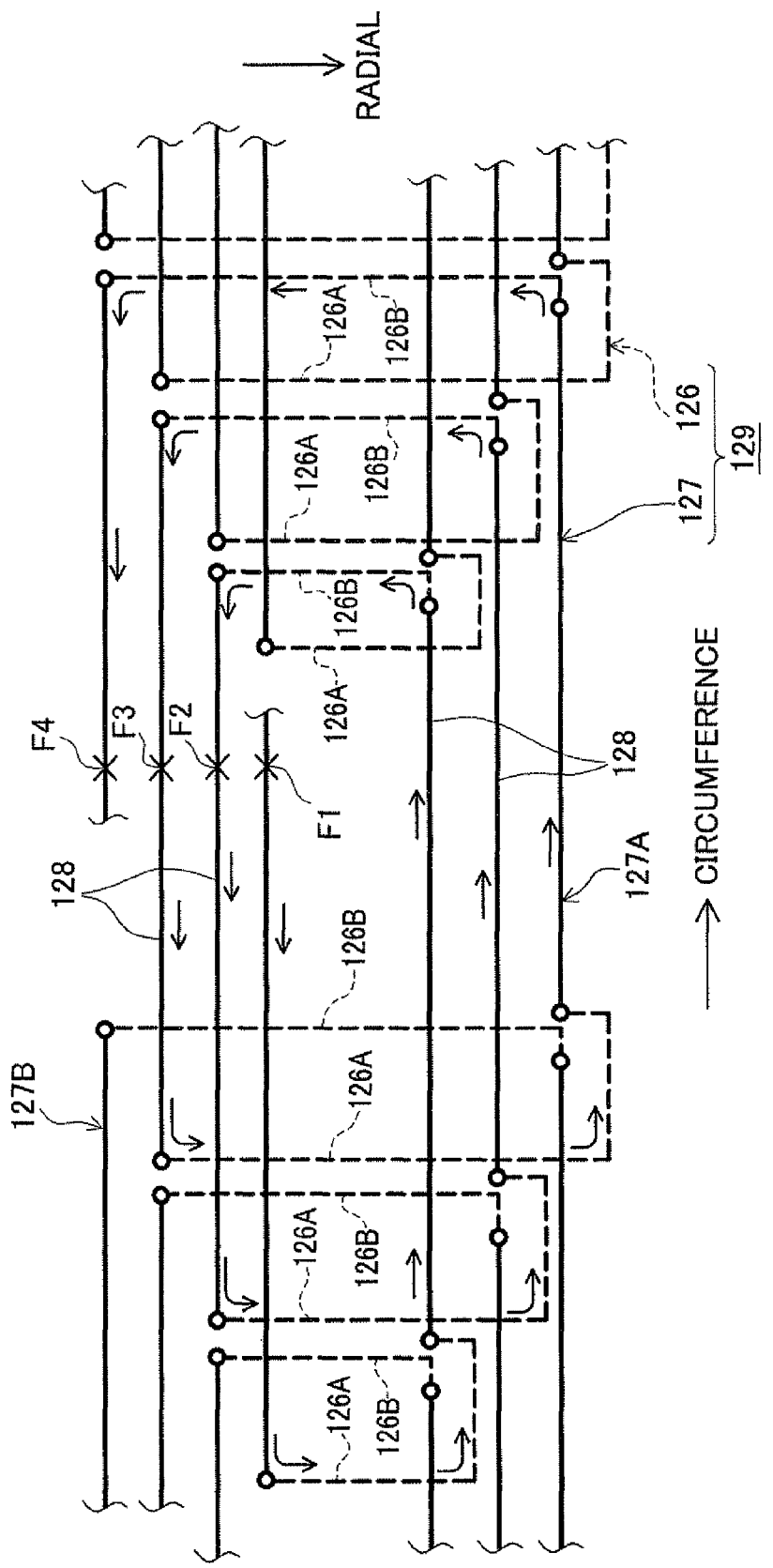
FIG. 46 is a schematic diagram showing a part of a coil pattern of a set of excitation coils in the fifth embodiment.

In FIG. 42, each terminal 126Aa, 126Ab, 126Ba, and 126Bb of each pattern 126A and 126B of the first excitation coil 126 is connected to each corresponding terminal 128$a$ and 128$b$ of the annular coils 127A and 127B forming the second excitation coil 127 through the through holes 138$a$ and 138$b$ of the insulating layer 138. FIG. 45 is a perspective view showing a connection state of the first excitation coil 126 and the second excitation coil 127. These two connected coils 126 and 127 constitute a set of excitation coil 129. FIG. 46 is a schematic diagram of a part of a coil pattern of this set of excitation coil 129. This set of excitation coil 129 is placed in a position that overlaps with the flat coil patterns of the forward direction and the flat coil patterns of the negative direction constituting the detection coils 132 and 134. In FIG. 46, for example, this set of excitation coil 129 includes a one-turn loop pattern that extends from a certain point F1 along the conductive wire in a direction indicated by arrows to a next point F2. The coil 129 includes another one-turn loop pattern that extends from the point F2 along the conductive wire to a next point F3 and further includes another one-turn loop pattern that extends from the point F3 along the conductive wire to a next point F4. Similarly, a plurality of subsequent loop patterns is arranged. As above, the coil pattern of the set of excitation coil 129 includes a plurality of loop patterns consecutively wound as shown in FIG. 46. Those loop patterns are arranged entirely in an annular shape as shown in FIG. 45. As shown in FIG. 46, the adjacent loop patterns in the circumferential direction are arranged with sequential displacement by partly overlapping each other and the adjacent loop patterns in the radial direction are arranged in sequentially enlarged form without overlapping each other.

According to the resolver 11 in the fifth embodiment explained above, the resolver stator 113 includes both the excitation coils 126 and 127 (129) and the detection coils 132 and 134. Thus, differently from the case where the excitation coils 126, 127 (129) and the detection coils 132 and 134 are provided separately in the resolver stator and the resolver rotor respectively, there is no need to communicate the detection signal of the detection coils 132 and 134 between the resolver rotor 12 and the resolver stator 113 and no rotary transformer coil for that purpose is required. Accordingly, the resolver 11 does not have to include the rotary transformer coil and can have a simple and compact configuration.

In the fifth embodiment, the excitation coils 126 and 127 (129) are placed in positions that overlap with the flat coil patterns of the forward direction and the flat coil patterns of the negative direction constituting the detection coils 132 and 134. Further, the excitation coils 126 and 127 (129) are formed in a plurality of loop patterns consecutively wound. Those loop patterns are arranged entirely in an annular form so that the adjacent loop patterns in the circumferential direction are placed with sequential displacement to partly overlap with each other and the adjacent loop patterns in the radial direction are placed in sequentially enlarged form without overlapping each other. Consequently, a continuous uniform magnetic field is applied to the entire circumference of the detection coils 132 and 134 from the excitation coils 126 and 127 (129). Thus, the excitation signal can be supplied consecutively uniformly to the circumferential direction of the detection coils 132 and 134. In this light, the resolver 11 can have improved rotation angle detection accuracy.

In the fifth embodiment, each of the detection coils 132 and 134 and the excitation coils 126, 127 (129) is configured of the flat coil pattern. Those coils 126, 127 (129), 132, and 134 are not bulky as components of the resolver 11. Accordingly, the resolver 11 can have a reduced size in the rotation axis direction and hence be made compact.

Similar or identical structures of the fifth embodiment to those in the third embodiment can provide the same operations and effects as those in the third embodiment.

Sixth Embodiment

Figure 47:
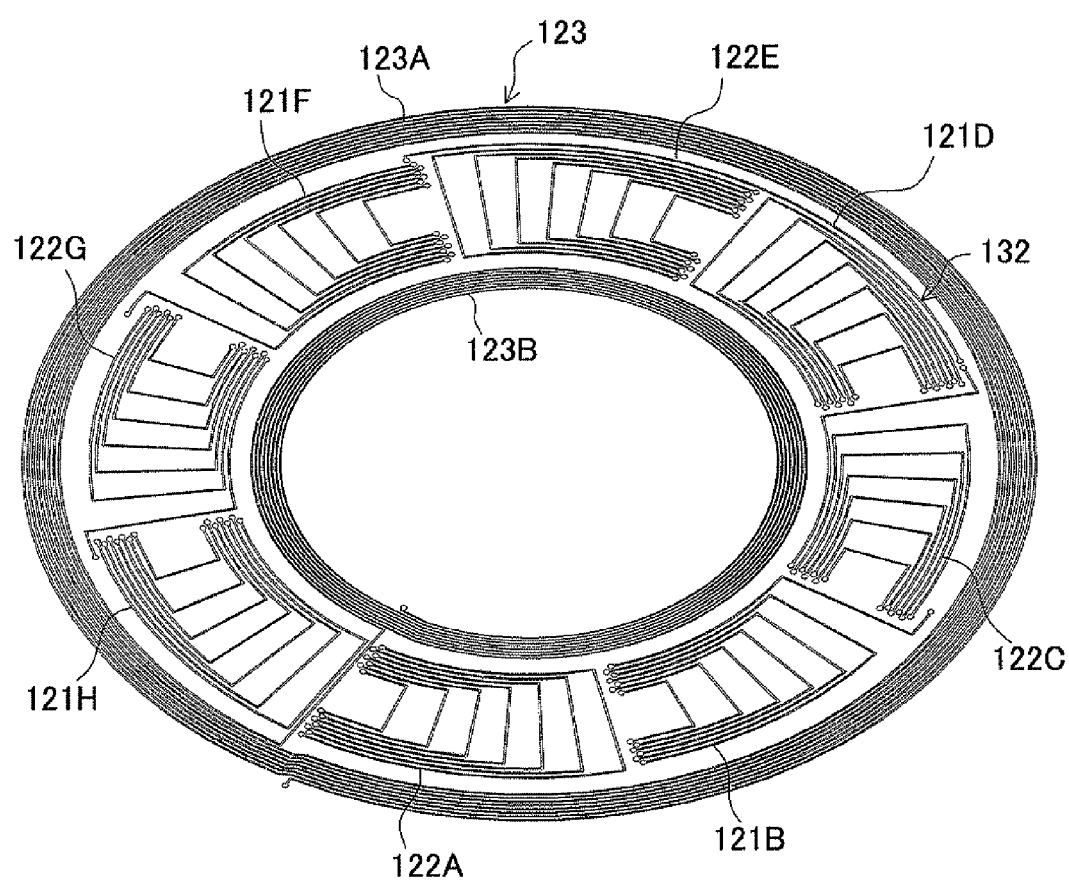
FIG. 47 is a perspective view showing an excitation coil and a first detection coil in a sixth embodiment.

A sixth embodiment of a rotation angle sensor according to the present invention will be explained below in detail. This embodiment differs from the third embodiment in the structure of a resolver stator 113 and particularly in the structures of an excitation coil 123 and a first detection coil 132. FIG. 47 is a perspective view of the excitation coil 123 and the first detection coil 132. It is to be noted that similar or identical configurations to those in the third embodiment are given the same reference signs as those in the third embodiment and their details are not repeated herein.

Figure 28:
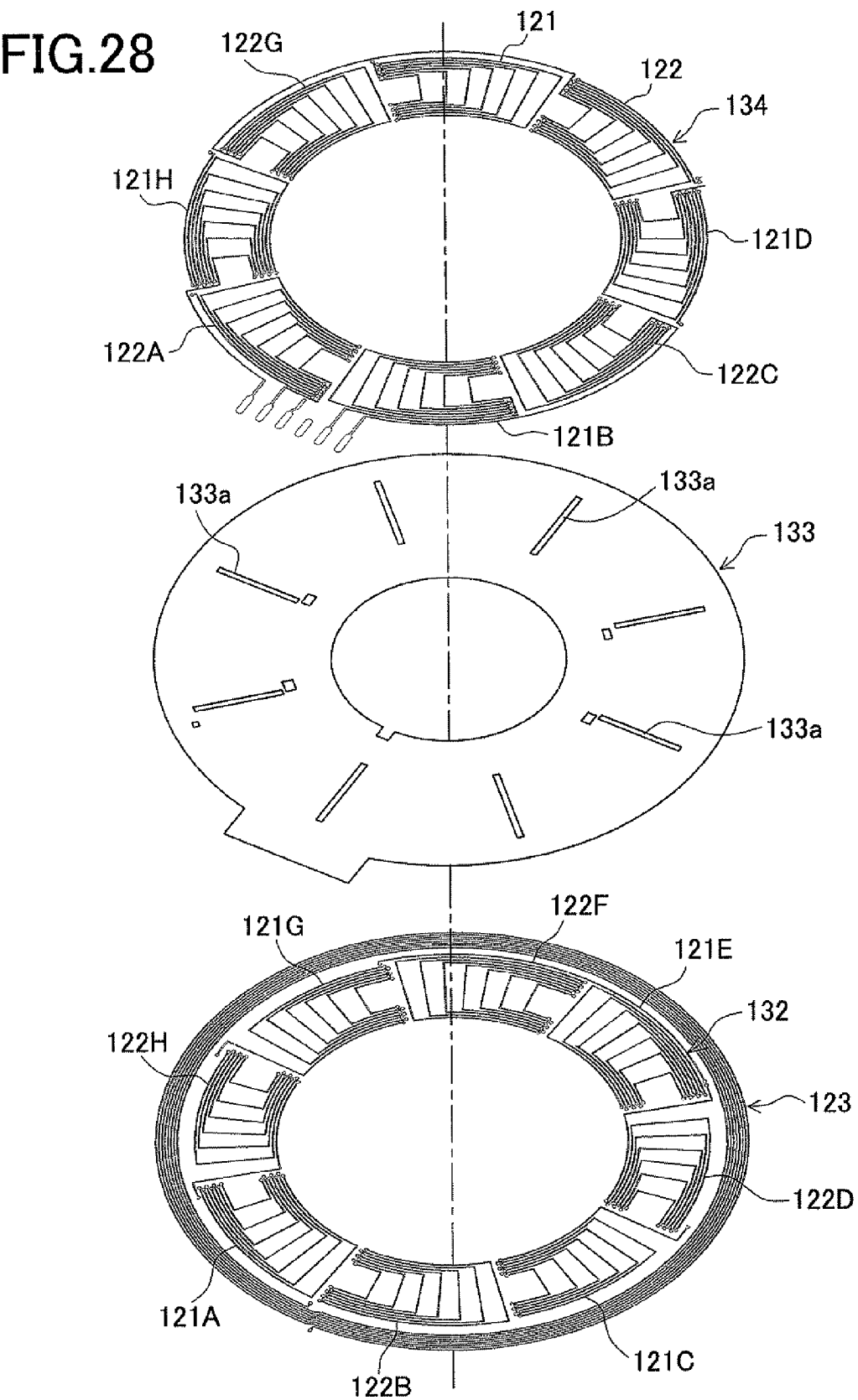
FIG. 28 is an enlarged perspective view showing a part of constituent components in FIG. 27 in the third embodiment.

In the third embodiment, as shown in FIG. 28, the excitation coil 123 is made of the flat coil pattern extending along the outer circumference of the forward-direction flat coil pattern and the reverse-direction flat coil pattern constituting the first detection coil 132. In the sixth embodiment, on the other hand, as shown in FIG. 47, the excitation coil 123 is made of a flat coil pattern 123A placed along the outer circumference of a forward-direction flat coil pattern and a reverse-direction flat coil pattern constituting the first detection coil 132 and a flat coil pattern 123B placed along the inner circumference of the same. Herein, each of the flat coil patterns 123A and 123B is arranged by winding a coil wire in multiple turns in an annular form. The flat coil pattern 123A on the outer circumference side and the flat coil pattern 123B on the inner circumference side are connected to each other so that respective current flowing directions are opposite to each other.

According to the resolver 11 in the sixth embodiment, the outer circumference and the inner circumference of the forward-direction flat coil pattern and the reverse-direction flat coil pattern constituting the first detection coil 132 are surrounded by the two flat coil patterns 123A and 123B constituting the excitation coil 123 respectively, so that the flowing directions of currents in the flat coil patterns 123A and 123B are opposite. Consequently, the continuous uniform magnetic fields directed in the same direction are applied from the excitation coil 123 (the flat coil patterns 123A and 123B) to the entire outer circumference side and inner circumference side of the first detection coil 132. In this embodiment, each of the flat coil patterns 123A and 123B is made by winding a coil wire in multiple turns in an annular form. This can generate a uniform magnetic field over the entire circumference of the excitation coil 123. Accordingly, as compared with the resolver 11 in the first embodiment, it is possible to uniformly and strongly supply an excitation signal consecutively to the circumference direction of the detection coils 132 and 134, thereby further improving the rotation angle detection accuracy. Similar or identical structures of the sixth embodiment to those in the third embodiment can provide the same operations and effects as those in the third embodiment.

The present invention is not limited to the above embodiments and may be embodied as below in other specific forms without departing from the essential characteristics thereof.

For instance, in the third embodiment, each of the sine wave coil 121 and the cosine wave coil 122 is divided into eight split-coil segments to provide a 2X coil. As an alternative, if a 1X coil is to be made, it may be arranged such that the sine wave coil 121 is constituted of the first split-coil segment 121A, the second split-coil segment 121B, the third split-coil segment 121C, and the fourth split-coil segment 121D and the cosine wave coil 122 is constituted of the first split-coil segment 122A, the second split-coil segment 122B, the third split-coil segment 122C, and the fourth split-coil segment 122D.

The third embodiment explains the amplitude resolver. The present invention relates to the structure of a resolver and thus may also be applied to a phase difference resolver.

In the above rotation angle sensor, the stator is formed on the stator flat plate, the rotor is made of the flat-shaped rotor flat plate, the stator flat plate and the rotor flat plate face each other in parallel, the rotor flat plate is formed with the cutouts. Accordingly, there is no need to form protrusions and recesses in the rotor flat plate and hence a cost reduction is achieved.

In the above rotation angle sensor, the rotor flat plate is made of the nonmagnetic conductive part. Accordingly, while the excitation coil and the detection coil face the cutouts of the rotor, the induced voltage occurs in the detection coil. While the excitation coil and the detection coil face the nonmagnetic conductive part of the rotor, the induced voltage hardly occurs in the detection coil. The rotation angle can be detected based on the detection voltage value which is induced voltage generated in the detection coil.

Specifically, upon receipt of the excitation signal (the sine wave signal), the excitation coil generates a predetermined amount of magnetic field in the positive direction. In the above embodiments, the direction of the magnetic flux IA generated in the excitation coil when the sine wave signal is input in the excitation coil is referred to as a positive direction. In the region where the cutouts face the excitation coil and the detection coil, the magnetic flux IA generated in the excitation coil passes through the detection coil, causing induced voltage to occur in the detection coil.

On the other hand, a detection current hardly flows in the detection coil facing the nonmagnetic conductive part of the resolver rotor for the following reason. The magnetic flux IA generated in the excitation coil generates an eddy current on the surface of the nonmagnetic conductive part. The generated eddy current causes the magnetic flux IB to occur in the negative direction (opposite to the positive direction). The magnetic flux IA in the positive direction generated in the excitation coil and the magnetic flux IB in the negative direction generated by the eddy current cancel each other, so that no current flows in the detection coil.

The specific technical characteristics of the above configurations are in that the resolver rotor is placed so that the nonmagnetic conductive parts and the cutouts are alternately arranged to face the excitation coil and the detection coil, and in that the magnetic flux by the eddy current generated in the nonmagnetic conductive parts and the magnetic flux generated in the excitation coil cancel each other. In the conventional techniques in Patent Literature 1 and others, the adjacent teeth of the stator are excited in opposite polarities. The resolver rotor is made of a magnetic material in order to form a magnetic path through which a magnetic flux passes. Thus, the resolver rotor made of the nonmagnetic conductive material has not been considered.

In the above rotation angle sensor, the magnetic part is provided on the nonmagnetic conductive material to form the nonmagnetic conductive part and the magnetic part. Accordingly, by simply providing the base flat plate of the resolver rotor is made of the nonmagnetic conductive material and placing the magnetic part thereon, the resolver rotor can have a simple configuration with reduced cost. The resolver rotor is rotated at high speeds but the resolver rotor has no coil and thus can have high reliability with respect to disturbance stress caused by centrifugal force and others.

In the above rotation angle sensor, the magnetic part is provided by dispersing a granular magnetic material in the insulating material. Thus, the magnetic part can be formed by a simple method with reduced cost. Since the insulated magnetic powder is used, a small eddy current is generated in the magnetic material. This makes it possible to reduce a diamagnetic field which will pass through the detection coil and increase a detection current. Furthermore, the magnetic powder has a diameter of 1 to 30 μm and is coated with the insulating layer on the outer periphery. Accordingly, the magnetic powder particles are not electrically continuous with each other and thus no eddy current occurs.

In the rotation angle sensor, the magnetic part is made of the magnetic powder material coated with the insulating material. The use of the insulated magnetic powder can reduce the eddy current to be generated in the magnetic material, decrease a diamagnetic field that will pass through the detection coil, and further increase the detection current. It is also possible to uniformize the distribution of a magnetic material in the magnetic part and thereby enhance uniformity of the magnetic flux to be generated. The magnetic powder has a diameter of 1 to 30 μm and is coated with the insulating layer on the outer periphery. Accordingly, the magnetic powder particles are not electrically continuous with each other and thus no eddy current occurs.

The present invention is available for detection of a rotation angle of an output shaft of an internal combustion engine, an electric motor, and others.

REFERENCE SIGNS

11 Resolver
12 Resolver rotor
12a Nonmagnetic conductive part
12b Cutout
13 Resolver stator
21 Sine wave coil
22 Cosine wave coil
23 Excitation coil
30 Stator base flat plate
41 Rotor base flat plate
41A Nonmagnetic conductive part
42 Magnetic part
113 Resolver stator 123 Excitation coil
123A Flat coil pattern (Outer circumference side)
123B Flat coil pattern (Inner circumference side)
124 First excitation coil
124A Annular coil (Large)
124B Annular coil (Small)
125 Second excitation coil
126 First excitation coil
126A Conductive wire pattern
126B Conductive wire pattern
127 Second excitation coil
127A Annular coil (Large)
127B Annular coil (Small)
128 Coil wire
129 Excitation coil
130 Base flat plate (Base substrate)
132 First detection coil
134 Second detection coil

The invention claimed is:

1. A rotation angle sensor comprising:
a stator including:
an excitation coil configured to receive an excitation signal, and
a detection coil that is configured to output a detection signal and that includes a flat-shaped spiral coil part including a plurality of winding patterns, gaps between the plurality winding patterns gradually increasing, in a circumference direction, from an outside of the spiral coil part to an inside of the spiral coil part; and
a rotor rotatably placed to face the stator,
wherein a nonmagnetic conductive part and one of a magnetic part and a cutout are alternately formed in the rotor in places facing the stator.

2. The rotation angle sensor according to claim 1, wherein the stator is formed on a stator flat plate,
the rotor is made of a flat-shaped rotor flat plate,
the stator flat plate and the rotor flat plate are placed in parallel to face each other, and
the rotor flat plate is formed with the cutout.

3. The rotation angle sensor according to claim 2, wherein the rotor flat plate is made of a nonmagnetic conductive material.

4. The rotation angle sensor according to claim 3, wherein the nonmagnetic conductive material is a nonmagnetic stainless steel.

5. The rotation angle sensor according to claim 4, wherein the rotor flat plate is formed with a protrusion engageable with a motor shaft, the protrusion being located in a center of the rotor flat plate formed with the cutout.

6. The rotation angle sensor according to claim 1, wherein the excitation coil and the detection coil are formed in layers on a base flat plate of the stator.

7. The rotation angle sensor according to claim 6, wherein the detection coil includes (1) a sine wave coil comprising a first sine wave coil part and a second sine wave coil part which are sequentially continuous and (2) a cosine wave coil comprising a first cosine wave coil part and a second cosine wave coil part which are sequentially continuous.

8. The rotation angle sensor according to claim 7, wherein each of the sine wave coil parts is divided into a first sine wave split-coil segment and a second sine wave split-coil segment, the first sine wave split-coil segment is formed in a first coil layer, and the second sine wave split-coil segment is formed in a second coil layer formed on the first coil layer in overlapping relation, each of the cosine wave coil parts is divided into a first cosine wave split-coil segment and a second cosine wave split-coil segment, the first cosine wave split-coil segment is formed in the second coil layer, and the second cosine wave split-coil segment is formed in the first coil layer.

9. The rotation angle sensor according to claim 7, wherein the excitation coil includes a plurality of coil parts, the coil parts having the same number of winding turns and the same winding direction of a conductive wire and being arranged to have a single polarity in a circumference direction.

10. The rotation angle sensor according to claim 9, wherein
a plurality of winding parts forming the sine wave coil parts are arranged to change an output signal of the sine wave coil into a sine wave form by changing a range through which a magnetic field passes when a uniform magnetic flux directed in the same direction acts, and
a plurality of winding parts forming the cosine wave coil parts are arranged to change an output signal of the cosine wave coil into a cosine wave form by changing a range through which a magnetic field passes when uniform magnetic fluxes act in the same direction.

11. The rotation angle sensor according to claim 1, wherein the magnetic part is provided on a nonmagnetic conductive member formed with the nonmagnetic conductive part so that the nonmagnetic conductive part and the magnetic part are integrally provided.

12. The rotation angle sensor according to claim 11, wherein the magnetic part is made in such a manner that a granular magnetic material is dispersed in an insulating material.

13. The rotation angle sensor according to claim 11, wherein the magnetic part is made of magnetic powder coated with an insulating material.

14. The rotation angle sensor according to claim 11, wherein the magnetic part is formed in such a manner that magnetic powder coated with an insulating material is applied and dried.

15. The rotation angle sensor according to claim 1, wherein the detection coil includes a flat coil pattern wound in a forward direction and a flat coil pattern wound in a reverse direction, the forward-direction flat coil pattern and the reverse-direction flat coil pattern are arranged sequentially in the circumference direction, and
the excitation coil includes a coil pattern placed along an outer circumference of the forward-direction coil pattern and the reverse-direction coil pattern.

16. The rotation angle sensor according to claim 15, wherein the excitation coil further includes a coil pattern placed along an inner circumference of the forward-direction flat coil pattern and the reverse-direction flat coil pattern, the coil pattern placed along the outer circumference and the coil pattern placed along the inner circumference are connected to each other to cause a current to flow in opposite directions.

17. The rotation angle sensor according to claim 15, wherein the rotor is made of a conductive material and formed with cutouts spaced at a predetermined angular interval in the circumference direction.

18. The rotation angle sensor according to claim 17, wherein the conductive material is a nonmagnetic conductive material.

19. The rotation angle sensor according to claim 15, wherein the stator includes a base substrate, and the excitation coil and the detection coil are formed in layers on the base substrate.

20. The rotation angle sensor according to claim 19, wherein the excitation coil and the detection coil are formed in different layers.

21. The rotation angle sensor according to claim 20, wherein the excitation coil and the detection coil are placed in positions that at least part of the coils overlap with each other.

22. The rotation angle sensor according to claim 15, wherein the stator includes a base substrate, the excitation coil and the detection coil are formed in layers on the base substrate, and at least part of the excitation coil and at least part of the detection coil are formed in the same layer.

23. The rotation angle sensor according to claim 1, wherein
the detection coil includes a flat coil pattern wound in a forward direction and a flat coil pattern wound in a reverse direction, the forward-direction flat coil pattern and the reverse-direction flat coil pattern are arranged sequentially in the circumference direction, and
the excitation coil is constituted of a plurality of loop patterns consecutively wound and placed in a position that overlaps the forward-direction flat coil pattern and the reverse-direction flat coil pattern, the loop patterns being arranged entirely in an annular form so that the adjacent loop patterns in a circumference direction are arranged sequentially with displacement to partly overlap each other and the adjacent loop patterns in a radial direction are arranged in sequentially enlarged form.

24. A rotation angle sensor comprising:
a stator including:
an excitation coil, and
a detection coil that includes a flat-shaped spiral coil part including a plurality of winding patterns, gaps between the plurality of winding patterns gradually increasing, in a circumference direction, from an outside of the spiral coil part to an inside of the spiral coil part;
a rotor rotatably placed to face the stator; and
a circuit section configured to generate an excitation signal input to the excitation coil and process a detection signal output from the detection coil,
wherein a nonmagnetic conductive part and one of a magnetic part and a cutout are alternately formed in the rotor in places facing the stator.

* * * * *